US012739789B2

(12) United States Patent
Esswie et al.

(10) Patent No.: US 12,739,789 B2
(45) Date of Patent: Sep. 15, 2026

(54) METHOD AND APPARATUS FOR POWER SAVING ENHANCEMENTS OF PAGING PROCEDURES IN CELLULAR SYSTEMS

(71) Applicant: InterDigital Patent Holdings, Inc., Wilmington, DE (US)

(72) Inventors: Ali Esswie, Montreal (CA); Ravikumar Pragada, Warrington, PA (US); Hussain Elkotby, Conshohocken, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 253 days.

(21) Appl. No.: 18/276,083

(22) PCT Filed: Feb. 7, 2022

(86) PCT No.: PCT/US2022/015408
§ 371 (c)(1),
(2) Date: Aug. 7, 2023

(87) PCT Pub. No.: WO2022/170159
PCT Pub. Date: Aug. 11, 2022

(65) Prior Publication Data

US 2023/0422211 A1 Dec. 28, 2023

Related U.S. Application Data

(60) Provisional application No. 63/147,077, filed on Feb. 8, 2021.

(51) Int. Cl.

| | |
|---|---|
| ***H04W 68/02*** | (2009.01) |
| ***H04W 72/231*** | (2023.01) |
| ***H04W 72/232*** | (2023.01) |

(52) U.S. Cl.
CPC ......... *H04W 68/02* (2013.01); *H04W 72/231* (2023.01); *H04W 72/232* (2023.01)

(58) Field of Classification Search
CPC . H04W 68/02; H04W 72/231; H04W 72/232; H04W 52/0216
See application file for complete search history.

(56) References Cited

U.S. PATENT DOCUMENTS

| | | | | |
|---|---|---|---|---|
| 12,484,019 | B2 * | 11/2025 | Islam | H04W 72/23 |
| 2020/0187245 | A1 * | 6/2020 | Fujishiro | H04W 72/21 |

(Continued)

FOREIGN PATENT DOCUMENTS

| | | | |
|---|---|---|---|
| EP | 2453710 | A1 | 5/2012 |
| WO | WO 2019104526 | A1 | 6/2019 |
| WO | WO2021238993 | A1 | 12/2021 |

OTHER PUBLICATIONS

"Paging enhancements for Idle/Inactive", 3GPP Tdoc R1-2100866, 3GPP TSG RAN WG1 #104e e-Meeting, Jan. 25-Feb. 5, 2021, 7 pages.

(Continued)

*Primary Examiner* — Marcos L Torres
(74) *Attorney, Agent, or Firm* — Mark D. Pratt

(57) ABSTRACT

Method, apparatus and systems are disclosed that may be implemented in a wireless transmit/receive unit (WTRU) and/or a wireless access point associated with the WTRU. In one representative method, the WTRU may be in an inactive mode or an idle mode prior to a paging occasion (PO). The WTRU may be configured to detect transmission of a number of synchronization signal blocks or reference signals associated with early paging indication (EPI) downlink control information (DCI). Based on the detected transmissions, the WTRU may perform a blind decoding on transmitted EPI DCI or sequence set to determine whether the WTRU is being paged at the PO or not. The blind decoding (Continued)

may use a pattern which relates the detected synchronization signal blocks or reference signals to a number of transmissions of the EPI DCI associated with the PO. Paging of the WTRU may be used to determine a light/deep sleep state of the WTRU.

20 Claims, 25 Drawing Sheets

(56) References Cited

U.S. PATENT DOCUMENTS

| | | | | |
|---|---|---|---|---|
| 2022/0225237 | A1* | 7/2022 | He | H04W 72/0446 |
| 2024/0163846 | A1 | 5/2024 | Sheng et al. | |
| 2025/0338254 | A1* | 10/2025 | Behura | H04W 68/005 |

OTHER PUBLICATIONS

Ericsson, "Provisioning of potential TRS/CSI-RS occasion(s) for Idle/Inactive UEs", Tdoc R1-2009201, 3GPP TSG RAN WG1 #103-e, e-Meeting, Oct. 26-Nov. 13, 2020, 14 pages.

Huawei, HiSilicon, Assistance RS occasions for IDLE/inactive mode, R1-2100217, 3GPP TSG RAN WG1 Meeting #104-e, E-meeting, Jan. 25-Feb. 5, 2021, 9 pages.

Oppo, Potential paging enhancements, R1-2100168, 3GPP TSG RAN WG1 #104-e, e-Meeting, Jan. 25-Feb. 5, 2021, 4 pages.

Qualcomm Inc.: "TRS/CSI-RS for idle/inactive UE power saving", 3GPP Tdoc R1-2101475, 3GPP TSG-RAN WG1 #104-e, e-Meeting, Jan. 25-Feb. 5, 2021, 6 pages.

NTT Docomo, Inc.: "Discussion on paging enhancements", 3GPP Tdoc R1-2101622, 3GPP TSG RAN WG1 #104-e, e-Meeting, Jan. 25-Feb. 5, 2021, 9 pages.

Ericsson: "Design of Paging Enhancements", 3GPP Tdoc R1-2101555, 3GPP TSG-RAN WG1 Meeting #104-e, e-Meeting, Jan. 25-Feb. 5, 2021, 9 pages.

Interdigital: "Paging enhancements for UE power saving", 3GPP Tdoc R1-2101503, 3GPP TSG RAN WG1 #104-e, e-Meeting, Jan. 25-Feb. 5, 2021, 4 pages.

Li et al.: "Power Saving Techniques for 5G and Beyond", IEEE Access, Jun. 9, 2020, 16 pages.

NTT Docomo, Inc.: "Discussion on TRS/CSI-RS occasion for idle/inactive UEs", 3GPP Tdoc R1-2101623, 3GPP TSG RAN WG1 #104-e, e-Meeting, Jan. 25-Feb. 5, 2021, 4 pages.

* cited by examiner

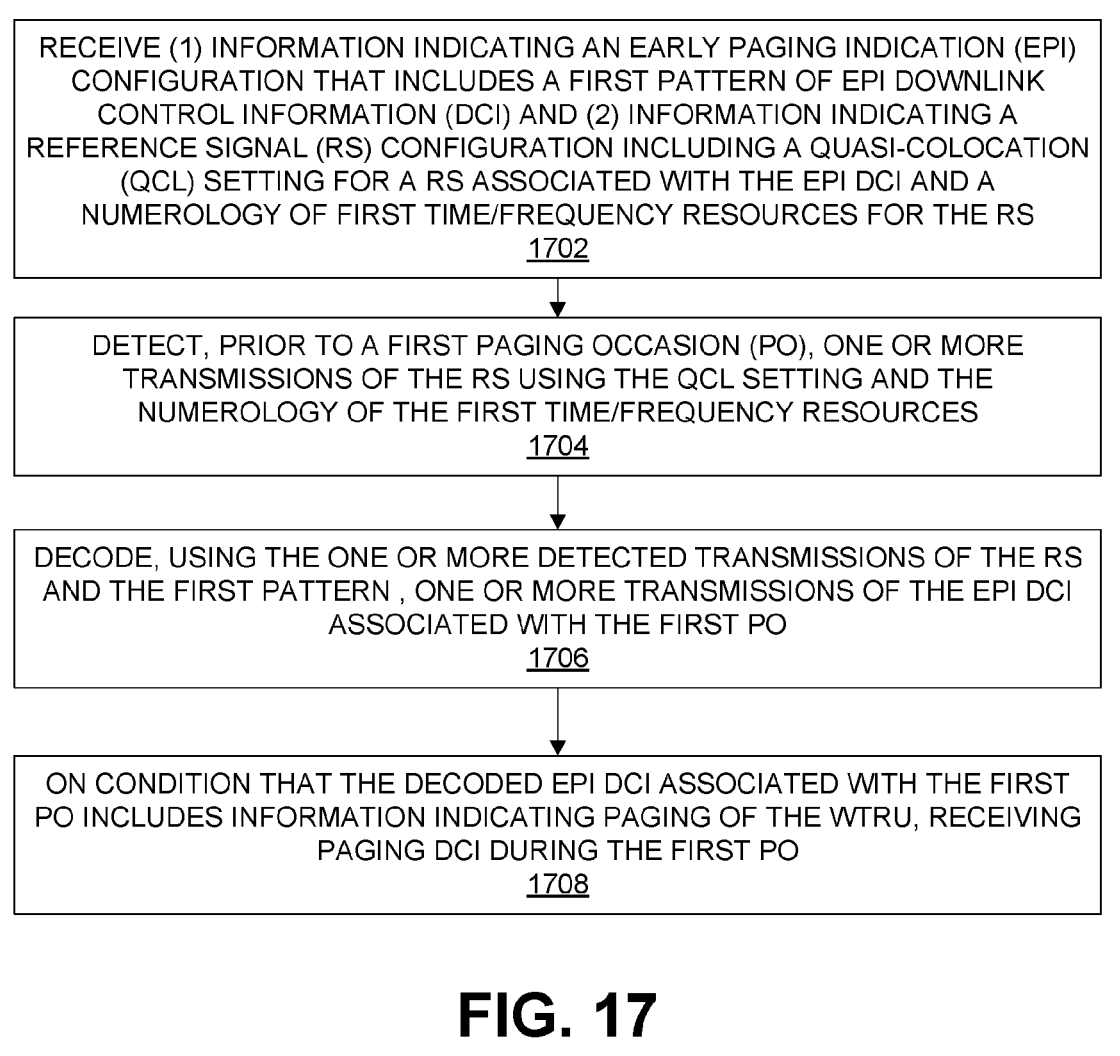

RECEIVE (1) INFORMATION INDICATING AN EARLY PAGING INDICATION (EPI) CONFIGURATION THAT INCLUDES A FIRST PATTERN OF EPI DOWNLINK CONTROL INFORMATION (DCI) AND (2) INFORMATION INDICATING A REFERENCE SIGNAL (RS) CONFIGURATION INCLUDING A QUASI-COLOCATION (QCL) SETTING FOR A RS ASSOCIATED WITH THE EPI DCI AND A NUMEROLOGY OF FIRST TIME/FREQUENCY RESOURCES FOR THE RS
1702

DETECT, PRIOR TO A FIRST PAGING OCCASION (PO), ONE OR MORE TRANSMISSIONS OF THE RS USING THE QCL SETTING AND THE NUMEROLOGY OF THE FIRST TIME/FREQUENCY RESOURCES
1704

DECODE, USING THE ONE OR MORE DETECTED TRANSMISSIONS OF THE RS AND THE FIRST PATTERN , ONE OR MORE TRANSMISSIONS OF THE EPI DCI ASSOCIATED WITH THE FIRST PO
1706

ON CONDITION THAT THE DECODED EPI DCI ASSOCIATED WITH THE FIRST PO INCLUDES INFORMATION INDICATING PAGING OF THE WTRU, RECEIVING PAGING DCI DURING THE FIRST PO
1708

FIG. 17

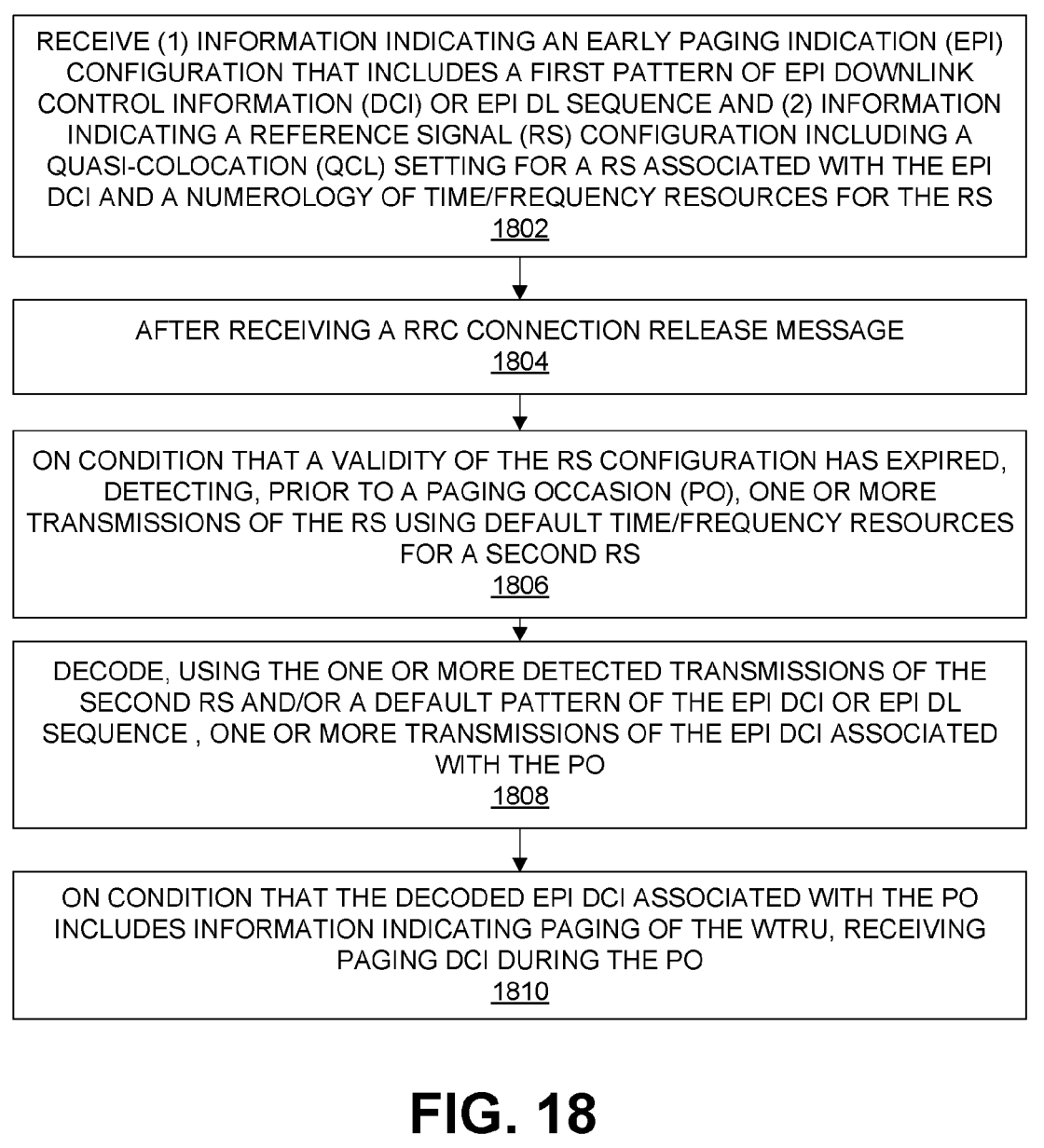

RECEIVE (1) INFORMATION INDICATING AN EARLY PAGING INDICATION (EPI) CONFIGURATION THAT INCLUDES A FIRST PATTERN OF EPI DOWNLINK CONTROL INFORMATION (DCI) OR EPI DL SEQUENCE AND (2) INFORMATION INDICATING A REFERENCE SIGNAL (RS) CONFIGURATION INCLUDING A QUASI-COLOCATION (QCL) SETTING FOR A RS ASSOCIATED WITH THE EPI DCI AND A NUMEROLOGY OF TIME/FREQUENCY RESOURCES FOR THE RS
1802

AFTER RECEIVING A RRC CONNECTION RELEASE MESSAGE
1804

ON CONDITION THAT A VALIDITY OF THE RS CONFIGURATION HAS EXPIRED, DETECTING, PRIOR TO A PAGING OCCASION (PO), ONE OR MORE TRANSMISSIONS OF THE RS USING DEFAULT TIME/FREQUENCY RESOURCES FOR A SECOND RS
1806

DECODE, USING THE ONE OR MORE DETECTED TRANSMISSIONS OF THE SECOND RS AND/OR A DEFAULT PATTERN OF THE EPI DCI OR EPI DL SEQUENCE , ONE OR MORE TRANSMISSIONS OF THE EPI DCI ASSOCIATED WITH THE PO
1808

ON CONDITION THAT THE DECODED EPI DCI ASSOCIATED WITH THE PO INCLUDES INFORMATION INDICATING PAGING OF THE WTRU, RECEIVING PAGING DCI DURING THE PO
1810

FIG. 18

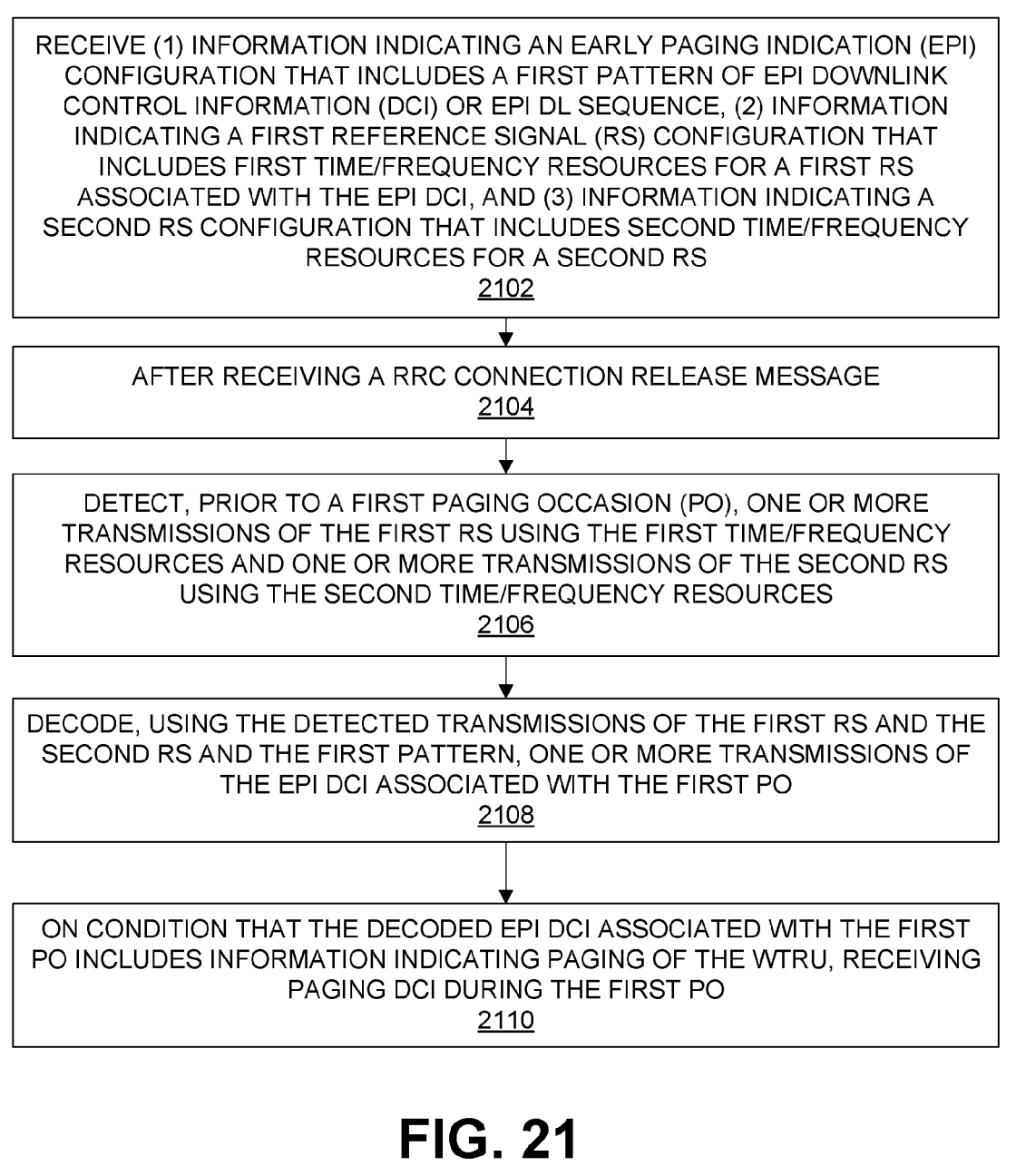

RECEIVE (1) INFORMATION INDICATING AN EARLY PAGING INDICATION (EPI) CONFIGURATION THAT INCLUDES A FIRST PATTERN OF EPI DOWNLINK CONTROL INFORMATION (DCI) OR EPI DL SEQUENCE, (2) INFORMATION INDICATING A FIRST REFERENCE SIGNAL (RS) CONFIGURATION THAT INCLUDES FIRST TIME/FREQUENCY RESOURCES FOR A FIRST RS ASSOCIATED WITH THE EPI DCI, AND (3) INFORMATION INDICATING A SECOND RS CONFIGURATION THAT INCLUDES SECOND TIME/FREQUENCY RESOURCES FOR A SECOND RS
2102

AFTER RECEIVING A RRC CONNECTION RELEASE MESSAGE
2104

DETECT, PRIOR TO A FIRST PAGING OCCASION (PO), ONE OR MORE TRANSMISSIONS OF THE FIRST RS USING THE FIRST TIME/FREQUENCY RESOURCES AND ONE OR MORE TRANSMISSIONS OF THE SECOND RS USING THE SECOND TIME/FREQUENCY RESOURCES
2106

DECODE, USING THE DETECTED TRANSMISSIONS OF THE FIRST RS AND THE SECOND RS AND THE FIRST PATTERN, ONE OR MORE TRANSMISSIONS OF THE EPI DCI ASSOCIATED WITH THE FIRST PO
2108

ON CONDITION THAT THE DECODED EPI DCI ASSOCIATED WITH THE FIRST PO INCLUDES INFORMATION INDICATING PAGING OF THE WTRU, RECEIVING PAGING DCI DURING THE FIRST PO
2110

FIG. 21

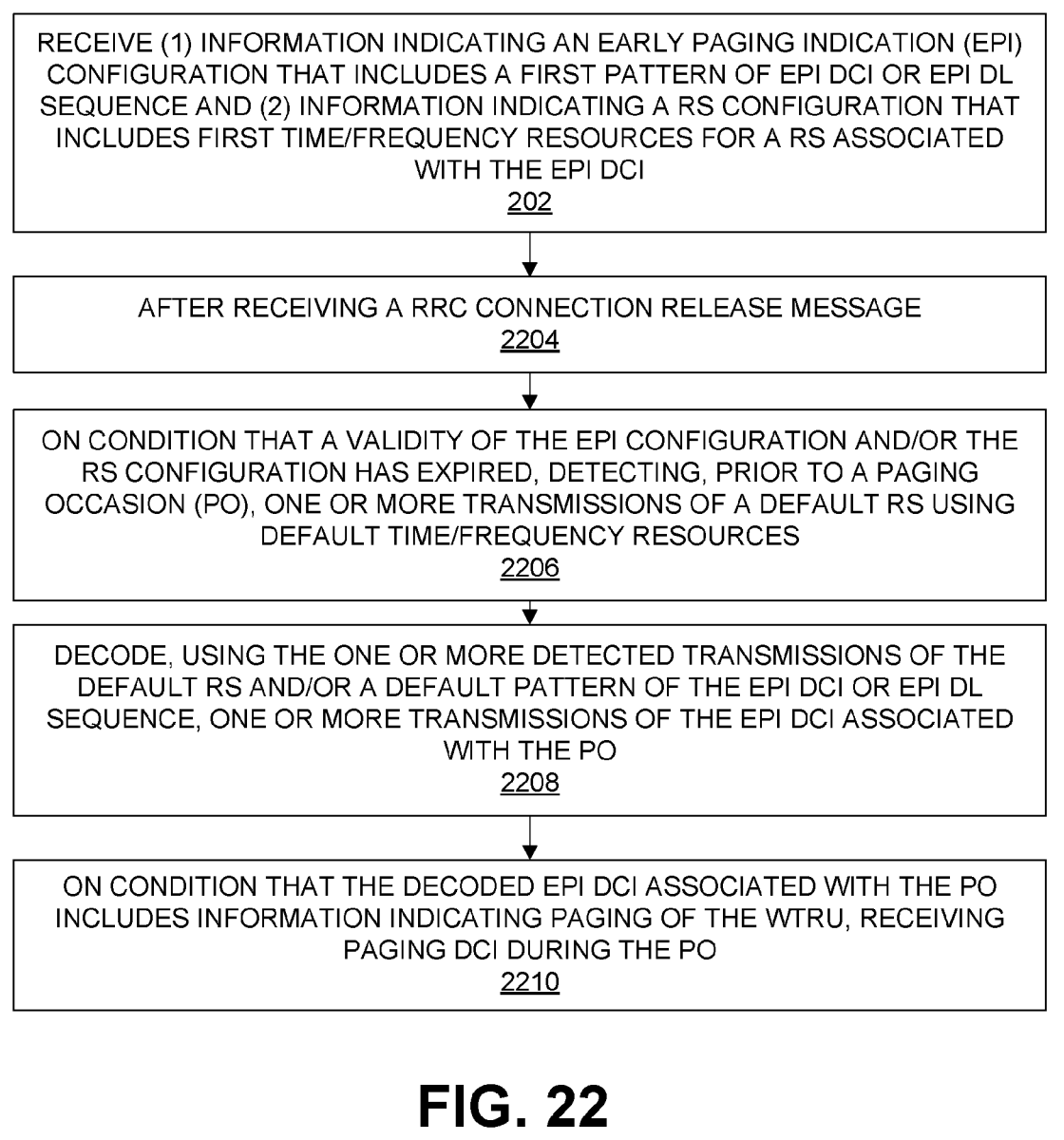

RECEIVE (1) INFORMATION INDICATING AN EARLY PAGING INDICATION (EPI) CONFIGURATION THAT INCLUDES A FIRST PATTERN OF EPI DCI OR EPI DL SEQUENCE AND (2) INFORMATION INDICATING A RS CONFIGURATION THAT INCLUDES FIRST TIME/FREQUENCY RESOURCES FOR A RS ASSOCIATED WITH THE EPI DCI
202

AFTER RECEIVING A RRC CONNECTION RELEASE MESSAGE
2204

ON CONDITION THAT A VALIDITY OF THE EPI CONFIGURATION AND/OR THE RS CONFIGURATION HAS EXPIRED, DETECTING, PRIOR TO A PAGING OCCASION (PO), ONE OR MORE TRANSMISSIONS OF A DEFAULT RS USING DEFAULT TIME/FREQUENCY RESOURCES
2206

DECODE, USING THE ONE OR MORE DETECTED TRANSMISSIONS OF THE DEFAULT RS AND/OR A DEFAULT PATTERN OF THE EPI DCI OR EPI DL SEQUENCE, ONE OR MORE TRANSMISSIONS OF THE EPI DCI ASSOCIATED WITH THE PO
2208

ON CONDITION THAT THE DECODED EPI DCI ASSOCIATED WITH THE PO INCLUDES INFORMATION INDICATING PAGING OF THE WTRU, RECEIVING PAGING DCI DURING THE PO
2210

FIG. 22

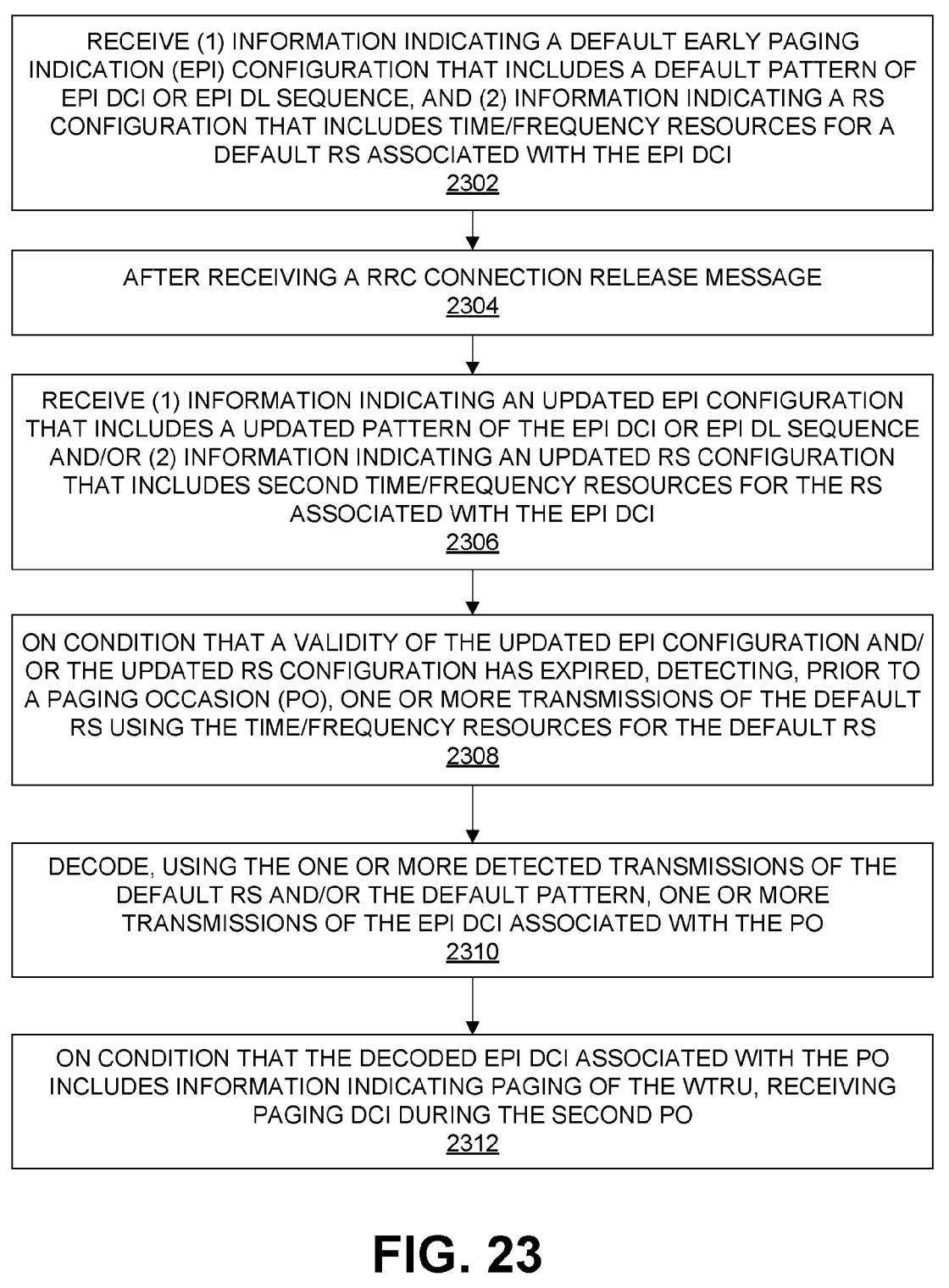

RECEIVE (1) INFORMATION INDICATING A DEFAULT EARLY PAGING INDICATION (EPI) CONFIGURATION THAT INCLUDES A DEFAULT PATTERN OF EPI DCI OR EPI DL SEQUENCE, AND (2) INFORMATION INDICATING A RS CONFIGURATION THAT INCLUDES TIME/FREQUENCY RESOURCES FOR A DEFAULT RS ASSOCIATED WITH THE EPI DCI
2302

AFTER RECEIVING A RRC CONNECTION RELEASE MESSAGE
2304

RECEIVE (1) INFORMATION INDICATING AN UPDATED EPI CONFIGURATION THAT INCLUDES A UPDATED PATTERN OF THE EPI DCI OR EPI DL SEQUENCE AND/OR (2) INFORMATION INDICATING AN UPDATED RS CONFIGURATION THAT INCLUDES SECOND TIME/FREQUENCY RESOURCES FOR THE RS ASSOCIATED WITH THE EPI DCI
2306

ON CONDITION THAT A VALIDITY OF THE UPDATED EPI CONFIGURATION AND/OR THE UPDATED RS CONFIGURATION HAS EXPIRED, DETECTING, PRIOR TO A PAGING OCCASION (PO), ONE OR MORE TRANSMISSIONS OF THE DEFAULT RS USING THE TIME/FREQUENCY RESOURCES FOR THE DEFAULT RS
2308

DECODE, USING THE ONE OR MORE DETECTED TRANSMISSIONS OF THE DEFAULT RS AND/OR THE DEFAULT PATTERN, ONE OR MORE TRANSMISSIONS OF THE EPI DCI ASSOCIATED WITH THE PO
2310

ON CONDITION THAT THE DECODED EPI DCI ASSOCIATED WITH THE PO INCLUDES INFORMATION INDICATING PAGING OF THE WTRU, RECEIVING PAGING DCI DURING THE SECOND PO
2312

FIG. 23

METHOD AND APPARATUS FOR POWER SAVING ENHANCEMENTS OF PAGING PROCEDURES IN CELLULAR SYSTEMS

CROSS-REFERENCE TO RELATED APPLICATIONS

This application is a U.S. National Stage Application under 35 U.S.C. § 371 of International Patent Application No. PCT/US2022/015408, filed 7 Feb. 2022, which claims the benefit of U.S. Provisional Application No. 63/147,077 filed 8 Feb. 2021 which is incorporated herein by reference.

FIELD

Embodiments disclosed herein generally relate to wireless communications and, for example to methods, apparatus and systems for an early paging indication and paging assistance reference signals for idle and/or inactive user equipment.

BRIEF DESCRIPTION OF THE DRAWINGS

A more detailed understanding may be had from the detailed description below, given by way of example in conjunction with drawings appended hereto. Figures in the description, are examples. As such, the Figures and the detailed description are not to be considered limiting, and other equally effective examples are possible and likely. Furthermore, like reference numerals in the figures indicate like elements, and wherein:

FIG. 17 is a diagram illustrating a representative procedure for paging using an EPI configuration and a RS configuration which includes a quasi-colocation (QCL) setting and a numerology for a RS;

FIG. 18 is a diagram illustrating a representative procedure for paging using an EPI configuration and a validity of a RS configuration which includes a quasi-colocation (QCL) setting and a numerology for a RS;

FIG. 21 is a diagram illustrating a representative procedure for paging using an EPI configuration and first and second RS configurations;

FIG. 22 is a diagram illustrating a representative procedure for paging using an EPI configuration, an RS configuration, and a validity of the EPI configuration and/or the RS configuration;

FIG. 23 is a diagram illustrating another representative procedure for paging using an updated EPI configuration and/or an updated RS configuration.

DETAILED DESCRIPTION

Example Networks for Implementation of the Embodiments

Certain embodiments may be implemented in autonomous and/or semi-autonomous vehicles, robotic vehicles, cars, IoT gear, any device that moves, or a WTRU or other communication devices, which, in turn, may be used in a communication network. The following section provides a description of some exemplary WTRUs and/or other communication devices and networks in which they may be incorporated.

Figure 1A:
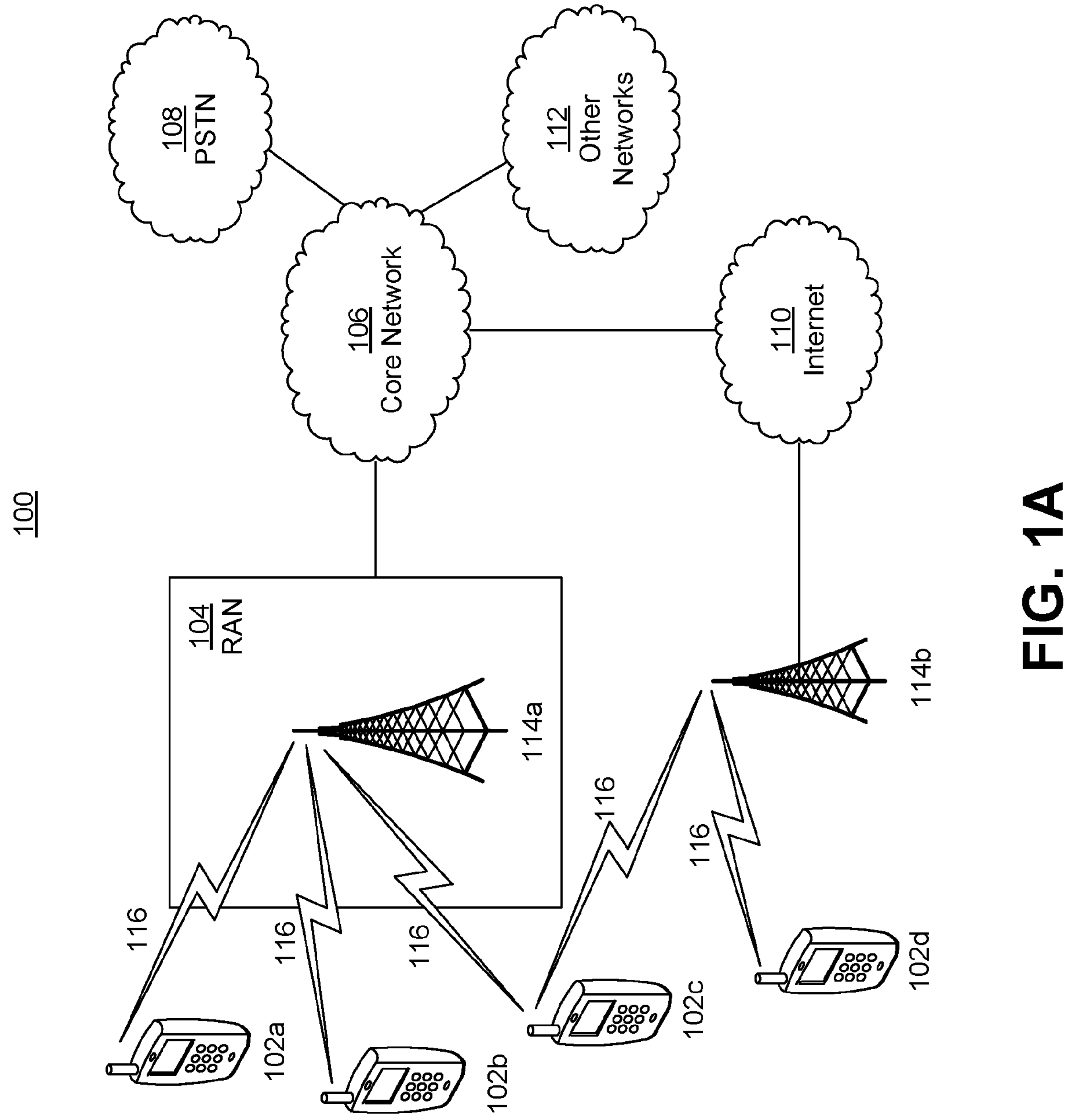
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B (end), a Home Node B (HNB), a Home eNode B (HeNB), a gNB, a NR Node B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an end and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
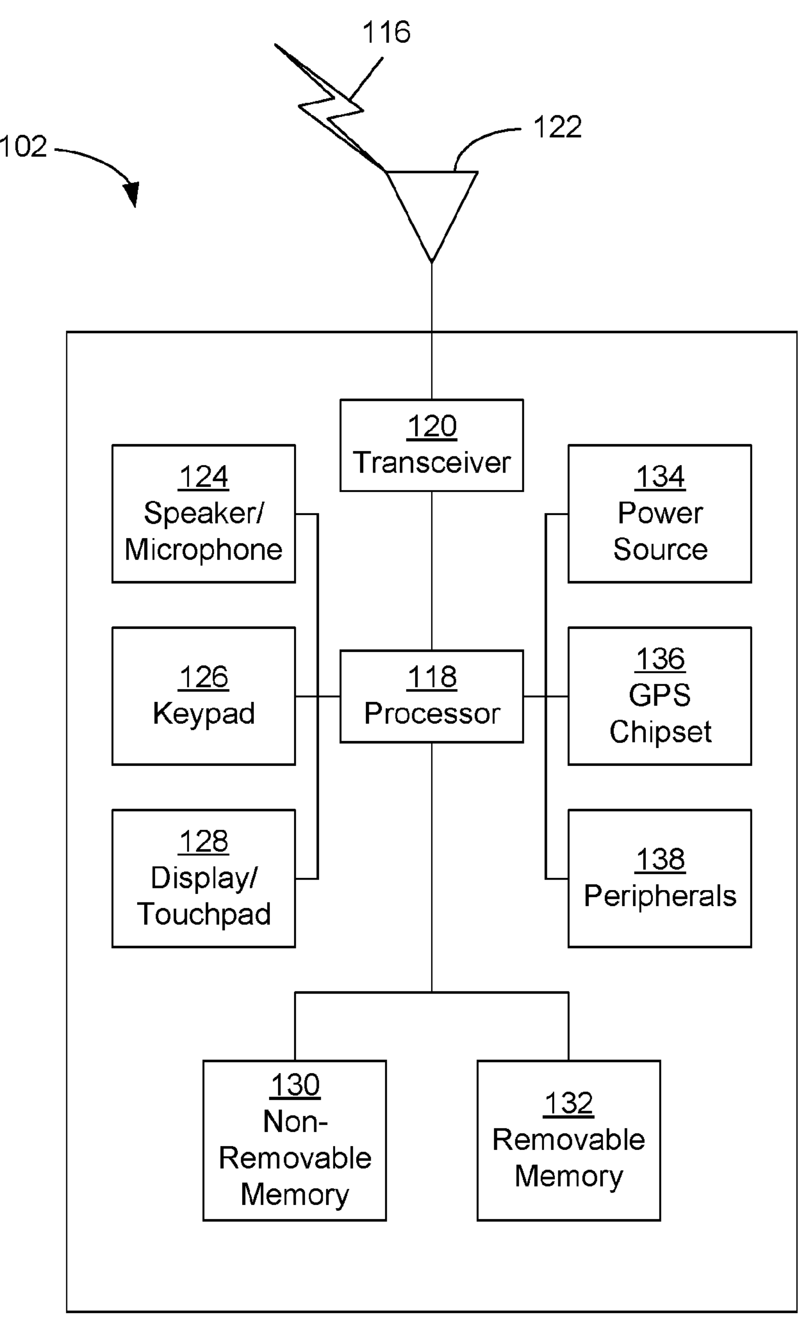
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD)

memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The processor 118 of the WTRU 102 may operatively communicate with various peripherals 138 including, for example, any of: the one or more accelerometers, the one or more gyroscopes, the USB port, other communication interfaces/ports, the display and/or other visual/audio indicators to implement representative embodiments disclosed herein.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
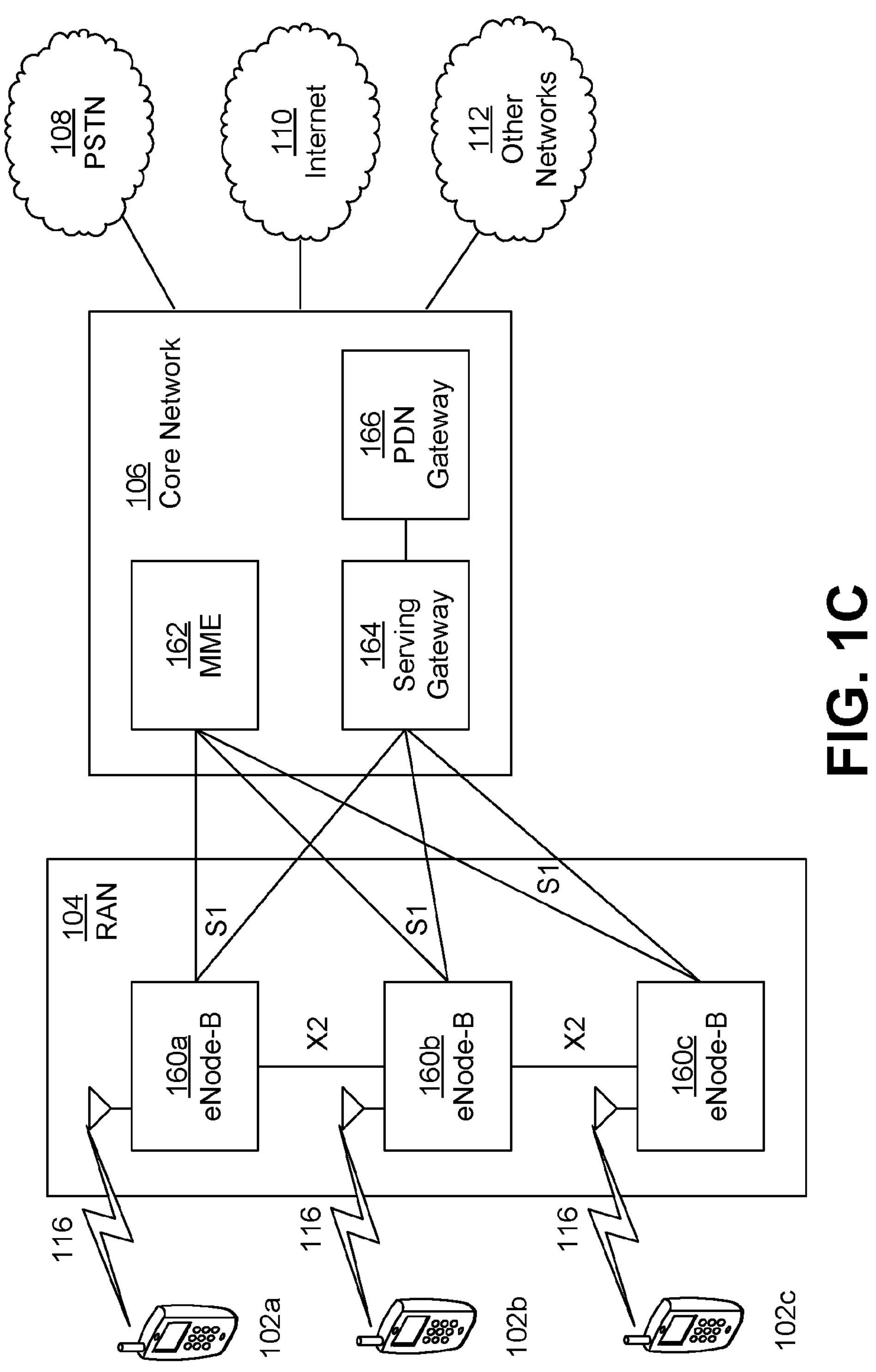
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode Bs 160*a*, 160*b*, 160*c*, though it will be appreciated that the RAN 104 may include any number of eNode Bs while remaining consistent with an embodiment. The eNode Bs 160*a*, 160*b*, 160*c* may each include one or more transceivers for communicating with the WTRUs 102*a*, 102*b*, 102*c* over the air interface 116. In one embodiment, the eNode Bs 160*a*, 160*b*, 160*c* may implement MIMO technology. Thus, the eNode B 160*a*, for example, may use multiple antennas to transmit wireless signals to, and/or receive wireless signals from, the WTRU 102*a*.

Each of the eNode Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode Bs 160*a*, 160*b*, 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an “ad-hoc” mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11 af and 802.11 ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11 ah is 6 MHz to 26 MHz depending on the country code.

Figure 1D:
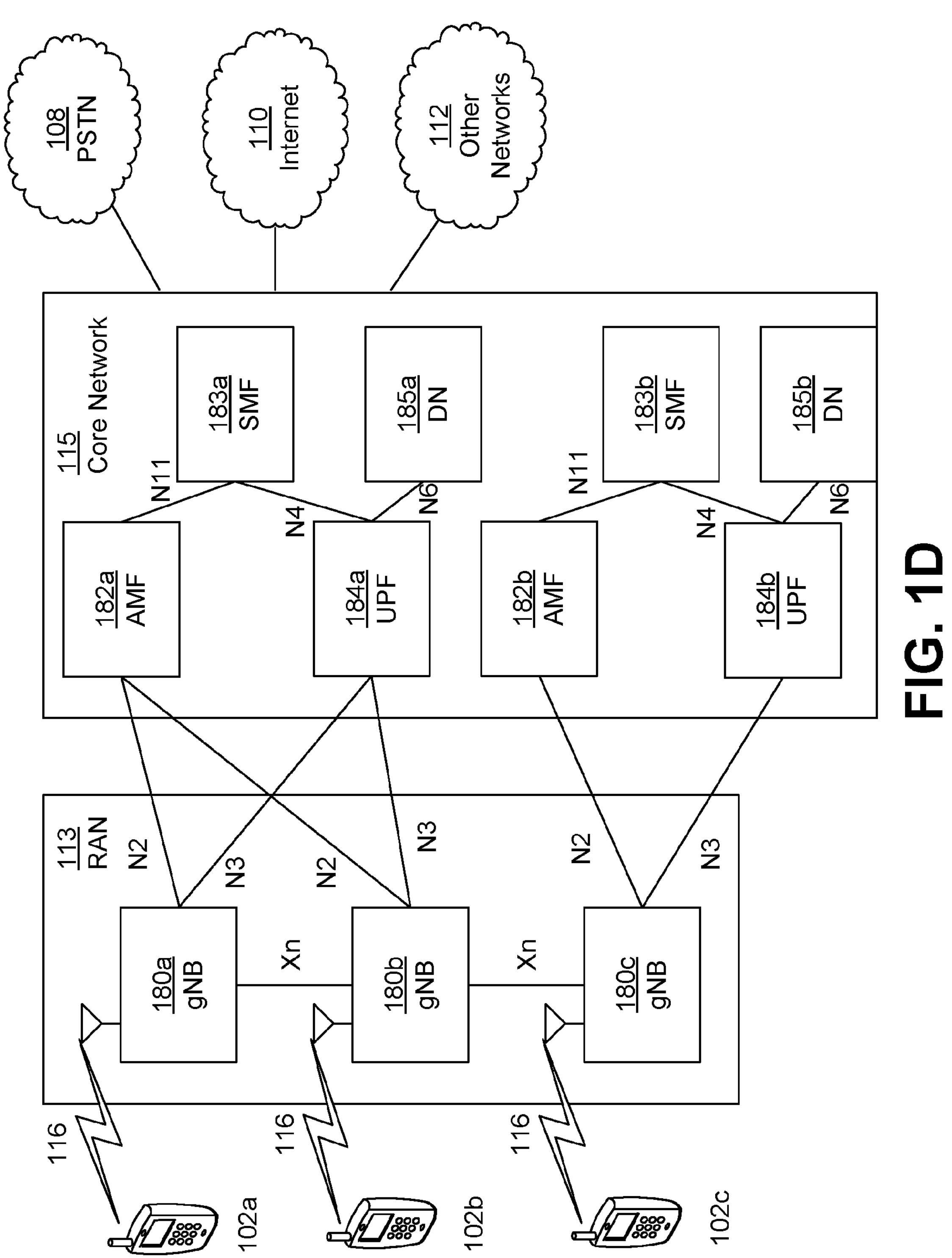
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 180*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology.

For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode Bs 160*a*, 160*b*, 160*c*. For example, WTRUs 102*a*, 102*b*, 102*c* may implement DC principles to communicate with one or more gNBs 180*a*, 180*b*, 180*c* and one or more eNode Bs 160*a*, 160*b*, 160*c* substantially simultaneously. In the non-standalone configuration, eNode Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different Protocol Data Unit (PDU) sessions with different requirements), selecting a particular SMF 183*a*, 183*b*, management of the registration area, termination of Non-Access Stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency communication (URLLC) access, services relying on enhanced mobile (e.g., massive mobile) broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating WTRU 102 IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description, one or more, or all, of the functions described herein with regard to one or more of: WTRU 102*a-d*, Base Station 114*a-b*, eNode B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The following acronyms may be used in connection with the description provided herein.

RRC Radio resource control
SSB Synchronization signal block
SINR Signal to interference noise ratio
DCI Downlink control information
RAN Radio access network
PDCCH Physical downlink control channel
PDSCH Physical downlink shared data channel
CORESET Control resource set
BWP Bandwidth part
EPI Early paging indication
RS Reference signal
CSI-RS Channel state information reference signal
TRS Tracking reference signal
PO Paging occasion
SIB System information block
CE Control element
QCL Quasi colocation In certain representative embodiments, methods, apparatus and systems may be implemented for flexible early paging frequency indication and paging capability for idle and/or inactive mode UEs.

In certain representative embodiments, methods, apparatus and systems may be implemented for flexible early paging frequency indication and paging capability for idle and/or inactive mode UEs.

In certain representative embodiments, a UE may transmit a number (e.g., minimum and/or required number) of (e.g., successive) SSB bursts and/or downlink sequences in order to get in full synchronization (herein otherwise referred to as sync) with the radio interface.

In certain representative embodiments, a UE may receive any of the following higher or lower layer configurations: EPI downlink control information, validity and/or availability information, an indication(s) (e.g., information) of the idle and/or inactive paging-specific RS, pattern and/or resource sets, and availability duration, and/or an indication(s) of any connected-mode paging-specific RS, pattern and/or resource sets, numerology, QCL information and/or availability duration.

In certain representative embodiments, a UE may perform skipping detection and/or sleeping over all or part of the SSB bursts prior to any (e.g., each) paging occasion, upon determining idle and/or connected RS availability.

In certain representative embodiments, a UE may perform detecting and/or synching (e.g., full or partial synch) with any of available connected-mode RS occasions, idle and/or inactive RS occasions and/or part of the SSB bursts.

In certain representative embodiments, a UE may perform monitoring and/or blind decoding of various indicated occasions of the EPI DCI, according to the idle and/or inactive RS specific EPI and/or connected-mode EPI frequency information.

In certain representative embodiments, a UE may assume (e.g., determine) that configured idle-specific RS and/or connected-mode specific CSI-RS, TRS and/or RS occasions are no longer available when corresponding validity and/or availability indication is expired. For example, an idle and/or inactive UE (otherwise herein used to refer to any of a UE operating in an IDLE mode or a UE operating in an INACTIVE mode) may perform monitoring and/or detecting of SSB bursts and/or downlink sequences for synchronization and paging DCIs before each paging occasion.

While certain examples are described herein with respect to energy efficiency of UEs in the context of cellular communications, it should be understood that similar energy efficiency improvements may be realized when such examples are applied in other wireless systems, such as WLAN (e.g., IEEE 802.11 Wi-Fi) systems.

Radio Resource Control States

During the early stage of the 5G NR specifications of Release-15, there have been several refinements to the radio resource control (RRC) layer. One of the enhancements is the introduction of the INACTIVE RRC state in order to minimize the power consumption and latency of UEs attempting to access the radio interface. There are three (e.g., major) RRC states as follows:

- RRC IDLE: The network RAN and core networks are unaware about the UE status and mobility. No measurements, reports nor mobility control may be required. The UE context information may not be saved at any gNB of the network. The UE location may be only known to the access and mobility function entity (AMF) on the RAN notification area level, which may include a set of neighbouring gNBs in a surrounding geographical area. Idle mode UEs may continuously (e.g., periodically) monitor the experienced coverage levels of a current selected cell as well as the neighbouring cells and accordingly, idle mode UEs may execute cell reselection operations.
- RRC INACTIVE: The network RAN part is fully unaware of the UE status, and mobility. However, the network core entities keep UE context information such as its own subscription information, access priority, ciphering keys, etc. The network core is still fully aware about the UE information. Therefore, when an inactive mode UE attempts transitioning to the connected state (e.g., for payload transmission and/or reception), only the RAN part needs to be established. This way, a faster and less energy consuming transition to the connected state is achieved. The Release-15 specifications define multiple triggers and ways for UEs to roll back to the RRC inactive state.
- RRC CONNECTED: The UE full status is fully known and controlled by the network. The exact serving cell of the connected UE is determined, measured, and active for its ongoing transmission. UE mobility is fully controlled by the network as well.

Paging Procedure in 5G NR Systems

Ideally, UEs in idle and inactive mode should be deep sleeping (e.g., shutting down their transceiver ends) as long as there is not incoming traffic for them. However, for those UEs to notified and/or made aware of an incoming downlink payload, the network may configure idle and/or inactive UEs with a periodic set of paging occasions within certain frames (e.g., sets of frames), where an idle and inactive UE should periodically wake up, monitor, and determine whether there is a paging indication. Specifically, in RRC IDLE and/or INACTIVE modes, UEs are continuously waking up, according to the configured paging cycle, in order to check if single and/or multiple UEs are being paged in a current paging occasion. A UE may follow three steps before transitioning to RRC CONNECTED state for getting paged as follows:

1. As a UE may be out of sync with the radio interface, due to the long sleep period, the UE may first attempt re-synching with the NR radio interface by detecting at least a single synchronization signal block (SSB). Different UEs, with different implementations (e.g., from various UE vendors) may require a different number of SSBs and/or radio sequences before achieving a full sync with the network. For instance, a UE in good signal-to-interference-noise-ratio (SINR) conditions may be able to re-sync with the radio network by detecting a single SSB and/or sequence signal. A UE in poor SINR conditions may require additional SSB instances to re-sync.
2. After a UE is in full sync with the RAN, the UE may attempt to blindly decode the paging downlink control information (DCI), sent on possible physical downlink control channel (PDCCH) occasions (e.g., occasions pre-configured by higher layers). The paging DCI implies an indication to the idle and/or inactive UE that there is at least a single UE with incoming traffic in the downlink direction. In case there is NO paging DCI detected over the PDCCH resources, the idle and/or inactive UE may assume that there is no paging in the current paging opportunity, and hence, continue sleeping until the next paging occasion.
3. If an idle and/or inactive UE detects the presence of the paging DCI in the paging occasion, the UE may decode the subsequent physical downlink shared channel (PDSCH) data resources to read a paging record. The paging record is an indication of the ID or IDs of any idle and/or inactive UEs that are getting paged. From the UE perspective, if the paging record contains its own temporary ID, the corresponding UE may trigger a random-access procedure in order to switch to the RRC CONNECTED state.

There may typically be multiple trade-offs to achieve a decent paging performance. The frequency of the paging occasion and paging DCI may impact the paging performance. For example, more frequent paging occasions and paging DCIs may lead to less packet buffering delay. However, frequent (e.g., more frequent) paging may cause the UE to wake up more frequently, impacting battery consumption performance and/or PDCCH capacity consumption. More frequent paging DCIs may implicate a larger size of the PDCCH CORESET, and hence, less remaining PDCCH resources for other control and scheduling information, and overall, less bandwidth part data resources of the data transmissions over the PDSCH. A more flexible procedure for delivering the paging information may be vital for achieving improved paging performance, and power saving gains at UEs, while also avoiding overloading (e.g., excessive consumption of) network resources by DCI. Certain representative embodiments disclosed herein may realize such advantageous effects.

Power Saving Enhancements for Idle and/or Inactive UEs

Enhancing the battery consumption performance of idle and/or inactive UE paging (e.g., power saving capabilities) is vital for current and future cellular networks such for 5G NR and beyond. In certain representative embodiments, refinements may be made which may improve procedures which involve early paging indication and/or assistance paging-specific RSs. Such improvements may be applicable to 5G NR systems and/or future generation systems.

An idle and/or inactive mode UE may (e.g., always) wake up during a paging occasion to detect paging DCI, such as by blindly decoding possible PDCCH opportunities. If there is no paging indication (e.g., in the DCI), the UE may return to sleeping until the next paging occasion. Such blind decoding procedure may draw a considerable amount of battery life at the UE and/or may be unnecessary in cases where the UE is not actually paged.

An early paging indication (EPI) DCI may be provided which precedes a paging occasion. The EPI DCI may indicate whether if there is a paging DCI over (e.g., to be transmitted) over a PDCCH opportunity or not. If there is a false EPI and/or EPI DCI is not present, a UE may assume that at least its paging group is not paged and may return to sleeping (e.g., deep sleeping) until a next paging occasion. Dynamic EPI enabling procedures are described herein which may advantageously achieve satisfactory UE-specific and/or paging group-specific battery performance gains (e.g., power savings) and/or may advantageously avoid transmission of unnecessary and/or excessive control information (e.g., EPI DCI) by the network.

An idle and/or inactive mode UE may wake earlier before each paging occasion to get in full sync with the network. Without being fully synchronized with the RAN, the idle and/or inactive mode UE may not be able to detect any of the EPI DCI, paging DCI and/or paging record. For example, different UEs (e.g., from different vendors and/or in different SINR conditions) may require detecting various numbers of synchronization signal blocks (SSBs) before a paging occasion. Transmission of SSBs may, generally, have a fixed large periodicity (e.g., a minimum of 20 ms). This may cause the idle and/or inactive mode UE to wake up over a duration of multiple SSBs' periods before each paging occasion which may present a significant power saving limitation at the UE.

The network (e.g., gNB) may transmit assistance paging-specific RSs (otherwise referred to herein as aiding paging-specific RSs) that may be close in time to each of the paging occasions, where an idle and/or inactive mode UE may (e.g., only) wake up just slightly beforehand. Semi-static, dynamic and/or hybrid procedures involving paging-specific reference signals are described herein and may be applicable to 5G NR systems and/or future generation systems.

First, idle and/or inactive mode UEs (e.g., in IDLE or INACTIVE RRC mode) may have certain requirements for syncing with the radio interface before detecting a paging occasion. For high-quality UEs and/or UEs in good SINR conditions, a single SSB and/or sequence detection may be sufficient to achieve a full synchronization with the network before being able to read a following paging occasion. For other low-quality UE and/or UEs in poor SINR conditions, multiple SSB and/or sequence detections may be needed before being able to read a following paging occasion.

The DCI of the early paging indication (EPI) may be transmitted after (e.g., right after) each SSB and/or sequence burst. This may enhance the paging performance at the expense of an overwhelmed PDCCH and/or CORESET capacity of a default bandwidth part (BWP) and/or a BWP over which the paging indication is being transmitted. It may be undesirable to impact the PDCCH and/or CORESET capacity in this manner since the default and/or paging BWP capacity is vital for all other idle and/or inactive UEs as well as connected UEs which share the same BWP(s) for ongoing transmissions.

The DCI of the early paging indication (EPI) may be transmitted after (e.g., right after) a single SSB burst and/or with a fixed pattern of multiple SSB burst(s) of a SSB group prior to the paging occasions. This may relax the PDCCH capacity of the relevant BWP. Though, this may also degrade the paging power saving performance of idle and/or inactive UEs since some low-SINR and/or low quality UEs may not be able to blindly decode the EPI DCI because the UEs are still out of sync with the radio interface. In such cases, those (e.g., out-of-sync) UEs may typically assume the worst case, an proceed by reading the maximum number of SSB bursts before the paging occasion, and accordingly, reading the paging DCI and/or paging record. Such procedure may prevent any power saving gain from being realized reaped.

In short, a framework of having a fixed (e.g., fixed pattern) EPI delivery structure may limit power saving gains at any idle and/or inactive mode UEs and/or may adversely impact the PDCCH and/or CORESET capacity of the BWP (s) used for paging. Thus, there is a need for a flexible EPI DCI delivery procedure such that the network may be able to dynamically trade off between PDCCH and/or CORESET capacity of the paging BWP and time-varying paging performance of any idle and/or inactive UEs.

Second, idle and/or inactive mode UEs (e.g., in IDLE or INACTIVE RRC mode) may be required to wake up before each occasion of the paging DCI, such as to become synchronized with the radio interface. Idle and/or inactive mode UEs may typically rely on detecting a single or multiple SSB bursts and/or sequences that are transmitted prior to the paging occasion for that purpose. In such cases, these UEs may be caused to wake up too early before an actual paging occasion in order to detect the periodic SSB signals. For example, an idle UE (e.g., UE in idle RRC mode) that needs to detect three SSBs before a paging occasion may wake up 80 ms before the paging DCI occasion, assuming a 20-ms periodicity of the SSB block transmission (e.g., a standardized periodicity). This may prevent idle and/or inactive mode UEs from deep sleeping for extended period of times. It may be expected that a significant power saving loss occurs when a low SINR and/or low quality idle UE wakes up for 80 ms (e.g., a duration of three SSBs) but is not actually paged and may skip the paging record. Using an 80 ms wake up period, for example, may be unnecessary and provides an opportunity to improve UE power loss in view of the above.

Connected mode channel state information reference signals (CSI-RS), tracking reference signals (TRS) and/or another (e.g., generic) reference signal (RS) (otherwise referred to herein as CSI-RS/TRS/RS or CSI-RS, TRS and/or RS) may be considered as an alternative to using SSBs to resync (e.g., resynchronize) the idle and/or inactive mode UEs before a paging occasion. Power saving gains may mainly come from locating CSI-RS/TRS/RS occasions close (e.g., as close as possible) in time to the actual paging occasions. This may allow for the idle and/or inactive UEs avoid waking up too early before a paging occasion. However, there may be several considerations to be addressed to achieve such designs.

For example, an idle and/or inactive UE may need to quickly and/or efficiently become aware of CSI-RS/TRS/RS signal presence. This may allow the UE to reliably enter a deep sleep (e.g., state) over certain one or more SSBs prior to a paging occasion, given that the CSI-RS/TRS/RS signal presence may be guaranteed to be transmitted before paging DCI. Otherwise, from the UE perspective, if the presence of the CSI-RS/TRS/RS signals is dynamically configured and not necessarily guaranteed, the UE may always assume a worst case, as there is no CSI-RS/TRS/RS available. Hence, the UE may wake up over the SSB bursts before each paging occasion. Such behaviour may limit the achievable power saving gain at the UE although (e.g., despite) the network transmits (e.g., informs) CSI-RS/TRS/RS occasions for the idle and/or inactive UE.

Sharing the CSI-RS/TRS/RS of connected mode UEs with idle and/or inactive mode UEs may be mainly conditioned on the availability of CSI-RS/TRS/RS signal(s) and/or the configuration alignment of available CSI-RS/TRS/RS signal(s) with a BWP where paging is performed. For example, the availability of a CSI-RS/TRS/RS signal may be at a time (e.g., before the paging occasion) when an idle and/or inactive UE is expected to re-sync with the radio interface. For example, available CSI-RS/TRS/RS signals of a connected mode UE may be from a different BWP than a default and/or paging BWP. Hence, those BWPs may be configured with a different numerology setting (e.g., subcarrier spacing configuration) and/or different quasi-colocation (QCL) setting than the default and/or paging BWP. Therefore, an idle and/or inactive UE may skip such CSI-RS/TRS/RS occasions since the UE may not be able to process multiple signals with different numerologies right after one another. This may lead to CSI-RS/TRS/RS sharing being less useful to any idle and/or inactive UEs and most dangerously, if such knowledge is not passed to idle and/or inactive UE with sufficient advance notice (e.g., early enough), an idle and/or inactive UE may completely miss a subsequent paging occasion since the idle and/or inactive UE may be dependent on the presence of a non-aligned CSI-RS/TRS/RS occasion.

In short, transmitting a fixed pattern and/or periodic (e.g., always-on) paging-specific RSs before each paging occasion may impose (e.g., significant) limits on the PDSCH capacity of the paging BWP. Moreover, sharing connected-mode CSI-RS/TRS/RS signals with idle and/or inactive UEs may lead to further challenges, and may invertedly lead to further degradation of the UE battery consumption performance such as when the UE configurations are misaligned with the paging BWP. Providing a flexible procedure for delivering paging-specific RSs and/or sharing connected-mode CSI-RS/TRS/RSs with idle and/or inactive UEs may be important to realizing decent power saving gains at the idle and/or inactive UEs.

In certain representative embodiments, methods, apparatus and systems may implement flexible procedures for early paging indication (EPI). These procedures may allow the network to manage (e.g., dynamically trade-off) paging performance and/or UE power performance with PDCCH and/or CORESET capacity of a paging BWP. In certain representative embodiments, methods, apparatus and systems may implement signaling procedures (e.g., with a idle and/or inactive UE) for paging-specific reference signals. Such reference signals may include, but are not limited to, CSI-RSs and/or tracking reference signals (TRS). Such procedures may provide enhancements to achieve power saving at any idle and/or inactive UEs.

As used herein, paging bandwidth part (BWP) may refer to a (e.g., generic or particular) radio BWP over which a paging procedure and corresponding signaling maybe executed (e.g., transmitted and/or received). For example, in 5G NR at this time, the paging BWP may be a configured BWP of the radio interface.

As used herein, QCL may refer to QCL configurations which define how different transmitted signals relate to each other. For example, a first signal may be indicated to be QCLed to a second signal, this implies that the a UE receiving such second signal may be able to infer and/or deduce channel conditions (e.g., channel estimation) from receiving the first signal, knowing their QCL configurations. Without loss of generality, in 5G NR at this time, QCL may be defined by several QCL types, where each type indicates that at least two signals are QCLed in terms of the channel doppler shift, doppler spread, average delay, and/or delay spread. For example, PDCCH control transmissions may be QCLed with the former SSB signals. In turn, a UE may use a similar channel estimate of the SSB in order to decode the PDCCH. From the UE' perspective, both PDCCH and SSB transmissions may be assumed to have been transmitted from a same antenna port at a serving RAN node (e.g., gNB).

As used herein, PDCCH capacity may refer to that, within a respective BWP, the PDCCH is defined by a control resource set (CORESET) which may be composed of various physical resource block (PRB) sizes and a duration of single or multiple OFDM symbols. For example, a BWP may have up to three CORESETs and a gNB may decide the PDCCH size according to a size of US control information, to be sent to UEs, UE SINR conditions (e.g., which are not known at the gNB side for idle and/or inactive UEs) and/or a size of downlink allocations. The PDCCH capacity may be a bottleneck in radio systems. Increasing the number of control information elements which are transmitted implies a larger CORESET size within a BWP which accordingly reduces the available CORESET size for other data allocation information. Furthermore, always utilizing a maximum CORESET size of each BWP implies less resources are available for data transmission, and hence, reduces useful spectral efficiency.

As used herein, blind decoding (e.g., PDCCH blind decoding) may refer to a channel (e.g., the PDCCH) being used indicate to UEs about upcoming downlink or uplink assignments and the corresponding radio configurations. PDCCH transmissions, and respective downlink control information (DCI) have wide sets of formats and sizes in bits. For example, the network may need to send a large amount of DCI bits (e.g., long DCI formats) in some cases. In some other cases, the network may need to send a small amount of DCI bits (e.g., short DCI formats). In both cases, the format and/or structure of the PDCCH transmission as well as the corresponding size may dynamically vary in time. However, as a general matter, UEs may not be aware of such dynamic adaptation. Hence, UEs may be configured (e.g., by high level signaling) about several common and UE-specific resource candidates of the PDCCH transmissions, where UEs perform continuous monitoring and blind decoding attempts, using their assigned RNTI ID. The blind decoding implies that UEs, at the time of the decoding, are not truly aware if any such PDCCH transmission is intended for them or not. For example, if a UE detects a CRC error after the decoding operation, the UE may skip such a PDCCH candidate. In general, blind decoding is not energy efficient, and hence, a number of the UE blind decoding operations may be minimized to improve UE battery consumption.

As used herein, CSI-RS, TRS, and/or RS may refer to a (e.g., generic or particular) reference signal transmitted from the RAN node (e.g., gNB) to be used at the UE to estimate their channel conditions and/or to get in a synchronized state (e.g., full sync) with the network. CSI-RS/TRS/RS may be dynamically scheduled and transmitted in the downlink direction. Reference signal transmission as used herein includes, but is not limited to, channel state information reference signals (CSI-RS) and/or tracking reference signals (TRS).

As used herein, an idle and/or inactive RS may refer to any connected mode RS and any paging-specific RS unless noted otherwise.

As used herein, an idle and/or inactive UE may refer to any UE which is in an idle mode and any UE which is in an inactive mode.

As used herein, timing resources may refer to contiguous or non-contiguous portions of the time domain.

As used herein, frequency resources may refer to contiguous or non-contiguous portions of the frequency domain.

Early Paging Information Delivery Procedures

Dynamic procedures may be performed for the EPI DCI delivery to an idle and/or inactive UE of different SINR conditions. For example, a UE may determine and send a minimum number of SSB burst and/or sequence detections (e.g., required) prior to a paging occasion to get in full sync with the network. Indication of this information (e.g., number) may be UE-specific and/or may be dependent on UE-specific channel conditions and/or transceiver capabilities. The network (e.g., gNB) may dynamically configure an idle and/or inactive UE with a flexible occurrence and/or signaling frequency of the EPI DCI based on any of actual paging performance, time-varying paging rate, and/or the PDCCH and/or CORESET available capacity of a BWP (e.g., the BWP over which the paging is executed). For example, in highly SINR degraded conditions, the network (e.g., gNB) may transmit the EPI DCI after each SSB/sequence block (e.g., trading off the PDCCH/CORESET capacity for improving paging and power consumption performance). In good and/or ideal SINR conditions, the EPI DCI may be transmitted (e.g., only transmitted) after a subset of n SSBs/sequences prior to a paging occasion. The network (e.g., gNB) may dynamically configure the idle and/or inactive UE with an EPI frequency configuration (e.g., EPI frequency indication). For example, an EPI frequency indication may be configured relative to a (e.g., each) paging occasion and/or a (e.g., each) set of paging occasions.

Figure 2:
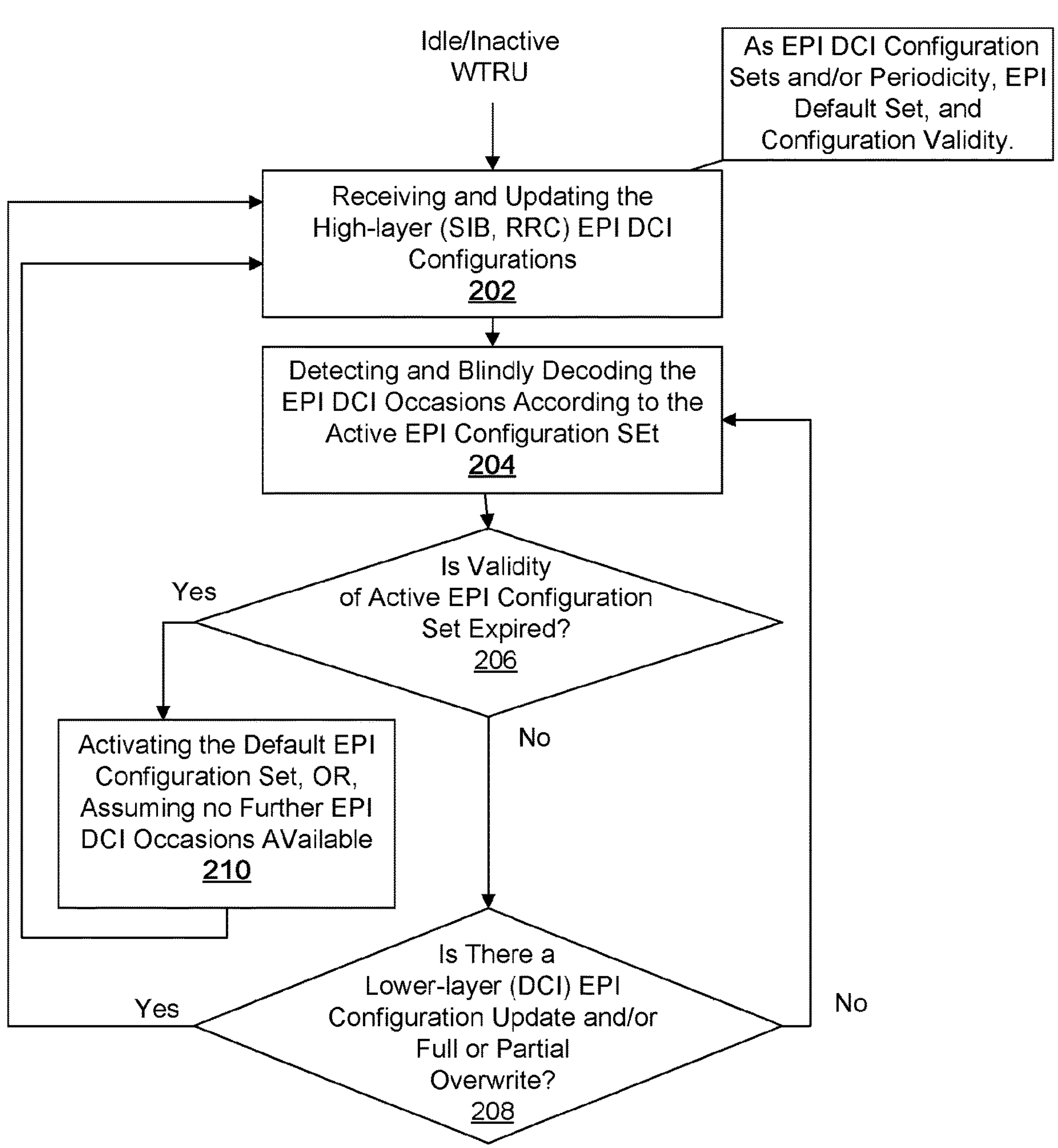
FIG. 2 is a diagram illustrating a representative procedure for configuring early paging information (EPI) downlink control information (DCI) which may be implemented at a WTRU.

FIG. 2 is a diagram illustrating a representative procedure for configuring early paging information (EPI) downlink control information (DCI) at a WTRU 102 (e.g., a UE). As shown in FIG. 2, the procedure may be implemented at the UE when the UE is in inactive mode and/or when the UE is in idle mode (e.g., after receiving a RRC connection release message). The procedure for the idle and/or inactive UE may then proceed to receiving (e.g., from a gNB) any high-layer configurations (e.g., via system information and/or RRC signaling) of an EPI DCI frequency and/or availability/validity information at 202. For example, this information may be received in terms of multiple EPI configuration sets, an EPI DCI periodicity, a default EPI configuration set, and/or the configuration availability duration. For example, the information may be scrambled with any of a common paging RNTI (e.g., a paging ID) and/or a paging-group-RNTI (e.g., a group-based ID). The UE may then proceed, at 204, to determining a current (e.g., active) EPI configuration set based on the received (e.g., latest) EPI DCI. The UE may then perform detecting of a (e.g., any) EPI DCI occasions according to the active EPI DCI configuration set and blind decoding thereof. After, the UE may determine whether the active (e.g., current) EPI configuration set is valid or not (e.g., expired or not) at 206. If the active (e.g., current) EPI configuration set is still valid (e.g., not expired), the procedure may continue to where the UE determines whether there is a lower-layer (e.g., DCI) EPI configuration update and/or whether there is a full or partial overwrite of the active DPI configuration at 208. For example, the UE may be reconfigured by a lower-layer (e.g., DCI) signaling to update the current active EPI DCI configuration. If there is no lower-layer EPI configuration, the procedure may return to the detecting and blind decoding of EPI DCI occasions according to (e.g., using) the active EPI configuration set. If the active (e.g., current) EPI configuration set is no longer valid (e.g., expired), the UE may proceed to activating a default EPI configuration set (e.g., if the default EPI configuration set has been configured) at 210 and attempt detecting and decoding of any EPI DCI occasions corresponding to the default EPI DCI configuration set. If the active (e.g., current) EPI configuration set is no longer valid (e.g., expired), the UE may in addition to, or in the alternative, proceed to always decoding any paging DCI, such as when it is assumed or determined that no further EPI DCI occasions are available to be detected at 210. After, the UE may again return to receiving (e.g., from a gNB) any high-layer configurations (e.g., an update via system information and/or RRC signaling) of an EPI DCI frequency and/or availability/validity information as described herein.

The UE may be reconfigured by a lower-layer (e.g., DCI) signaling to update the current active EPI DCI configuration. As described herein, the UE may be configured multiple EPI configuration sets, EPI DCI periodicity, default EPI configuration set, and/or configuration availability duration. For example, the UE may use the lower-layer signaling to de-activate the current EPI DCI configuration and/or to activate another EPI DCI configuration among any configured EPI configuration sets.

Figure 3:
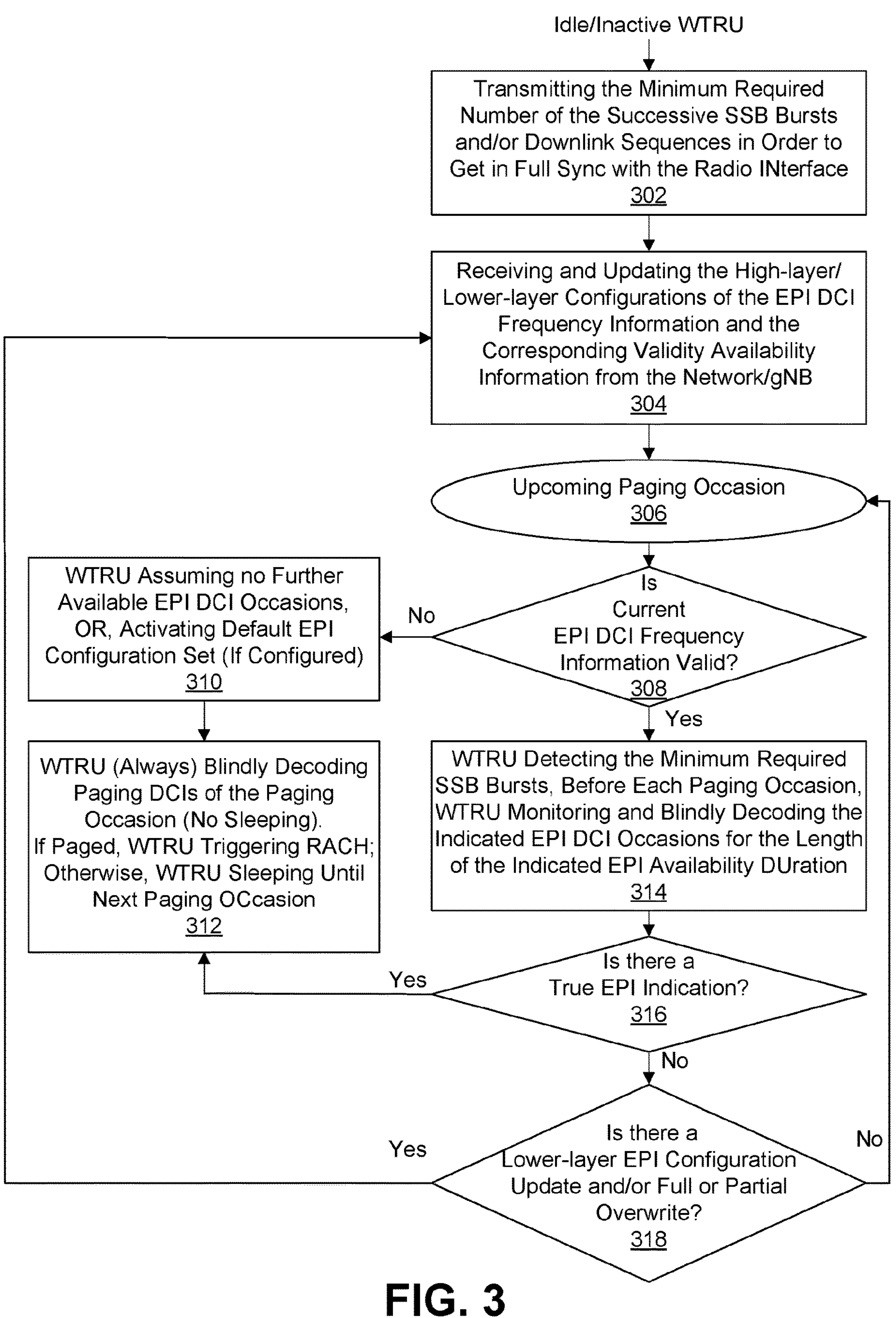
FIG. 3 is a diagram illustrating another representative procedure for configuring early paging information (EPI) downlink control information (DCI) which may be implemented at a WTRU.

FIG. 3 is a diagram illustrating another representative procedure for configuring EPI DCI which may be implemented at a WTRU (e.g., a UE). As shown in FIG. 3, the procedure may be implemented at the UE when the UE is in inactive mode and/or when the UE is in idle mode. The procedure for the idle and/or inactive UE may then proceed to transmitting a number (e.g., minimum required number) of the successive SSB bursts and/or downlink sequences to get in synchronization (e.g., full sync) with the radio interface at 302. The procedure for the idle and/or inactive UE may then proceed to receiving (e.g., from a gNB) and/or updating any high-layer configurations (e.g., via system information and/or RRC signaling) of an EPI DCI frequency and/or any corresponding availability/validity information from the network (e.g., the gNB) at 304. For example, this information may be received in terms of multiple EPI configuration sets, an EPI DCI periodicity, a default EPI configuration set, and/or the configuration availability duration. For example, the information may be scrambled with any of a common paging RNTI (e.g., a paging ID) and/or a paging-group-RNTI (e.g., a group-based ID). After, the UE may wait until an upcoming paging occasion at 306. Then, the UE may determine whether received (e.g., current) EPI DIC frequency information is valid or not at 308. On condition that the current EPI DCI frequency information is not valid, the UE may then assume that there are no further available EPI DCI occasions and/or may activate a default EPI configuration set at 310. For example, the UE may activate the default EPI configuration set on condition that the default EPI configuration set was previously configured (e.g., pre-configured). Then, the UE may proceed to perform blind decoding of any paging DCI(s) of the paging occasion (e.g., without sleeping). On condition that the UE determines that it is being paged (e.g., based on the blind decoding result), a RACH procedure may be triggered at (e.g., by) the UE. Otherwise, on condition that the UE is determined to not be paged, the UE may be triggered to sleep until a next upcoming paging occasion at 312.

In FIG. 3, on condition that the current EPI DCI frequency information is determined to be valid at 308, the UE may proceed to perform detecting of a number (e.g., minimum required number) of the successive SSB bursts and/or downlink sequences, before any (e.g., each) paging occasion. The UE may also perform monitoring and blind decoding of any indicated EPI DCI occasions at 314. The monitoring and blind decoding may be performed for a length of the indicated EPI availability duration. After, the UE may determine whether the EPI indication is true or not at 316. For example, the presence of EPI DCI information resulting from the blind decoding may indicate to the UE that the UE, a UE group that the UE belongs to and/or all idle and/or inactive UEs is/are being paged. For example, the presence of EPI DCI information resulting from the blind decoding may indicate to the UE that the UE, the UE group that the UE belongs to and/or all idle and/or inactive UEs is/are being paged.

On condition that the EPI indication is not true (e.g., not present), the UE may proceed to determine whether or not any lower-layer (e.g., DCI) EPI configuration update is received or not (e.g., by DCI signaling) at 318. The UE may also determine whether the lower-layer EPI configuration update is a full or partial overwrite (e.g., of any of the higher layer configurations) of the EPI frequency indication and/or the EPI DCI availability/validity information. On condition that a lower-layer (e.g., DCI) EPI configuration update has not been received by the UE, the procedure may wait (e.g., sleep) until a next paging occasion. On condition that a lower-layer (e.g., DCI) EPI configuration update has been received, the UE may proceed to update any of the high-layer and/or lower-layer configurations of the EPI DCI frequency information and/or the corresponding validity/availability information (e.g., a full or partial overwrite of the prior configuration).

On condition that the EPI indication is true (e.g., present), the UE may proceed to perform blind decoding of any paging DCI(s) of the paging occasion (e.g., without sleeping). On condition that the UE determines that it is being paged (e.g., based on the blind decoding result), a RACH procedure may be triggered at (e.g., by) the UE. Otherwise, on condition that the UE is determined to not be paged, the UE may be triggered to sleep until a next upcoming paging occasion.

The UE may be reconfigured by the lower-layer (e.g., DCI) signaling to update the current active EPI DCI configuration. For example, the UE may use the lower-layer signaling to de-activate and/or to activate EPI DCI configurations among any configured EPI configuration sets.

In certain representative embodiments, an idle and/or inactive UE may transmit (e.g., to the RAN) a number (e.g., a minimum required number) of the successive SSB bursts and/or downlink sequences to get in full sync with the radio interface. Such signaling is in the uplink direction and may be included in (e.g., indicated in), but not limited to, an uplink control channel and/or an uplink data channel, during cell camping, during connection establishment, and/or during connection resumption, and/or random access of the radio interface.

In certain representative embodiments, an idle and/or inactive UE may receive one or more EPI DCI configurations. For example, the UE may be configured by a high-layer (e.g., SIB, RRC) and/or lower-layer (e.g., DCI) configurations of the EPI DCI frequency information and/or the corresponding validity/availability information from the network (e.g., gNB) in the downlink direction.

The EPI frequency information may indicate the idle and/or inactive UE when to expect to monitor and blindly decode an EPI DCI transmission compared to the SSB burst group prior to each single and/or set of paging occasions. As an example, multiple EPI configuration sets may be predefined, such as where each set implies a certain DCI EPI frequency and/or periodicity prior to each paging occasion. The UE may be configured with a EPI DCI configuration set and/or a default set to activate and/or expect (e.g., for a next paging occasion). As another example, a vector or a series of bits of a size corresponding to a number of the SSB bursts/sequences to be monitored for EPI DCI prior to a paging occasion may be indicated to the UE.

The validity/availability information may indicate to the UE as to how long the EPI frequency information is to hold true (e.g., used at the UE). The validity/availability information may be indicated in terms of a number of future paging occasions, paging frames, system frame number and/or an expiry time.

For example, the EPI DCI, EPI DCI frequency information and/or corresponding validity/availability information (or indications thereof) may be scrambled by a paging-group-specific RNTI such that the idle and/or inactive UE may (e.g., only) be able to blindly decode such DCI (e.g., without CRC errors) on condition that the scrambled RNTI is the same as the UE configured paging group. An advantage of such an arrangement is that a UE, that could not decode the EPI DCI information, may assume (e.g., determine) that they and/or the paging group UEs have not been paged. The UE may then enter a deep sleep and may not blindly decode the paging DCI. However, such an arrangement may require additional bits of the EPI DCI to indicate the paging group information.

As another example, the EPI DCI, EPI DCI frequency information and/or corresponding validity/availability information (or indications thereof) may be scrambled by a common paging RNTI such that the idle and/or inactive UE may be able to decode the EPI DCI. An advantage of this arrangement is the smaller size of the EPI DCI as no EPI DCI group information may be needed. In some cases, this arrangement may lead to an increase in a number of paging false alarms.

In certain representative embodiments, an idle and/or inactive UE may detect a single and/or multiple SSB bursts/downlink sequences until they get in full sync with the network.

In certain representative embodiments, an idle and/or inactive UE may expect (e.g., determine) to decode paging-common and/or paging-group-specific EPI DCI occasions according to the indicated EPI frequency information over the availability period and/or timer, such as may be signaled by the higher and/or lower layer configurations.

In certain representative embodiments, an idle and/or inactive UE may blindly decode the available EPI DCI occasions and may identify if they or their respective paging group is being paged or not.

In certain representative embodiments, an idle and/or inactive UE may skip detecting and/or sleep over some part of the paging DCIs, such as during the paging occasions, based on the indicated EPI DCI.

In certain representative embodiments, an idle and/or inactive UE may be re-configured (e.g., receive another EPI DCI configuration) such as by a lower layer DCI signaling procedure. The re-configuration may preemptively update and/or overwrite the former higher layer configurations of the EPI frequency indication and/or EPI DCI availability.

In certain representative embodiments, an idle and/or inactive UE may have the availability of a former EPI DCI frequency configuration expire. The UE may assume (e.g., determine) that no further EPI DCI occasions are available, and/or revert back to a legacy paging procedure. After, the UE may perform monitoring and/or detection of SSBs and paging DCI occasions prior to each paging occasion (e.g., without EPI DCI monitoring). For example, the UE may be pre-configured to expect (e.g., activate) a default EPI DCI configuration set. The UE may proceed to detect any EPI DCI occasions following the default EPI configuration set.

At the network side, a network access point (NAP) (e.g., a gNB) may perform procedures to configure an idle and/or inactive UE with EPI information as described herein. In certain representative embodiments, the NAP (e.g., gNB) may receive a number (e.g., a UE-specific minimum required number) of the SSB bursts and/or sequences from an idle and/or inactive UE which are needed for the UE to become synchronized (e.g., full sync) with the network before a (e.g., any or each) paging occasion.

In certain representative embodiments, the NAP (e.g., the gNB) may transmit EPI frequency information in the downlink direction (e.g., to one or more UEs). For example, the EPI frequency information may be transmitted in terms of (e.g., including and/or indicating) multiple EPI configuration sets with various (e.g., different) EPI frequency and/or periodicities, a default EPI configuration set, and/or an indication of a current active EPI configuration set for any inactive and/or idle mode UEs. The EPI frequency information may be transmitted via higher layer signaling such as, but not limited to, system information or RRC configuration, or by lower layer signaling such as DCI-based signaling.

For example, an EPI configuration set may denote or include an EPI DCI frequency and/or periodicity prior to a (e.g., any or each) paging occasion. A particular EPI DCI frequency may indicate or imply a vector and/or a series of bits of a size corresponding to a number of the SSB bursts/sequences to be monitored for EPI DCI prior to a paging occasion. For example, an EPI frequency indication of [1 0 1] indicates that the gNB shall be transmitting the DCI for EPI right after the third and first SSBs/sequences prior to each paging occasion.

In certain representative embodiments, the NAP (e.g., gNB) may transmit the EPI DCI validity/availability indication to any idle and/or inactive mode UEs. Such information may be transmitted by either higher layer signaling such as, but not limited to, system information or RRC configuration, and/or by lower layer signaling such as the DCI-based signaling. The validity/availability information may imply a validity period of the current EPI DIC information. The validity period may be configured and/or determined in terms of any of a number of successive paging occasions, paging frames, system frame numbers, and/or an expiry timer.

Figure 4:
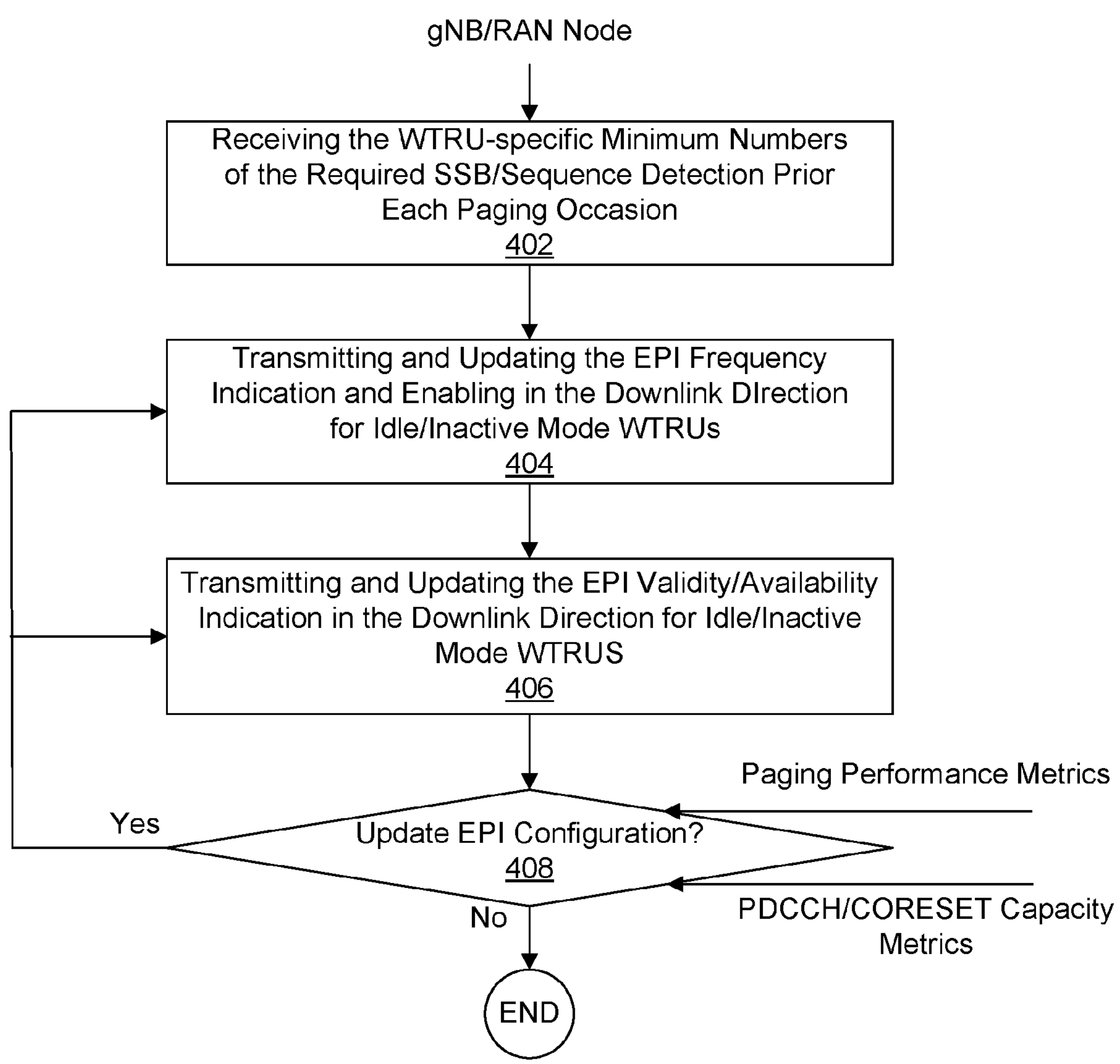
FIG. 4 is a diagram illustrating a representative procedure for configuring early paging information (EPI) downlink control information (DCI) which may be implemented at a RAN.

FIG. 4 is a diagram illustrating a representative procedure for configuring early paging information (EPI) downlink control information (DCI) which may be implemented at a RAN (e.g., gNB). As shown in FIG. 4, the procedure may begin with the RAN (e.g., gNB) receiving a number (e.g., minimum required number) of the successive SSB bursts and/or downlink sequences, prior to a (e.g., any or each) paging occasion at 402. For example, the RAN may receive this information from any idle and/or inactive UEs and this information may be UE-specific. After, the RAN may proceed to transmitting the EPI frequency information and/or enabling or disabling (e.g., activating or disactivating) any previously configured EPI frequency information in the downlink direction (e.g., to any one or more UEs), such as by using system information, RRC configuring and/or DCI-based signaling at 404. For example, the EPI frequency information may be transmitted in terms of (e.g., including and/or indicating) multiple EPI configuration sets with various (e.g., different) EPI frequency and/or periodicities, a default EPI configuration set, and/or an indication of a current active EPI configuration set for any inactive and/or idle mode UEs. The RAN may also perform transmitting of EPI DCI validity/availability indication in the downlink direction (e.g., to any one or more UEs), such as by using system information, RRC configuring and/or DCI-based signaling at 406. Then, the RAN may proceed to determine whether or not the EPI DCI configuration set of any UE needs to be updated at 408. For example, the RAN may determine to update the (e.g., active and/or default) EPI DCI configuration set of any UE based on any of paging performance metrics and/or PDCCH/CORESET capacity metrics. On condition that any EPI DCI configuration set (e.g., of any UE) does not need to be updated, the procedure in FIG. 4 may end (e.g., until a next UE-specific number of SSBs and/or sequences is received). On condition that any EPI DCI configuration set (e.g., of any UE) is to be updated and/or re-configured, the RAN may proceed to transmitting an updated EPI frequency indication and/or transmitting an updated EPI validity/availability indication. For example, the updated information may be transmitted to any UE using a DCI-signaling procedure. As another example, the EPI frequency information is disabled at any time by the RAN, the UE may switch to (e.g., fall back) to a legacy paging procedure.

Figure 5:
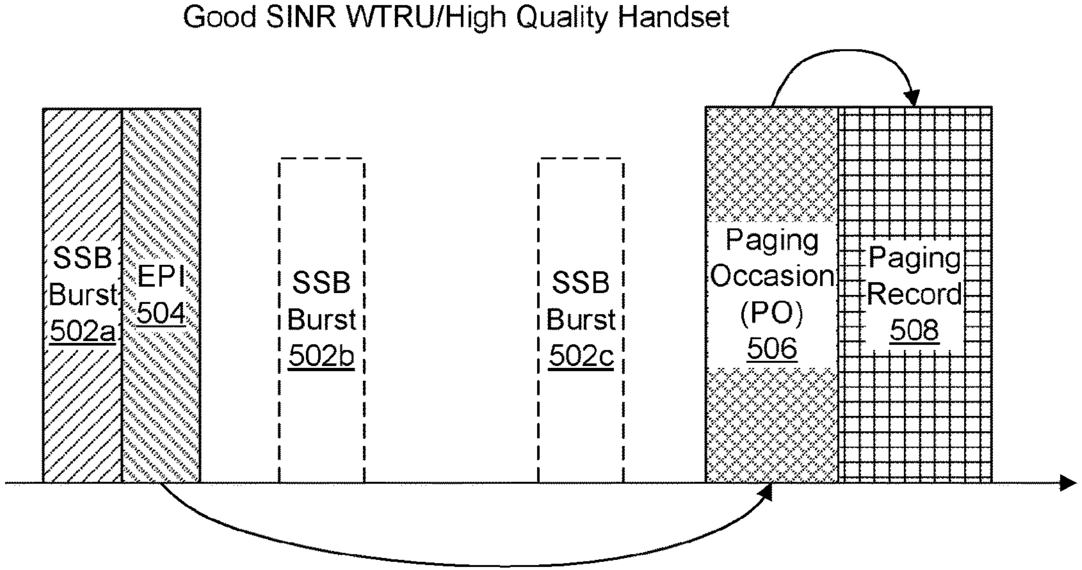
FIG. 5 is a diagram illustrating a representative EPI transmission scheme with respect to a paging occasion which may be implemented at a WTRU.

FIG. 5 is a diagram illustrating a representative EPI transmission scheme with respect to a paging occasion which may be implemented at a WTRU. FIG. 5 shows a representative example of a WTRU operating according to a first condition (e.g., good SINR conditions and/or a high quality UE). In FIG. 5, it is assumed that an EPI frequency indication of [1,0,0] (e.g., EPI pattern) has been configured at an idle and/or inactive UE (e.g., indicating an EPI DCI occasion 504 following a first SSB 502*a* of the group of the three SSB bursts 502*a*, 502*b*, 502*c* prior to the paging occasion 506). Upon detecting a single SSB burst/sequence 502*a*, the UE operating according to the first set of conditions is able to get in full sync with the network after detecting the single SSB burst/sequence 502*a*. This implies either a high-SINR UE and/or high-quality transceiver end of the UE. For example, the network/gNB has transmitted a single EPI DCI occasion 504, right after the first SSB burst 502*a*, prior to the paging occasion 506. Any location(s) of the EPI may be indicated to the UE by the proposed EPI frequency indication (e.g., by higher or lower layer signaling). The UE may then expect to blind decode the DCI associated with the EPI after the indicated SSB burst. On condition that there is a true EPI indication (e.g., early paging indication bit=1), the UE may enter a sleep state (e.g., light sleep) until the paging occasion 506 and then may wake in order to decode the paging DCI. After waking, the UE may also decode the paging record 508 (e.g., received on the subsequent PDSCH resources). On condition that there is a false EPI indication (e.g., early paging indication bit=0), the UE may assume that it and/or its paging group is NOT paged in the current paging occasion, and may enter a sleep state (e.g., deep sleep) until the next paging occasion. However, it should be appreciated that SINR conditions and UE capability are variable and that it may be advantageous to flexibly provide the EPI according to SINR conditions and/or UE capability.

Figure 6:
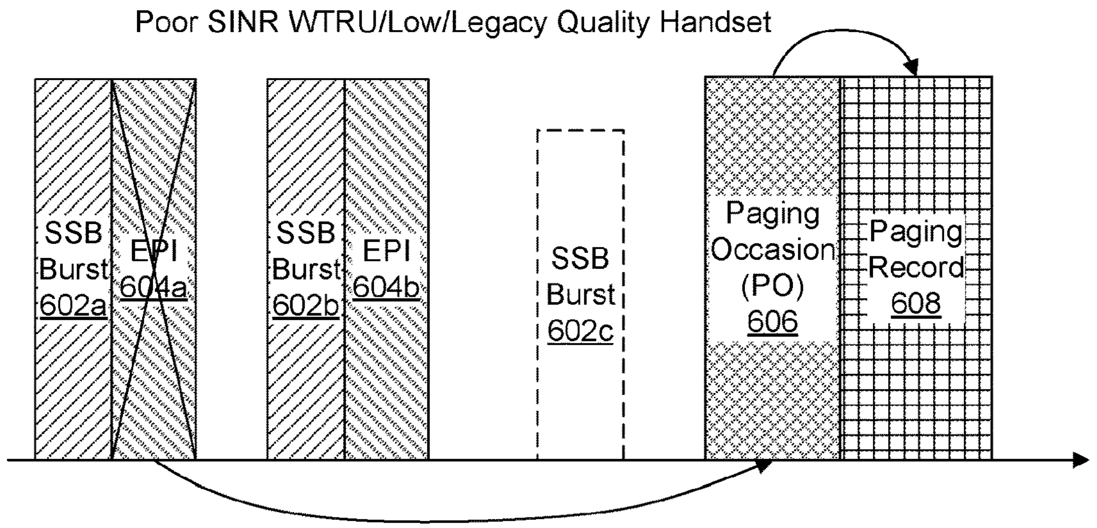
FIG. 6 is a diagram illustrating another representative EPI transmission scheme with respect to a paging occasion which may be implemented at a WTRU.

FIG. 6 is a diagram illustrating another representative EPI transmission scheme with respect to a paging occasion which may be implemented at a WTRU. FIG. 6 shows a representative example of a WTRU operating according to a second condition (e.g., low SINR conditions, and/or a low quality UE and/or a legacy UE). In FIG. 6, it is assumed that an EPI frequency indication of {1,1,0} (e.g., EPI pattern) has been configured at an idle and/or inactive UE (e.g., indicating EPI DCI occasions following first and second SSBs 602*a* and 602*b*). In certain cases, it may be necessary for a UE to detect multiple SSBs 602*a*, 602*b*, 602*c* and/or sequences before DCI of the EPI may be decoded. As shown in FIG. 6, a UE operating according to the second set of conditions may require multiple (e.g., two) SSB bursts 602*a* and 602*b* to be detected to be able to get in full sync with the network prior to the paging occasion 606. As the UE may not be synchronized with the network after detection of the first SSB 602*a*, the first EPI DCI occasion 604*a* may not be decoded (shown by the 'X'). After detecting the second SSB 602*b*, the second EPI DCI occasion 604*b* may be able to be decoded by the UE as indicated by the EPI procedures described herein. The UE may then expect to blind decode the DCI associated with the EPI after the second SSB burst 602*b*. On condition that there is a true EPI indication (e.g., early paging indication bit=1), the UE may enter a sleep state (e.g., light sleep) until the paging occasion 606 and then may wake in order to decode the paging DCI. After waking, the UE may also decode the paging record 608 (e.g., received on the subsequent PDSCH resources). On condition that there is a false EPI indication (e.g., early paging indication bit=0), the UE may assume that it and/or its paging group is NOT paged in the current paging occasion, and may enter a sleep state (e.g., deep sleep) until the next paging occasion. Here, the representative UE in FIG. 6 may enter the sleep state for less time than the representative UE in FIG. 5.

On condition that the DCI EPI occasion is not repeated after the second SSB burst, the UE may assume a worst case (e.g., determine it is being paged). For example, the UE may wake up for decoding the paging DCI as well as the paging record. This behavior may significantly increase the occurrence of paging false alarms, where one or more UEs may believe they are going to be paged, because of the absence of the EPI DCI, and may wake up for the paging occasion and perform decoding of the paging record. By the network locating the EPI DCI according to where the UE is capable to decoding the EPI DCI, battery performance gains at the UE may be realized and/or paging false alarms may be reduced and/or prevented.

Figure 7:
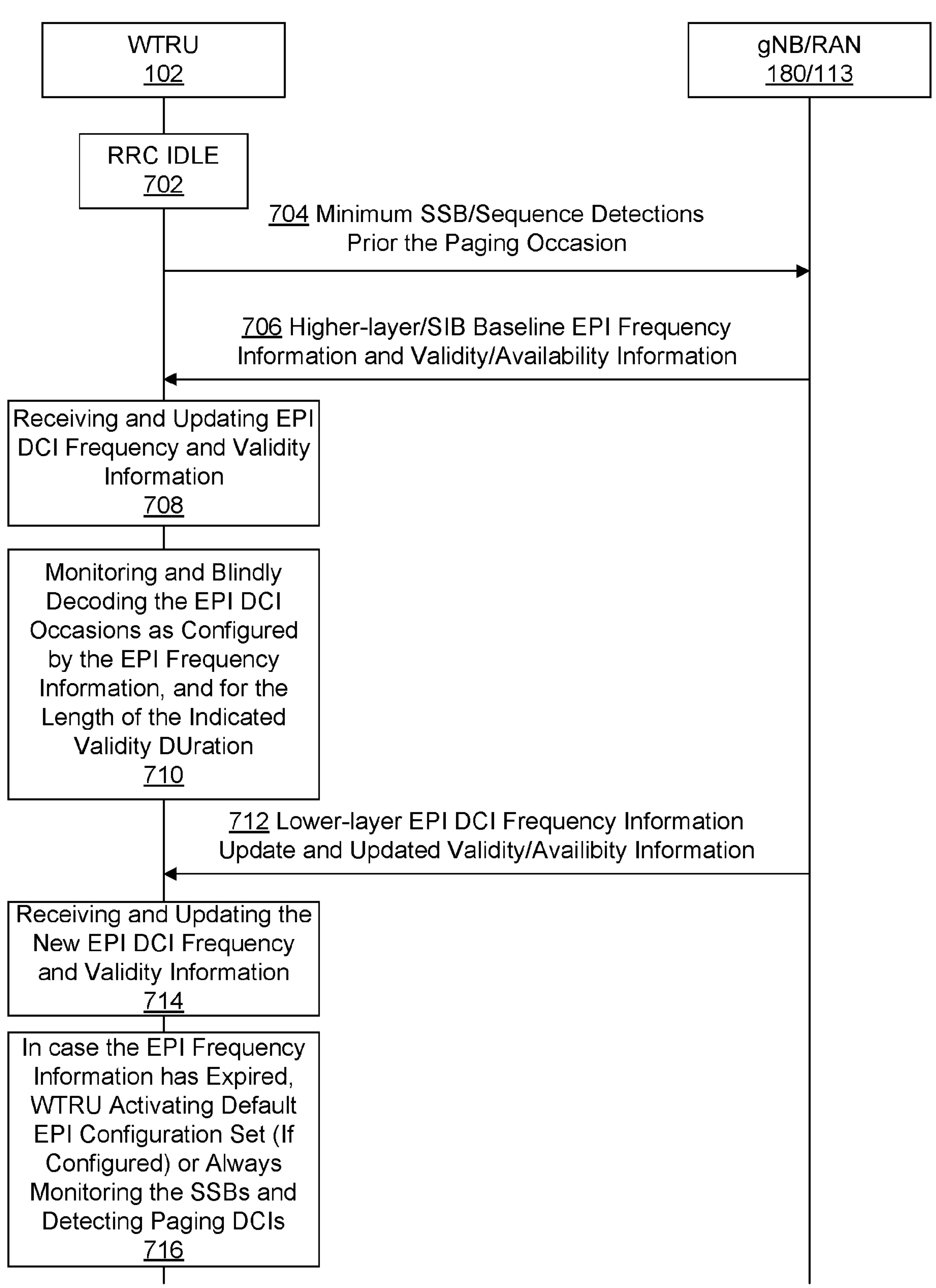
FIG. 7 is a diagram illustrating a representative diagram for communications between a WTRU and a RAN.

FIG. 7 is a diagram illustrating a representative diagram for communications between a WTRU (e.g., a UE) and a RAN (e.g., a gNB). As described herein, the communications in FIG. 7 may begin with a UE in an inactive and/or idle mode at 702. The UE may send (e.g., prior to an upcoming paging occasion) to the RAN a number (e.g., minimum and/or required number) of (e.g., successive) SSB bursts and/or downlink sequences to achieve synchronization at 704. After, the RAN may dynamically configure the UE, such as by transmitting higher layer signaling (e.g., system information blocks and/or RRC messages), with any of one or more EPI DCI configuration sets, an index of a default set, and/or an indication of a currently active EPI DCI configuration set at 706. For example, the RAN may configure one or more idle and/or inactive UEs in this way.

An (e.g., each) idle and/or inactive UE may detect an EPI DCI occasion following a currently activated EPI configuration set. For example, after receiving EPI DCI frequency information and/or EPI DCI validity/availability information at 708, the UE may perform monitoring and blind decoding of any EPI DCI occasions based on the configured EPI DCI frequency information at 710. The UE may monitor and/or blind decode the EPI DCI occasions for a length of time based on the validity/availability information (e.g., a time duration). After, the idle and/or inactive UE may be dynamically reconfigured at 712 to update information of any of the EPI DCI configuration sets at 714, such as by transmitting faster lower layer signaling such as DCI signaling. After updating (e.g., reconfiguring), the UE may determine whether the active EPI DCI configuration has expired or not. On condition that the active EPI DCI configuration has expired at 716, the default EPI DCI configuration set may be activated—assuming a default EPI DCI configuration set is configured at the UE. As another example, the condition that the active EPI DCI configuration has expired, the UE may switch to always monitoring (e.g., monitoring each) SSB and decoding (e.g., each) paging DCI.

Signaling Enhancements for EPI Delivery

In certain representative embodiments, signaling enhancements may be applied in the uplink direction from a UE to the RAN. For example, a UE may transmit in the uplink direction (e.g., to a gNB) a number (e.g., minimum and/or required number) of (e.g., successive) SSB burst and/or downlink sequence detections prior to a paging occasion. The number of detected SSB bursts and/or downlink sequences may be a UE-specific parameter and/or may be dependent on SINR conditions and/or a transceiver design (e.g., capability) of the UE. In high interference conditions this parameter may imply a worst case scenario (e.g., the UE will require detecting each SSB for synchronization purposes). For example, the detection number may be transmitted via PUSCH and/or PUCCH transmissions and/or may be included as information elements as part of a RRCSetupRequest message and/or a RRCResumeRequest message.

In certain representative embodiments, signaling enhancements may be applied in the downlink direction from the RAN to a UE. For example, the UE may receive EPI information which may include any of (1) one or more EPI DCI configuration sets, (2) an index of a default EPI configuration set, and/or (3) an indication of an current EPI set (e.g., to be active for at least an upcoming paging occasion). Each EPI set may be indicated as a vector of a size corresponding to a number of the SSB bursts to be monitored for possible (e.g., presence/absence) EPI prior to a paging occasion. For example, an EPI frequency vector of [1 0 1] indicates that the RAN (e.g., gNB) shall or may be transmitting the EPI DCI after (e.g., right after) the first and third SSBs prior to the paging occasion. Examples of other EPI frequency vectors are shown in FIGS. 5 and 6.

As another example, the validity/availability of a current EPI frequency configuration set may be indicated to the UE as any of a number of successive paging occasions, a number of paging frames, system frame numbers, and/or a timer value (e.g., in milliseconds). The validity/availability information may be transmitted via PBCH, PDCCH, PDSCH transmissions. The validity/availability information may be included as any of a part of (1) system information (e.g., SIB1), (2) a RRCReconfiguration message, (3) a RRCConnectionRelease message, (4) a RRC suspend indication message, (5) EPI DCI, and/or (6) paging DCI (e.g., for a certain PO and which may apply for a next paging occasion or group-specific paging occasions, where a number of paging occasions may be indicated, such as by a validity IE.

Paging-Specific Reference Signal Procedures

Semi-Static Idle and/or Inactive Reference Signal Procedures

One or more patterns of idle and/or inactive RS may be predefined, where the network (e.g., gNB) may semi-statically adapt the overhead from transmitting idle and/or inactive RSs (e.g., the PDSCH capacity of a default/paging BWP) and the paging and/or power saving performance of any UEs (e.g., idle and/or inactive UEs). Any idle and/or inactive UEs may achieve improved battery consumption by monitoring paging-specific RS occasions. Monitoring the paging-specific RS occasions (e.g., instead of SSB bursts) may permit for a larger sleeping period before each paging occasion.

In certain representative embodiments, an idle and/or inactive UE may receive any of the following higher-layer and/or lower-layer configurations: (1) a presence of a idle and/or inactive (e.g., paging-specific) RS(s), (2) a pattern (e.g., index) of the idle and/or inactive (e.g., paging-specific) RS occasions, (3) idle and/or inactive RS-specific validity/availability information (e.g., duration) of the idle and/or inactive (e.g., paging-specific) RS(s), and/or (4) an EPI DCI frequency.

For example, a UE may receive a presence indication of a (e.g., guaranteed) idle and/or inactive paging-specific RS in the downlink direction. Such indication may be received as part of the broadcast system information, lower and/or higher layer signaling, and/or using the MAC control elements (CEs) such as when the UE is last connected to the network.

For example, the UE may receive a pattern indication (e.g., index) of the idle and/or inactive (e.g., paging-specific) RS occasions in the downlink direction, from multiple predefined configuration sets of idle and/or inactive (e.g., paging-specific) RS(s). A certain pattern indication may identify a set of predefined timing and/or frequency resources/occasions of the idle and/or inactive RS occasions prior to a (e.g., each) paging occasion. As another example, the UE may receive a dynamic resource set (e.g., time and/or frequency resources) of the idle and/or inactive (e.g., paging-specific) RS(s).

For example, the UE may receive the idle and/or inactive RS-specific validity/availability information (e.g., duration) of the idle and/or inactive (e.g., paging-specific) RS(s) in the downlink direction. The validity/availability information may be indicated to the UE (e.g., an indication) and may be in terms of any of a number of future paging occasion paging frames, system frame number(s), and/or an expiry timer (e.g., in milliseconds).

For example, the UE may receive an EPI DCI frequency indication and may correspond to a last updated idle and/or inactive (e.g., paging-specific) RS indicated pattern and/or resource set.

In certain representative embodiments, the idle and/or inactive UE may perform skipping over the detection of all or part of the SSB bursts prior to each paging occasion, such as after determining idle and/or inactive RS availability. For example, the UE may enter a sleep state for all or part of the SSB bursts prior to each paging occasion, such as after determining idle and/or inactive RS availability.

In certain representative embodiments, the idle and/or inactive UE may perform detection and synching with the available idle and/or inactive (e.g., paging-specific) RS(s).

In certain representative embodiments, the idle and/or inactive UE may perform monitoring and/or blind decoding of the EPI DCI occasions, such as according to the idle and/or inactive RS-specific EPI frequency information.

In certain representative embodiments, such as on condition that the validity/availability duration has expired, the idle and/or inactive UE may determine there are no further idle and/or inactive RSs available, and may switch to detecting any (e.g., each) SSB burst and paging DCIs. As another example, the idle and/or inactive UE may, assuming a default is provided, activate a default idle and/or inactive RS configuration set and continue monitoring and blind detection using the default idle and/or inactive RS configuration set.

Dynamic Idle and/or Inactive Reference Signal Procedures

The network (e.g., gNB) may inform any available connected-mode CSI-RS, TRS and/or other RS occasions with any idle and/or inactive UEs. The connected-mode CSI-RS, TRS and/or other RS occasions may be informed along with any corresponding numerology and/or any QCL configuration of the connected-mode RSs (e.g., CSI-RSs, TRSs and/or other RSs). An idle and/or inactive may respectively determine whether to process the available connected-mode CSI-RSs, TRSs and/or other RSs or not before a paging occasion. Procedures using CSI-RSs, TRSs and/or other RSs may reduce and/or eliminate the radio overhead associated with the transmission of paging-specific (e.g., idle and/or inactive specific) RSs.

Hybrid Idle and/or Inactive Reference Signals

The network (e.g., gNB) may dynamically switches between semi-static (e.g., paging-specific) RS and dynamic RS procedures. A hybrid procedure scheme may provide additional radio flexibility such as in cases where the connected-mode RS (e.g., CSI-RS, TRS and/or other RS) occasions are not available at the time of each paging occasion. An idle and/or inactive UE may be informed of the type, and information, of the available paging RSs.

As described herein, idle and/or inactive RS(s) may include any of paging-specific RS(s) and/or connected-mode RS(s) (e.g., CSI-RS(s), TRS(s) and/or other RS(s)).

In certain representative embodiments, an idle and/or inactive UE may receive one or more of the following any of the following higher-layer and/or lower-layer configurations: (1) a presence of a connected mode RS(s), (2) a resource set (e.g., resource set information) of any available connected-mode RSs, (3) numerology information, (4) QCL information, (5) validity/availability information and/or (4) an EPI DCI frequency.

For example, the UE may receive a presence indication of the connected-mode RSs (e.g., CSI-RSs, TRSs and/or other RSs) in the downlink direction. Such indication may be received as part of the broadcast system information, lower and/or higher layer signaling, and/or using the MAC CEs.

For example, the UE may receive a resource set of any available connected-mode the connected-mode RSs (e.g., CSI-RSs, TRSs and/or other RSs) (e.g., time and/or frequency domain resources). Such information may be provided as a standardized resource set formulation of connected mode UEs and may be dynamically relayed (e.g., transmitted) to any idle and/or inactive UEs.

For example, the UE may receive numerology information of the connected-mode RSs (e.g., CSI-RSs, TRSs and/or other RSs) which may be available for the idle and/or inactive mode UEs. The numerology may include or indicate the sub-carrier settings. For example, a numerology setting of an available connected-mode RS may be different from a numerology configuration of a default (e.g., paging) BWP, the UE may determine whether to process multiple signals of the different numerologies or not.

For example, the UE may receive QCL information of the connected-mode RSs (e.g., CSI-RSs, TRSs and/or other RSs) which may be available for the idle and/or inactive mode UEs. For example, a QCL setting of any available connected-mode RS may be different from a QCL configuration of a default (e.g., paging) BWP, the UE may determine whether to process multiple signals of different QCL configurations or not.

For example, the UE may receive a validity/availability duration of the available connected-mode RSs in the downlink direction. The connected-mode validity/availability duration may be indicated to the UE (e.g., an indication) and may be provided in terms of any of a number of future paging occasion paging frames, system frame number(s) and/or an expiry timer (e.g., in milliseconds).

For example, the UE may receive an EPI DCI frequency indication and may correspond to the connected-mode available connected-mode RS (e.g., CSI-RS, TRS and/or other RS) occasions and/or which may shared with any inactive and/or idle mode UEs.

In certain representative embodiments, the idle and/or inactive UE may perform skipping over the detection of all or part of the SSB bursts prior to each paging occasion, such as after determining idle and/or inactive RS availability. For example, the UE may enter a sleep state for all or part of the SSB bursts prior to each paging occasion, such as after determining idle and/or inactive RS availability.

In certain representative embodiments, the idle and/or inactive UE may perform detection and synching (e.g., fully or partially) with any of the available connected-mode RS occasions, and/or any idle and/or inactive RS occasions and/or any part of the SSB bursts.

In certain representative embodiments, the idle and/or inactive UE may perform monitoring and/or blind decoding of the various indicated occasions of the EPI DCI, such as according to the idle and/or inactive RS-specific EPI and/or connected-mode EPI frequency information.

In certain representative embodiments, the idle and/or inactive UE may be dynamically re-configured, such as by higher and/or lower layer signaling, for hybrid presence of the idle and/or inactive-specific RS occasions and connected-mode-specific RS occasions prior to any paging occasion and/or a set of paging occasions. For example, the UE may be informed of a type of each available RS occasion for paging (e.g., paging-specific RS or a connected-mode shared RS). Transmitting the RS type information may be used to indicate to the UE that any connected-mode RSs are configured with a different numerology and/or QCL settings from a paging BWP. In certain representative embodiments, the UE may determine to skip processing of RS occasions which differ from the paging BWP and/or count for their presence for synchronization prior each paging occasion. For example, the RAN may offer (e.g., transmit) a shared RS(s) for use in the signaling of the EPI DCI to the idle and/or inactive UE and any offered RS(s) may have a numerology configuration which is different from the paging BWP. Based on this difference, the UE may skip processing of the shared RS(s) and/or assume the shared RS(s) are not transmitted by the RAN (e.g., may fall back to a legacy paging procedure and/or may monitor for each SSB burst). As another example, the UE may determine that the shared RS(s) may be processed though there is a numerology difference and may use the shared RS(s) in order to monitor the EPI DCI occasions rather than skip processing of the shared RS(s).

In certain representative embodiments, the idle and/or inactive UE may determine (e.g., assume) that any configured idle-specific RS and/or any connected-mode specific RS occasions are no longer available when the corresponding validity/availability indication is expired. On condition of the validity/availability information expiring, the UE may switch to detecting any (e.g., each) SSB burst and paging DCIs before each paging occasion. As another example, the idle and/or inactive UE may, assuming a default is provided, activate a default idle and/or inactive RS configuration set and continue monitoring and blind detection using the default idle and/or inactive RS configuration set.

Figure 8:
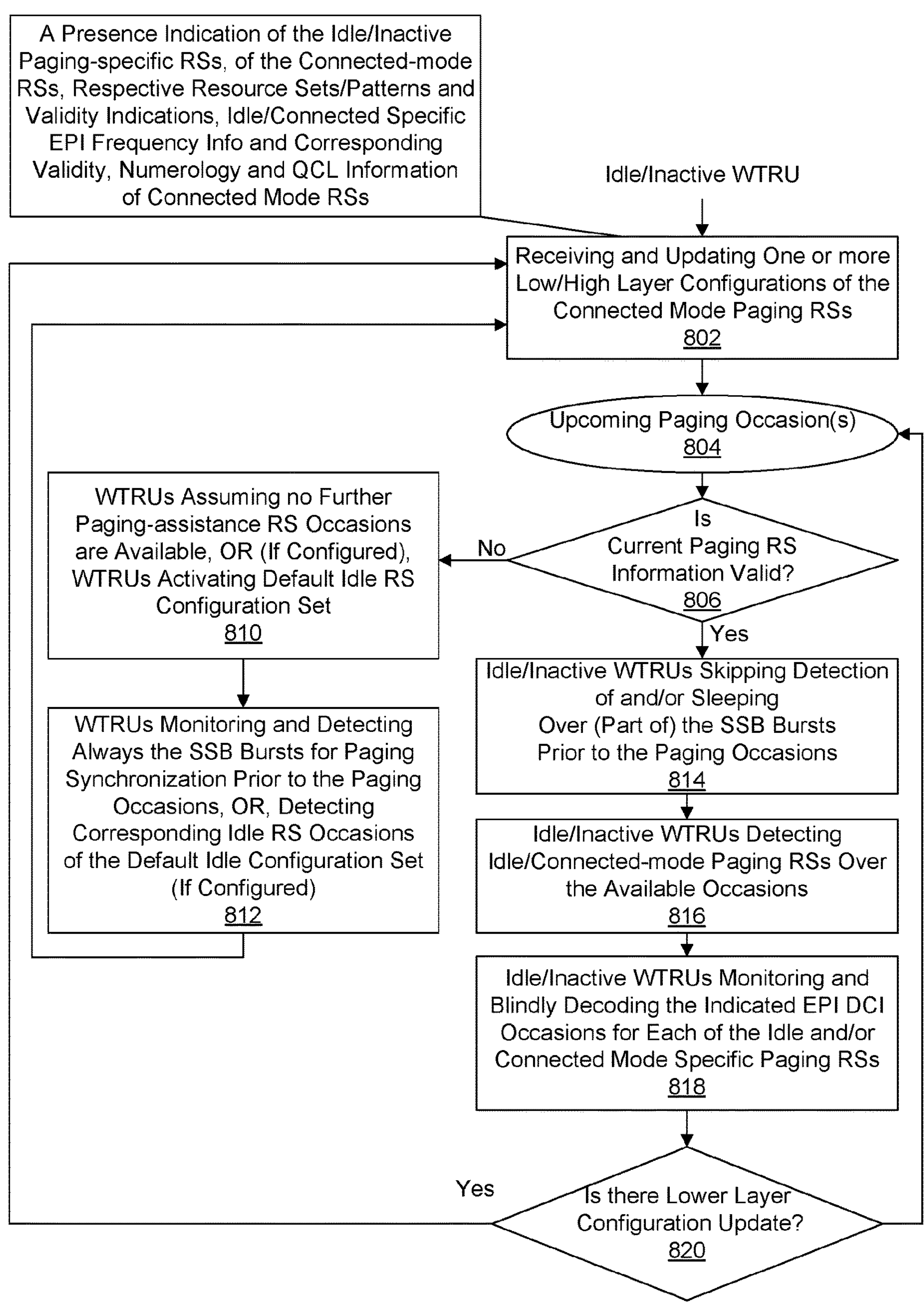
FIG. 8 is a diagram illustrating a representative procedure for configuring paging-specific reference signals (RSs) which may be implemented at a WTRU.

FIG. 8 is a diagram illustrating a representative procedure for configuring paging-specific reference signals (RSs) which may be implemented at a WTRU. The procedure may be performed by an inactive and/or idle UE. As shown in FIG. 8, the UE may perform receiving any higher-layer and/or lower layer configuration of any connected mode RSs and/or paging-specific RSs at 802. After, the UE may wait until an upcoming paging occasion at 804. Then, the UE may determine whether the active (e.g., current) RS configuration is valid or not at 806. On condition that the active (e.g., current) RS configuration is not valid, the UE may then assume that there are no further available paging assistance RS occasions and/or may activate a default RS configuration at 810. For example, the UE may activate the default RS configuration on condition that the default RS configuration was previously configured (e.g., pre-configured). Then, the UE may proceed to perform monitoring and/or blind decoding of any paging DCI(s) of the paging occasion (e.g., without sleeping) at 812. On condition that the UE determines that it is being paged (e.g., based on the blind decoding result), a RACH procedure may be triggered at (e.g., by) the UE. Otherwise, on condition that the UE is determined to not be paged, the UE may be triggered to sleep until a next upcoming paging occasion.

In FIG. 8, on condition that the active (e.g., current) RS configuration is valid at 806, the UE may proceed to perform skipping over the detection of all or part of the SSB bursts prior to each paging occasion at 814, such as after determining idle and/or inactive RS availability. The UE may perform detecting of any connected mode RSs and/or paging-specific RSs at 816 (e.g., for the available occasions). The UE may also proceed to perform monitoring and blind decoding of any indicated EPI DCI occasions at 818. The monitoring and blind decoding of any indicated EPI DCI occasions. The monitoring and blind decoding may be performed with respect to any (e.g., each) connected mode RS and/or paging-specific RS.

The procedure may continue to the UE determining whether or not any RS configuration update is received or not (e.g., lower layer configuration update such as by DCI signaling) at 820. Otherwise, the UE may proceed to wait (e.g., sleep) until a next upcoming paging occasion by returning to 804. For example, the RS configuration update may de-activate and/or to activate another RS configuration.

In certain representative embodiments, the RAN (e.g., gNB) may transmit information related to any of the connected mode RS and/or paging-specific RS configurations as IEs in one or more information objects to any idle and/or inactive UEs (e.g., in the downlink direction). For example, the information may be transmitted in a single configuration block (e.g., SIB1), EPI DCI, paging DCI, etc.

For example, the RAN may transmit a presence indication of any paging-specific RS(s). Such indication may be transmitted by slower, higher-layer signaling, such as a SIB and RRC, or faster lower-layer signaling such as DCI.

For example, the RAN may transmit the pattern indication and/or time/frequency resource set of any paging-specific RS(s).

For example, the RAN may transmit the corresponding validity and/or availability information of any paging-specific RS(s). Such information may be provided in terms of any of a certain number of paging occasions, a number paging frames, system frame number(s), radio slots, and/or an expiry timer.

For example, the RAN may transmit the group-specific EPI DCI frequency indication. Such information may follow the indicated paging-specific RS pattern and/or paging-specific RS resource set.

For example, the RAN may transmit a presence indication of any connected-mode RS(s) which may be shared and/or available for any inactive and/or idle mode UEs. Such indication may be transmitted by slower, higher-layer signaling, such as a SIB and RRC, or faster lower-layer signaling such as DCI.

For example, the RAN may transmit the resource set of the connected-mode RS(s) to any inactive and/or idle mode UEs.

For example, the RAN may transmit the numerology and/or QCL information of the connected-mode RS(s) to be shared and/or available to any inactive and/or idle mode UEs.

For example, the RAN may transmit the validity/availability indication of the connected-mode RS(s) to be shared and/or available to any inactive and/or idle mode UEs.

For example, the RAN may transmit the group-specific EPI DCI frequency following the indicated connected-mode RS resource set.

Figure 9:
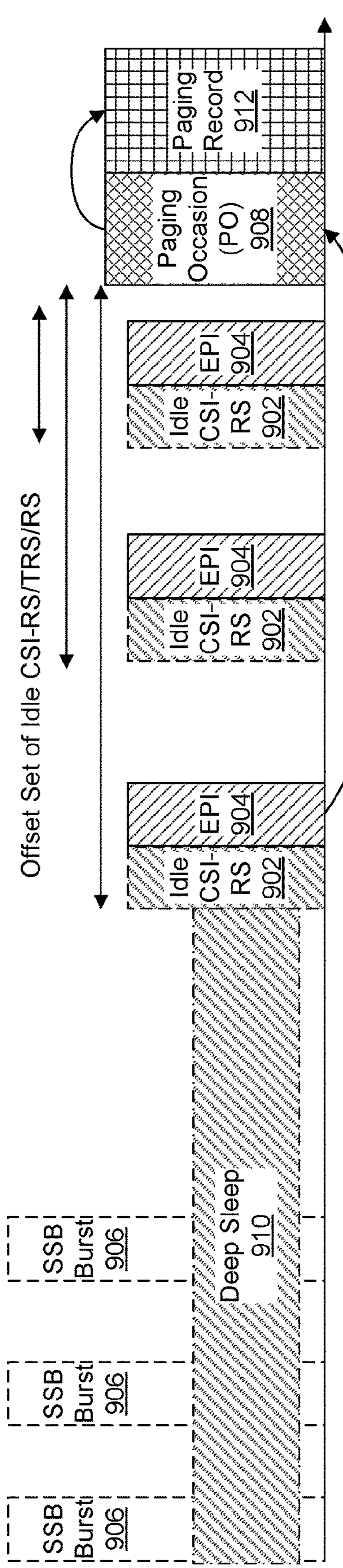
FIG. 9 is a diagram illustrating a representative EPI transmission scheme using RSs with respect to a paging occasion which may be implemented at a WTRU.

FIG. 9 is a diagram illustrating a representative EPI transmission scheme using RSs with respect to a paging occasion which may be implemented at a WTRU. FIG. 9 shows a representative example of a WTRU configured with an RS configuration that may include three idle and/or inactive RS occasions 902 and time and/or frequency resources associated with the RS occasions 902. The RS configuration may also be associated with to an EPI frequency (e.g., EPI pattern) of [1,1,1]. The associated EPI frequency indication may be configured such as there is a transmitted EPI DCI opportunity 904 after each of the idle and/or inactive RS occasions 902. This may achieve reliable paging power saving gains at an idle and/or inactive UE. In FIG. 9, the idle and/or inactive UE may skip any (e.g., all) SSB burst occasions 906 prior to a paging occasion 908. For example, the UE may remain in a sleep state (e.g., deep sleep 910 over the SSB duration and/or until a first RS occasion indicated by the EPI frequency). The UE may wake from the sleep state prior to the paging occasion 908 and may monitor and detect an idle and/or inactive RS for any of the configured RS occasions. Following the detection of an idle and/or inactive RS 902, the UE may proceed to blindly decode an EPI DCI transmission 904 as may be described herein. On condition that there is a true EPI indication (e.g., early paging indication bit=1), the UE may enter a sleep state (e.g., light sleep) until the paging occasion 506 and then may wake in order to decode the paging DCI. After waking, the UE may also decode the paging record 912 (e.g., received on the subsequent PDSCH resources). Such a paging scheme may improve power consumption performance at the UE. As another example, the UE may receive information indicating an offset of the idle and/or inactive RS occasions from the paging occasion in addition to or in the alternative to explicit time and/or frequency resources associated with the RS occasions.

Figure 10:
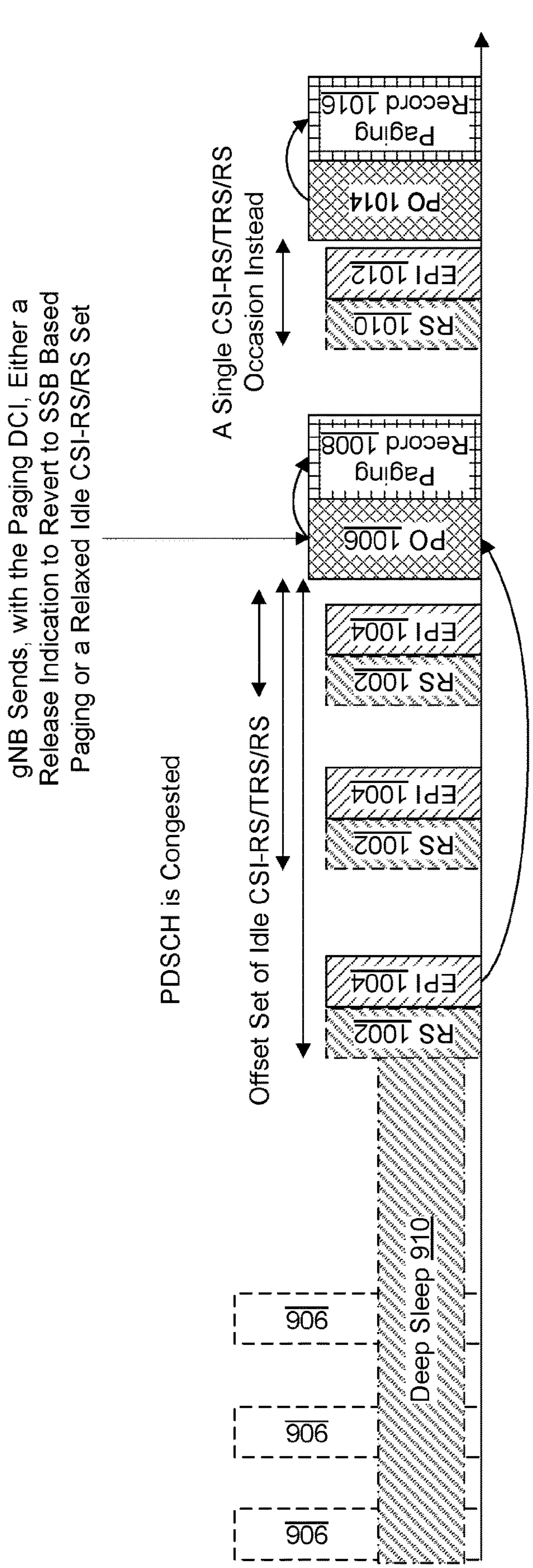
FIG. 10 is a diagram illustrating other representative EPI transmission schemes using RSs with respect to a paging occasion which may be implemented at a WTRU.

FIG. 10 is a diagram illustrating other representative EPI transmission schemes using RSs with respect to a paging occasion which may be implemented at a WTRU. FIG. 10 shows a representative example of a WTRU configured with an RS configuration that may include three RS occasions 1002 (e.g., idle and/or inactive RS occasions) and time and/or frequency resources associated with the RS occasions 1002. The transmission and processing associated with the schemes shown in FIG. 10 may offer additional flexibility. The RAN (e.g., gNB) may initially configured an idle and/or inactive UE with a paging-specific RS set of three RS occasions 1002, as well as the corresponding EPI DCI frequency (e.g., [1,0,1]) of the EPI 1004 and availability/validity information. The EPI 1004 may indicate paging in the paging occasion (PO) 1006 associated with the paging record 1008. For example, following increasing traffic volume over a paging BWP, the RAN may dynamically and/or preemptively configure (e.g., re-configure, update or activate) any idle and/or inactive UE of another RS pattern with less available RS occasions 1010 and/or with less EPI DCI frequency. The RAN may send a release indication within the paging DCI associated with a first paging occasion 1006 in FIG. 10. As another example, the RAN may indicate to the UE to dynamically and/or preemptively revert back to SSB-based paging synchronization and hence, the RAN may not transmit and the UE may not monitor for any idle and/or inactive RS(s) over a next paging occasion 1014 or a set of paging occasions. The new (e.g., other RS pattern) configuration may be forward looking and the UE may expect a current paging occasion to follow the old (e.g., prior to updating) configuration for paging stability. The EPI 1012 may indicate paging in the PO 1014 associated with the paging record 101016. In certain representative embodiments, the network may have the option of predefining the RS pattern configurations, and may also dynamically indicate to any UEs to either revert back to a typical (e.g., legacy) SSB-based paging procedure and/or to modify (e.g., relax) the time and/or frequency resources for the idle and/or inactive RS(s) such as to control (e.g., always control) PDSCH capacity of the paging BWP.

Figure 11:
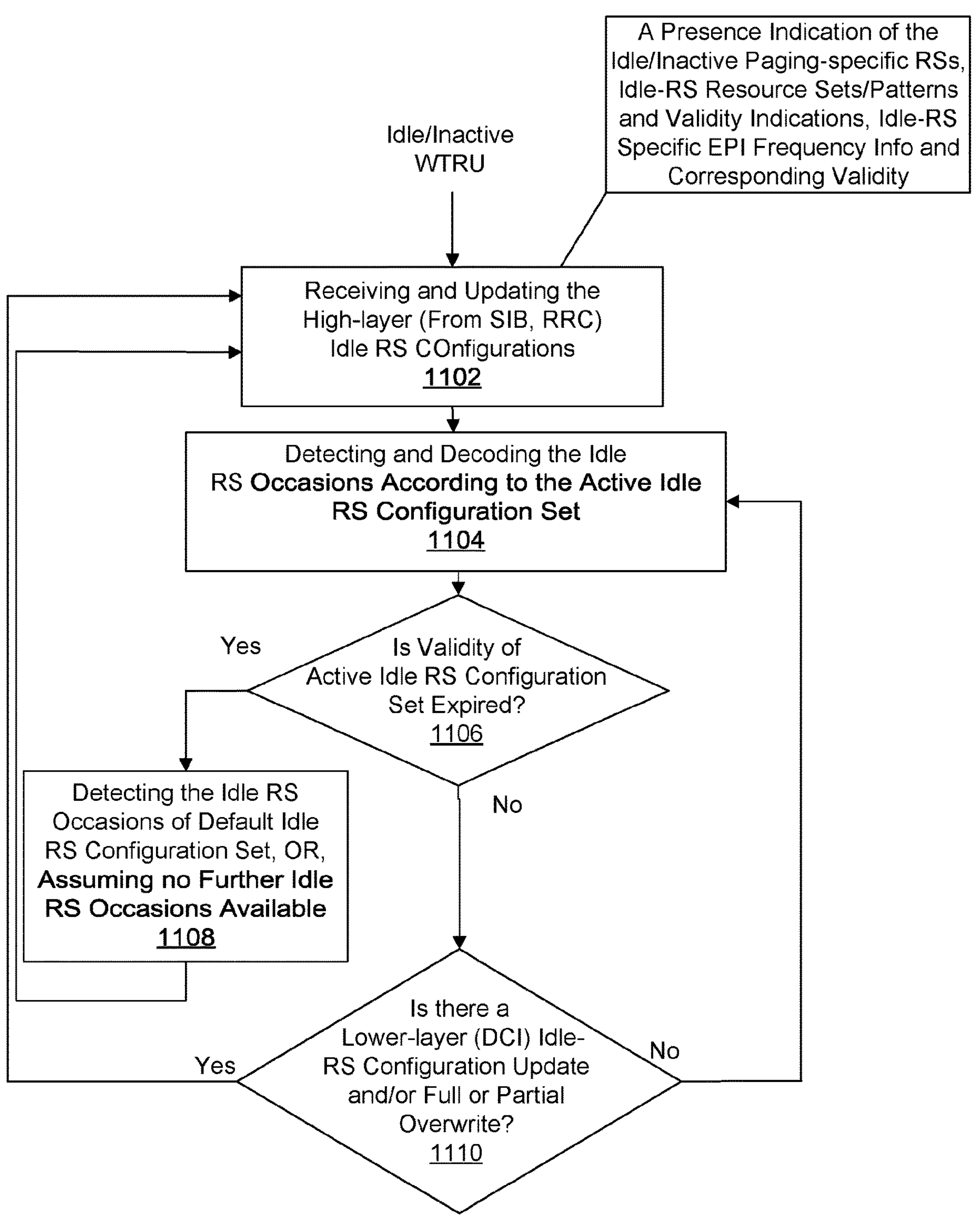
FIG. 11 is a diagram illustrating a representative procedure for configuring RS information which may be implemented at a WTRU.

FIG. 11 is a diagram illustrating a representative procedure for configuring RS information which may be implemented at a WTRU. The procedure in FIG. 11 may begin at any idle and/or inactive UE and the UE may perform receiving and/or updating of one or more high-layer configurations at 1102 (e.g., via system information and/or RRC signaling) of one or more predefined idle and/or inactive RS configuration sets for idle and/or inactive RSs, any corresponding validity/availability information (e.g., durations), and any idle and/or inactive RS EPI DCI frequency information. The UE may proceed to detecting any idle RS occasions of a current active RS configuration set and blindly decoding any signaled EPI DCI occasions associated therewith at 1104. For example, the monitoring and/or blind decoding may be performed for the indicated validity period. On condition that the active idle and/or inactive RS configuration set is no longer valid (e.g., expired) at 1106, the UE may proceed to use (e.g., activate) a default RS configuration set and perform monitoring and blind decoding of any RS occasions according to the default RS configuration set and/or the UE may assume no further idle and/or inactive RS occasions are available at 1108. On condition that the active idle and/or inactive RS configuration set is valid (e.g., not expired), the idle and/or inactive UE may receive a configuration update (e.g., reconfigured by lower layer (DCI) signaling) to update the active idle-RS configuration set at 1110. For example, the configuration update may be a full or partial overwrite of any of the idle and/or inactive RS configuration sets. On condition that no configuration update is received, the procedure may continue to the UE performing detecting and decoding as described herein using the active RS configuration set. On condition that a configuration update is received, the UE may proceed to update (e.g., partial or full overwriting) any of the high-layer RS configuration sets and/or associated information before continuing to perform detecting and decoding as described herein using the active RS configuration set.

Figure 12:
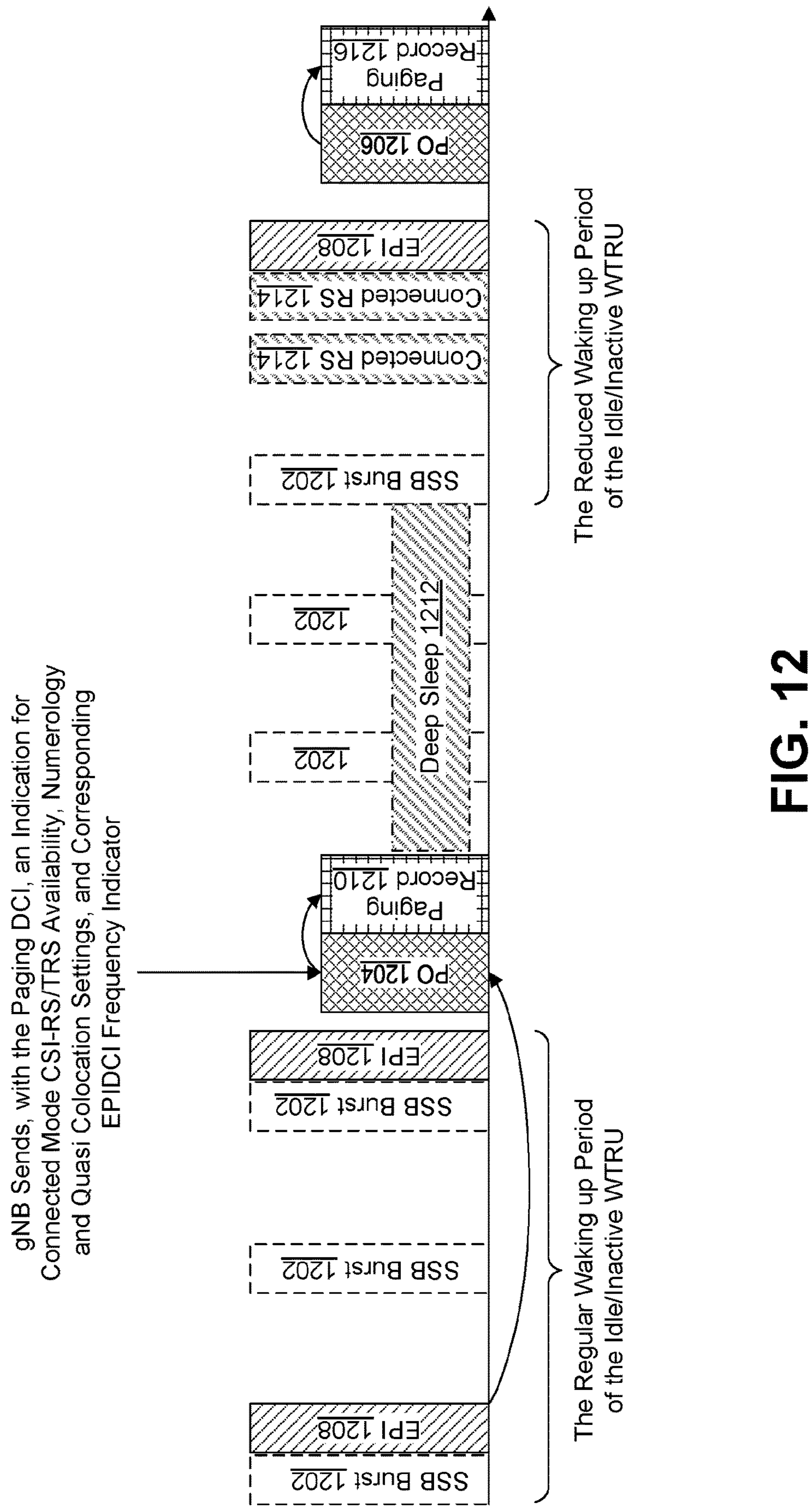
FIG. 12 is a diagram illustrating another representative EPI transmission scheme with respect to paging occasions which may be implemented at a WTRU.

FIG. 12 is a diagram illustrating another representative EPI transmission scheme with respect to a paging occasion which may be implemented at a WTRU. For example, an idle and/or inactive UE may require at least 3 successive SSBs 1202 in order to get in full sync with the radio interface before a paging occasion. For a first paging occasion 1204, there may not be any available CSI-RS transmissions for connected mode UEs, and the idle and/or inactive UE use (e.g., rely on) the SSB bursts 1202 prior to the paging occasion 1204 to sync or re-sync with the radio interface. Here, the idle and/or inactive UE wakes up for at least the three SSB period. For a second (e.g., upcoming) paging occasion(s), the RAN (e.g., gNB) may make any CSI-RS, TRS and/or RS transmissions for a (e.g., new) connected mode UE. The RAN may also preemptively indicate the future presence of any the CSI-RS, TRS and/or RS transmissions which may be utilized by an inactive and/or idle UE over the upcoming paging occasion 1206. EPI 1208 may be transmitted using a first periodicity prior to the paging occasion 1204 associated with the paging record 1210.

As shown in FIG. 12, the RAN (e.g., gNB) may transmit paging DCI in the first paging occasion 1204. The paging DCI may include information indicating to the UE to activate an idle and/or inactive RS configuration as described herein. For example, the RAN may send information indicating any of idle and/or inactive RS (e.g., connected mode CSI-RS and/or TRS) availability, numerology settings, QCL settings, and/or a corresponding EPI DCI frequency indicator. In FIG. 12, it is assumed for purposes of explanation that there are (e.g., only) two connected mode CSI-RS, TRS and/or RS occasions which are indicated to be available. For example, a particular UE (e.g., UE experiencing poor SINR conditions) may require at least three downlink sequences for downlink synchronization before the paging DCI detection. Accordingly, the idle and/or inactive UE may (e.g., only) wake up from a sleep state (e.g., deep sleep 1212) for one SSB burst 1202 and the two successive connected mode CSI-RS, TRS and/or RS occasions 1214. As seen in FIG. 12, the wake-up time period is clearly reduced compared to legacy SSB-based paging synchronization. In FIG. 12, the UE may decode the EPI 1208 transmitted with the connected mode CSI-RS, TRS and/or RS occasions 1214. The EPI 1208 may indicate whether the UE is being paged in the paging occasion 1206 associated with the paging record 1216.

Figure 13:
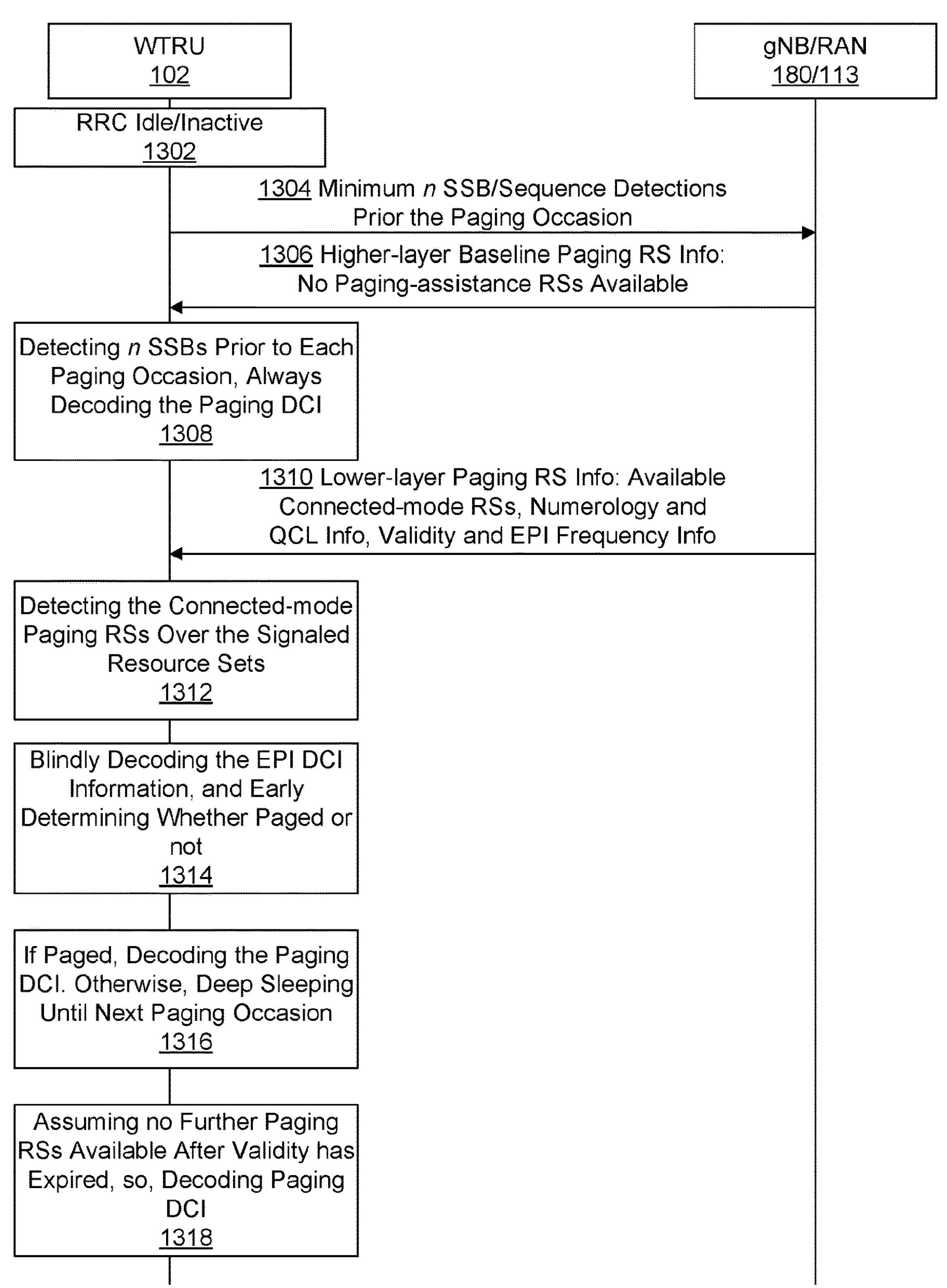
FIG. 13 is a diagram illustrating another representative diagram for communications between a WTRU and a RAN.

FIG. 13 is a diagram illustrating another representative diagram for communications between a WTRU and a RAN. As shown in FIG. 13, the communications are shown to begin with WTRU 102 (e.g., UE) transitioning to an RRC idle and/or inactive mode at 1302 and then the WTRU 102 may proceed at 1304 to sending a number (e.g., minimum and/or required number) of (e.g., successive) SSB bursts and/or downlink sequences in order to get in full synchronization (herein otherwise referred to as sync) with the RAN 113 (e.g., gNB 180). The RAN may send to the UE one or more high-layer RS configurations which indicate that no idle and/or inactive RSs are available at 1306 (e.g., no paging-specific RS will be transmitted, such as for the duration of the validity/availability information for an active configuration). After, the idle and/or inactive UE may proceed to perform detection at 1308 of the n number of SSBs before each paging occasion and may always decode the paging DCI for each paging occasion. At some later time, the RAN may send a lower-layer configuration update at 1310 (e.g., EPI DCI frequency information update and/or validity/availability information update). The configuration update may indicate that one or more idle and/or inactive RSs are available (e.g., will be transmitted for at least a next paging occasion). For example, the lower layer configuration update may be received by DCI signaling and may indicate any of the presence of the connected-mode RSs, corresponding numerology information, corresponding QCL information, connected-mode RS EPI DCI frequency information, and/or the respective validity/availability. Any idle and/or inactive UEs may then proceed to perform detecting the connected-mode paging RSs over the signaled resource sets prior to each paging occasion.

As shown in FIG. 13, the UE may proceed to perform detecting at 1312 of the idle and/or inactive RSs, such as connected mode paging RSs, using time and/or frequency resources which may have been provided in any of the higher or lower layer configurations. The UE may then attempt blind decoding at 1314 on the EPI DCI information (e.g., which follows the detected and/or inactive RSs) and make an early determination as to whether the UE is paged or not. For example, blind decoding may be performed for a first available EPI DCI occasion after the UE becomes synchronized with the RAN. The blind decoding may use the signaled connected-mode RS EPI DCI frequency information. In certain representative embodiments, one or more idle and/or inactive UEs may be reconfigured by lower layer DCI signaling with hybrid sets of idle-RS and connected-RS availability.

On condition that the UE determines that it or its paging group is paged at 1316 based on the EPI DCI information, the UE may proceed to decode the paging DCI (e.g., transmitted during the paging occasion). On condition that the UE determines that it or its paging group is not being paged, the UE may enter a sleep state (e.g., deep sleep), such as shown in FIG. 12 which may lead to improved battery consumption at the UE as described herein. When the availability of the idle and/or inactive RS configuration has expired, the UE may assume no further idle and/or inactive RSs (e.g., connected mode RSs) are available at 1318. In addition to or in the alternative, when the availability of the idle and/or inactive RS configuration has expired, the UE may switch to detecting idle and/or inactive RS (e.g., paging-specific RS) occasions belonging to a default idle and/or inactive RS configuration set (e.g., default idle RS configuration set).

In certain representative embodiments, a UE may switch among semi-static (e.g., dedicated) idle and/or inactive RS transmission procedures and connected mode CSI-RS, TRS and/or RS procedures (e.g., sharing connected mode CSI-RS, TRS and/or RS transmissions with any idle and/or inactive UEs). In certain representative embodiments, a UE may switch among semi-static (e.g., dedicated) idle and/or inactive RS paging procedures, connected mode CSI-RS, TRS and/or RS paging procedures (e.g., sharing connected mode CSI-RS, TRS and/or RS transmissions with any idle and/or inactive UEs) and/or legacy SSB-based paging procedures as described herein. For example, the network (e.g., gNB) may trigger switching (e.g., dynamic switching) among such procedures at any idle and/or inactive UE using higher layer and/or lower signaling and/or by making idle and/or inactive RS transmissions available to any idle and/or inactive UE. An advantage to such switching may be to provide extended sleep state duration to idle and/or inactive UEs which may improve battery consumption at the idle and/or inactive UEs. Another advantage to such switching may be to dynamically control channel capacity by controlling the presence of (e.g., dedicated) idle and/or inactive RSs.

Figure 14:
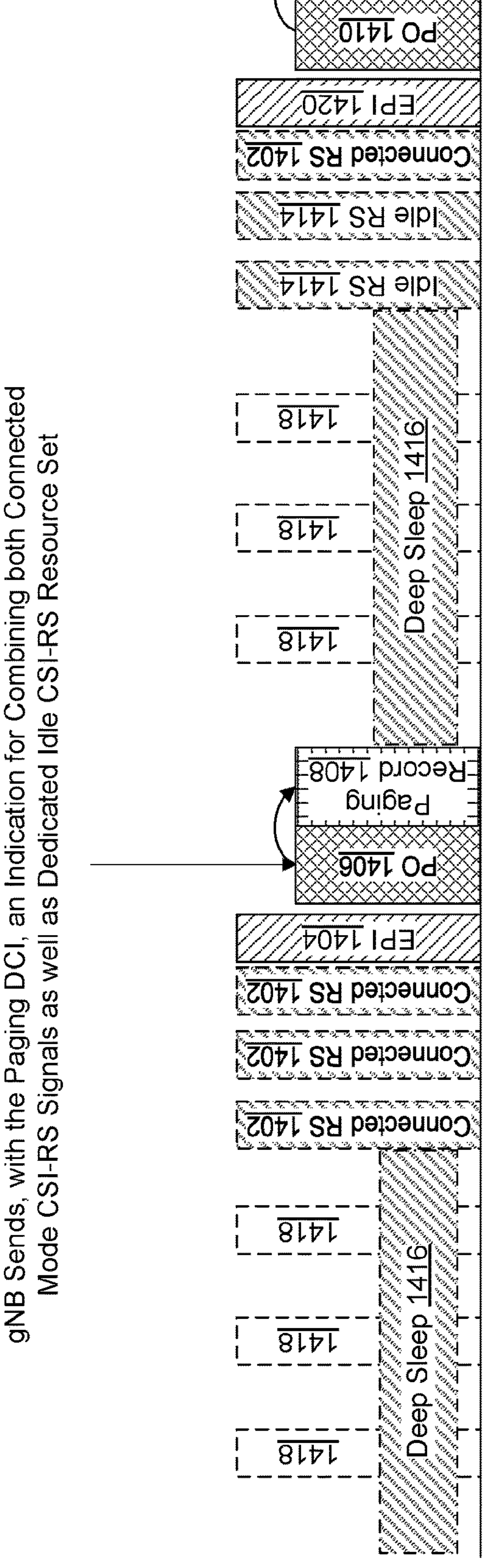
FIG. 14 is a diagram illustrating another representative EPI transmission scheme with respect to paging occasions which may be implemented at a WTRU.

FIG. 14 is a diagram illustrating another representative EPI transmission scheme with respect to paging occasions which may be implemented at a WTRU. As shown in FIG. 14, the RAN 113 may configure an idle and/or inactive UE to detect any connected mode RSs 1402 (e.g., CSI-RSs in FIG. 14 at configured time and/or frequency locations) in a number (e.g., three) RS occasions which precede a first EPI DCI transmission 1404 with respect to a first paging occasion 1406 which is associated with a first paging record 1408. For example, the previously available connected mode RSs 1402 may not be all be made available with respect to a next (e.g., second) paging occasion 1410 which is associated with a second paging record 1412, such as when one or more connected UEs have finished communications with the RAN. To achieve power saving gain at any idle and/or inactive UEs, the RAN may preemptively configure and/or indicate within the paging DCI of the first paging occasion 1406 that any idle and/or inactive UEs switch to utilizing a combined presence of any remaining connected mode RSs 1402 (e.g., CSI-RS(s), TRS(s) and/or other RS(s)) with a number of additional (e.g., dedicated) idle and/or inactive RSs 1414 (e.g., paging-specific RSs) prior to the second paging occasion. As seen in FIG. 14, an idle and/or inactive UE may remain in a sleep state (e.g., deep sleep 1416) during the SSB bursts 1418 and wake up to perform RS detection during the configured idle and/or inactive RS occasions and the connected mode RS occasion which precede the transmission of the EPI DCI 1420 related to the second paging occasion 1410.

Figure 15:
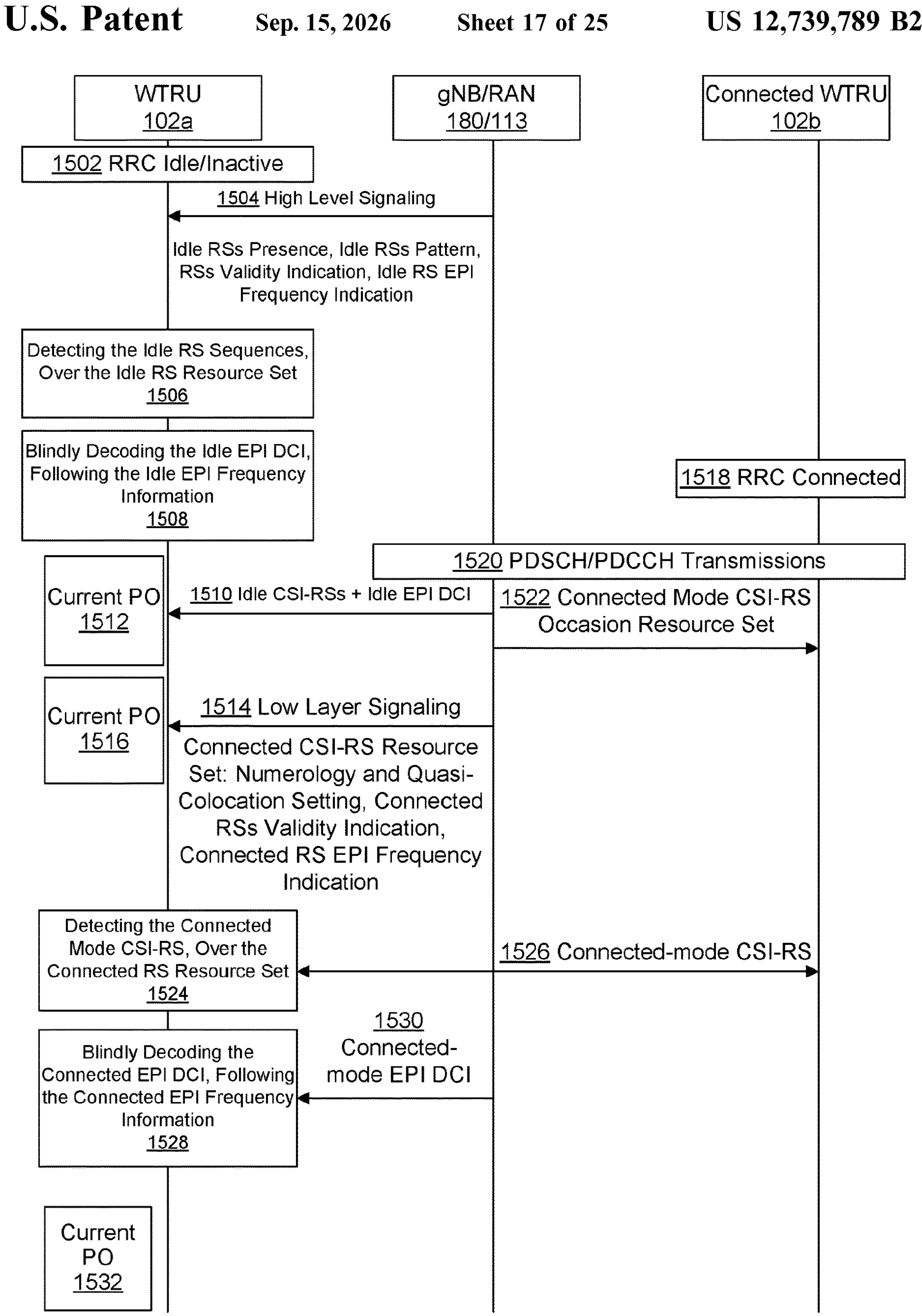
FIG. 15 is a diagram illustrating another representative diagram for communications between an idle and/or inactive mode WTRU and a RAN, and between a connected mode WTRU and the RAN.

FIG. 15 is a diagram illustrating another representative diagram for communications between an idle and/or inactive mode WTRU **102*a* and a RAN 113, and between a connected mode WTRU 102*b* and the RAN 113. As shown in FIG. 15, the communications are shown to begin with the WTRU 102*a* (e.g., a UE) transitioning to RRC idle and/or inactive at 1502 and then the idle and/or inactive UE receives a higher layer configuration at 1504. For example, the higher layer configuration may configure an idle and/or inactive UE with one or more RS configuration sets which may include any of idle and/or inactive RS presence information, idle and/or inactive RS pattern information, idle and/or inactive RS availability/validity information, and/or idle and/or inactive RS EPI frequency information. The idle and/or inactive UE may then perform detecting of the idle and/or inactive RSs (e.g., RS sequences) over the configured idle and/or inactive RS resources which correspond to a current (e.g., active) RS configuration set at 1506. The idle and/or inactive UE may proceed to perform blind decoding of the EPI DCI according to the idle and/or inactive RS EPI frequency information which correspond to the current (e.g., active) RS configuration set at 1508. As shown in FIG. 15, the RAN 113 (e.g., gNB 180) may transmit idle and/or inactive RS(s) and corresponding EPI DCI at 1510 with respect to a current paging occasion 1512**. As described herein, the RAN may then transmit lower layer signaling to the idle and/or inactive UE which may re-configure and/or update the UE with a connected mode RS resource set at

1514 during the current paging occasion 1516. The connected mode RS resource set may include any of numerology settings, QCL settings, connected mode RSs availability/validity information, and/or connected mode RS EPI frequency information. For example, the connected mode RS resource set may be provided to the idle and/or inactive UE within the paging DCI of the current paging occasion as shown in FIG. 14. In the meantime, the WTRU 102*b* may transition to RRC connected at 1518 and the RAN may perform one or more PDSCH and/or PDCCH transmissions at 1520 with one or more connected UEs (e.g., WTRU 102*b*). The RAN may transmit at 1522 a connected mode RS (e.g., CSI-RS) occasion resource set to the one or more connected UEs. For example, some or all of the connected mode RS (e.g., CSI-RS) occasion resource set may be provided to the idle and/or inactive UE via the lower layer signaling the connected mode RS (e.g., CSI-RS) configuration set at 1514. After the idle and/or inactive UE is configured with the connected mode RS (e.g., CSI-RS) configuration set, the idle and/or inactive UE may perform detection at 1524 of the connected mode RSs (e.g., CSI-RS sequences) over the configured connected mode RS resources which correspond to the connected mode RS configuration set transmitted at 1526. The idle and/or inactive UE may proceed to perform blind decoding at 1528 of the EPI DCI transmitted at 1530 according to the connected mode RS EPI frequency information (e.g., EPI pattern) which corresponds to the current (e.g., active) RS configuration set. As shown in FIG. 15, the RAN (e.g., gNB) may transmit connected mode RS(s) with respect to a current paging occasion. The connected mode RS transmissions (e.g., CSI-RS(s)) may be received by both the connected UE and to idle and/or inactive UE prior to the current (e.g., third) paging occasion 1532.

In certain representative embodiments, the idle and/or inactive UE may perform detection of the connected mode RS(s) as shown in FIG. 15. In certain other representative embodiments, the idle and/or inactive UE may perform detection of the connected mode RS(s) in addition to the idle and/or inactive (e.g., paging-specific) RSs as shown in FIG. 14.

Signaling Enhancements for Idle and/or Inactive RSs

In certain representative embodiments, the network may transmit to a UE (e.g., from a gNB to an idle and/or inactive UE) in the downlink direction any of the following as information elements with respect to idle and/or inactive RS(s).

For example, the UE may receive information (e.g., an indication) of (e.g., guaranteed) idle and/or inactive RS (e.g., CSI-RS, TRS, and/or other RS) presence. This information may indicate and/or inform the UE that such RS transmission is guaranteed (e.g., by the gNB). Based this information, the UE may avoid performing procedures described herein as if there are no EPI paging RS(s) for the idle and/or inactive mode UE.

For example, the UE may receive information (e.g., an index) of any (e.g., guaranteed) idle and/or inactive RS (e.g., CSI-RS, TRS, and/or other RS) pattern. This information may indicate and/or inform the UE to expect a specific pattern of a corresponding idle and/or inactive RS. The pattern may be in terms of a timing offset prior to the paging occasion (e.g., timing resources), and/or frequency resources over which the idle and/or inactive RS will be transmitted.

For example, the UE may receive information (e.g., an indication) of validity/availability of a corresponding idle and/or inactive RS. The validity/availability may be in terms of a number of subsequent paging occasions, a number of subsequent paging frames, and/or a timer (e.g., in milliseconds) over which the corresponding idle and/or inactive RS (e.g., pattern) is expected.

For example, the UE may receive information (e.g., an indication) of an idle and/or inactive RS EPI frequency. The idle and/or inactive RS EPI frequency may be represented by a vector in terms of a repetition order of the EPI DCI and which may be related to the idle and/or inactive RS (e.g., CSI-RS, TRS, and/or other RS) occasions. The idle and/or inactive RS EPI frequency may be respectively set for any (e.g., each) idle and/or inactive RS pattern and/or idle and/or inactive RS configuration set.

For example, the foregoing may be received in information elements (IEs) as part of any of: (1) system information (e.g., SIB1, over PBCH, etc.), (2) RRCReconfiguration message (e.g., over PDCCH/PDSCH), (3) RRCConnectionRelease message (e.g., over PDCCH/PDSCH), (4) RRC suspend indication message (e.g., over PDCCH/PDSCH), (5) EPI DCI (e.g., over PDCCH channel) and/or (6) paging DCI such as for a certain PO and/or to be applied for a next group-specific paging occasions (e.g., over PDCCH channel and/or where a number of paging occasions may be indicated by the validity/availability information).

In certain representative embodiments, the network may transmit to a UE (e.g., from a gNB to an idle and/or inactive UE) in the downlink direction any of the following as information elements with respect to sharing connected mode RS(s) (e.g., CSI-RS, TRS, and/or other RS).

For example, the UE may receive information (e.g., an indication) of connected mode RS presence for an idle and/or inactive UE.

For example, the UE may receive information (e.g., an indication) of the connected mode RS numerology settings for an idle and/or inactive UE.

For example, the UE may receive information (e.g., an indication) of the connected mode RS QCL settings (e.g., type).

For example, the UE may receive information (e.g., an indication) of validity/availability of a corresponding connected mode RS. The validity/availability may be in terms of a number of subsequent paging occasions, a number of subsequent paging frames, and/or a timer (e.g., in milliseconds) over which the corresponding connected mode RS is expected.

For example, the UE may receive information (e.g., an indication) of a connected-mode RS EPI frequency. The connected-mode EPI frequency may be represented by a vector in terms of a repetition order of the EPI DCI and which may be related to the connected-mode RS occasions. The connected-mode RS EPI frequency may be respectively set for any (e.g., each) connected-mode RS pattern and/or connected-mode RS configuration set.

For example, the foregoing (e.g., as a connected mode RS resource set) may be received in information elements (IEs) as part of any of: (1) system information (e.g., SIB1, over PBCH, etc.), (2) RRCReconfiguration message (e.g., over PDCCH/PDSCH), (3) RRCConnectionRelease message (e.g., over PDCCH/PDSCH), (4) RRC suspend indication message (e.g., over PDCCH/PDSCH), (5) EPI DCI (e.g., over PDCCH channel) and/or (6) paging DCI such as for a certain PO and/or to be applied for a next group-specific paging occasions (e.g., over PDCCH channel and/or where a number of paging occasions may be indicated by the validity/availability information).

Figure 16:
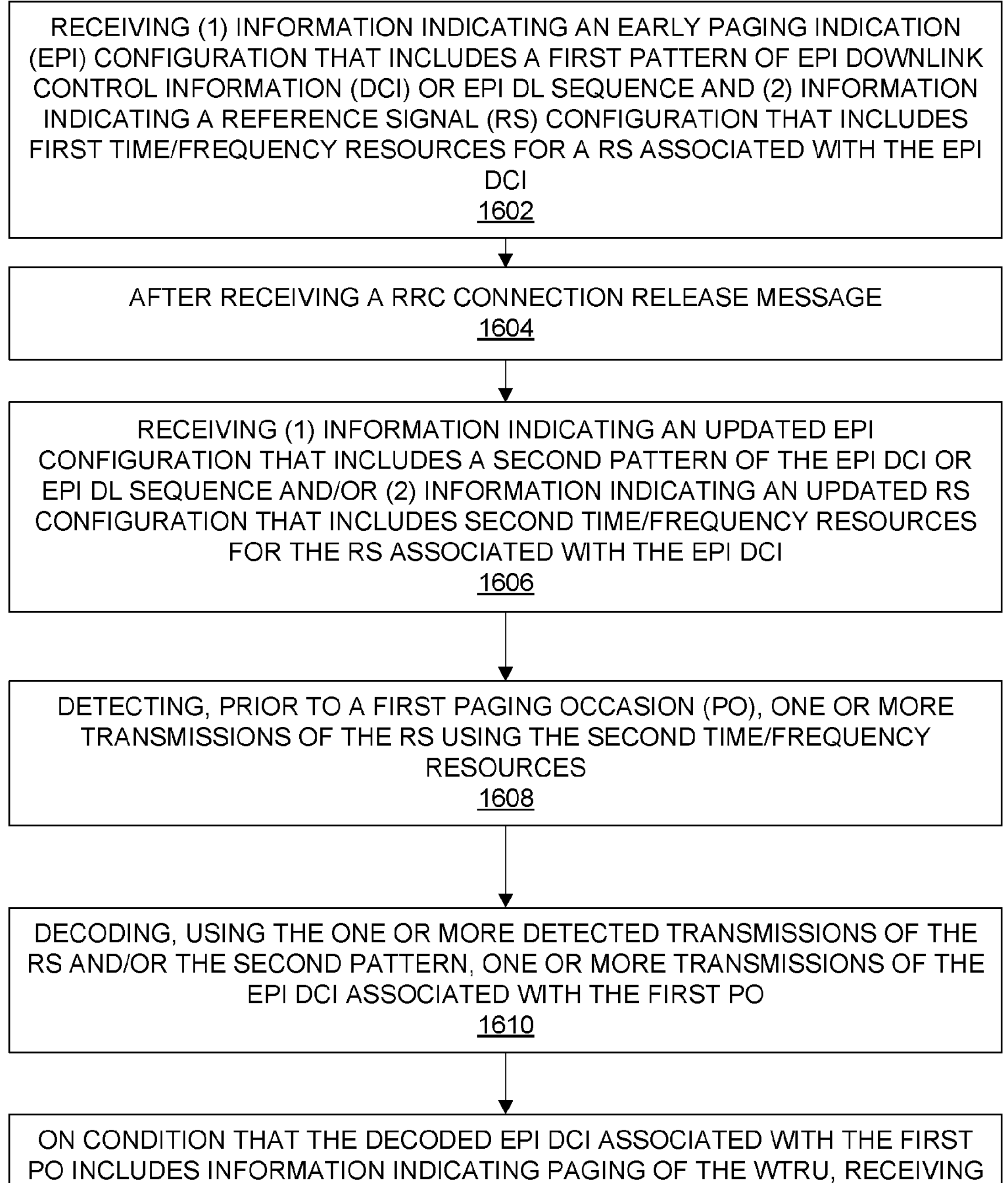
FIG. 16 is a diagram illustrating a representative procedure for paging using an updated EPI configuration and/or an updated RS configuration.

FIG. 16 is a diagram illustrating a representative procedure for paging using an updated EPI configuration and/or an updated RS configuration. For example, a WTRU 102 may implement the procedure shown in FIG. 16. At 1602, a WTRU 102 may proceed to receive (1) information indicating an EPI configuration that includes a first pattern of EPI downlink control information (DCI) or EPI DL sequence and (2) information indicating a RS configuration that includes first time/frequency resources for a RS associated with the EPI DCI. After 1602, the WTRU 102 may receive a RRC connection release message at 1604. At 1606, the WTRU 102 may proceed to receive (1) information indicating an updated EPI configuration that includes a second pattern of the EPI DCI or EPI DL sequence and/or (2) information indicating an updated RS configuration that includes second time/frequency resources for the RS associated with the EPI DCI. After 1606, the WTRU 102 may detect, prior to a first paging occasion (PO), one or more transmissions of the RS using the second time/frequency resources at 1608. At 1610, the WTRU 102 may decode, using the one or more detected transmissions of the RS and/or the second pattern, one or more transmissions of the EPI DCI associated with the first PO. On condition that the decoded EPI DCI associated with the first PO includes information indicating paging of the WTRU 102, the WTRU 102 may receive paging DCI during the first PO at 1612.

In certain representative embodiments, after receiving the RRC Connection release message at 1604 and before receiving (1) the information indicating the updated EPI configuration and/or (2) the information indicating the updated the RS configuration at 1606, the WTRU 102 may detect, prior to a second PO (e.g., prior to the first PO at 1608), one or more transmissions of the RS using the first time/frequency resources. Further, the WTRU 102 may decode, using the one or more detected transmissions of the RS and the first pattern, one or more transmissions of the EPI DCI associated with the second PO. As an example, the EPI DCI associated with the second PO may include (1) the information indicating the updated EPI configuration and/or (2) the information indicating the updated the RS configuration.

In certain representative embodiments, the WTRU 102, on condition that the decoded EPI DCI associated with the second PO includes information indicating paging of the WTRU 102, may receive paging DCI during the second PO. For example, the paging DCI received during the second PO includes (1) the information indicating the updated EPI configuration and/or (2) the information indicating the updated the RS configuration.

In certain representative embodiments, (1) the information indicating the updated EPI configuration and/or (2) the information indicating the updated RS configuration may be received in system information (e.g., from a SIB).

In certain representative embodiments, (1) the information indicating the updated EPI configuration and/or (2) the information indicating the updated RS configuration may be received in a RRC message.

In certain representative embodiments, the second pattern may relate the one or more transmissions of the EPI DCI, associated with the first (e.g., latter) PO, to the one or more transmissions of the RS, using the second time/frequency resources.

In certain representative embodiments, the first pattern may relate the one or more transmissions of the EPI DCI, associated with the second (e.g., earlier) PO, to the one or more transmissions of the RS, using the first time/frequency resources.

In certain representative embodiments, the WTRU 102 may receive information indicating a validity interval of the EPI configuration and/or an activation time of the EPI configuration. For example, the activation time may be specified in units of transmission time intervals.

In certain representative embodiments, the WTRU 102 may receive information indicating a validity interval of the updated EPI configuration and/or an activation time of the updated EPI configuration. For example, the activation time may be specified in units of transmission time intervals.

In certain representative embodiments, the receiving of (1) the information indicating the EPI configuration and (2) the information indicating the RS configuration may further include receiving (3) information indicating a default EPI configuration that includes a default pattern of EPI DCI and/or (4) information indicating a default RS configuration that includes default time/frequency resources for the RS associated with the EPI DCI and/or a numerology and QCL information associated with the RS.

In certain representative embodiments, the WTRU 102 may, before the receiving of (1) the information indicating the EPI configuration and (2) the information indicating the RS configuration, transmit information indicating a minimum number of synchronization signal block (SSB) transmissions or RS transmissions for retaining network synchronization.

FIG. 17 is a diagram illustrating a representative procedure for paging using an EPI configuration and a RS configuration which includes a quasi-colocation (QCL) setting and a numerology for a RS. For example, a WTRU 102 may implement the procedure shown in FIG. 17. At 1702, a WTRU 102 may proceed to receive (1) information indicating an EPI configuration that includes a first pattern of EPI DCI or EPI DL sequence and (2) information indicating a RS configuration including a QCL setting for a RS associated with the EPI DCI and a numerology of time/frequency resources for the RS. After 1702, the WTRU 102 may detect, prior to a first PO, one or more transmissions of the RS using the QCL setting and the numerology of the first time/frequency resources at 1704. At 1706, the WTRU 102 may decode, using the one or more detected transmissions of the RS and the first pattern, one or more transmissions of the EPI DCI associated with the first PO. After 1706, the WTRU 102 may proceed, on condition that the decoded EPI DCI associated with the first PO includes information indicating paging of the WTRU 102, to receive paging DCI during the first PO.

In certain representative embodiments, the WTRU 102 may receive a RRC message (e.g., a RRC connection release message), such as before 1702 or between 1702 and 1704. For example, the EPI configuration and/or the RS configuration may be received via system information, RRC signaling, EPI DCI and/or paging DCI.

In certain representative embodiments, the EPI configuration and/or the RS configuration may be received in (e.g., during) a previous PO (e.g., a second PO prior to the first PO).

In certain representative embodiments, the EPI configuration and/or the RS configuration may be received using (e.g., second) time/frequency resources which have or are associated with a different QCL setting than the QCL setting for the RS and/or which have or are associated with a different numerology than the numerology for the RS. For example, the information received at 1702 may use resources associated with a BWP which is different than a BWP in which the RS is transmitted.

In certain representative embodiments, the one or more transmissions of the EPI DCI may be received using (e.g., second) time/frequency resources which have or are associated with a different QCL setting than the QCL setting for the RS and/or which have or are associated with a different numerology than the numerology for the RS. As an example, the EPI DCI decoded at 1706 may use resources associated with a first BWP (e.g., a paging BWP) which is different than a second BWP (e.g., an active BWP of another WTRU) in which the RS is transmitted. The first BWP and the second BWP may overlap in frequency.

In certain representative embodiments, the EPI configuration and/or the RS configuration may include or be associated with a validity period for which the configuration may be applied (e.g., active). For example, the EPI configuration may be used for decoding the EPI DCI transmissions during the validity period. For example, the RS configuration may be used to detect the transmissions of the RS during the validity period. As another example, a default EPI configuration and/or default RS configuration may be used outside of the validity period.

FIG. 18 is a diagram illustrating a representative procedure for paging using an EPI configuration and a validity of a RS configuration which includes a quasi-colocation (QCL) setting and a numerology for a RS. For example, a WTRU 102 may implement the procedure shown in FIG. 18. At 1802, a WTRU 102 may proceed to receive (1) information indicating an EPI configuration that includes a first pattern of EPI DCI or EPI DL sequence and (2) information indicating a RS configuration including a QCL setting for a first RS associated with the EPI DCI and a numerology of time/frequency resources for the first RS. After 1802, the WTRU 102 may receive a RRC connection release message at 1804. At 1806, on condition that a validity of the RS configuration has expired, the WTRU 102 may detect, prior to a PO, one or more transmissions of a second RS using default time/frequency resources for the second RS. At 1808, the WTRU 102 may proceed to decode, using the one or more detected transmissions of the second RS and/or a default pattern of the EPI DCI or EPI DL sequence, one or more transmissions of the EPI DCI associated with the PO. For example, the WTRU 102 may use the first pattern after the validity of the RS configuration has expired. For example, the WTRU 102 may use the default pattern after the validity of the RS configuration, or EPI configuration, has expired. At 1810, on condition that the decoded EPI DCI associated with the PO includes information indicating paging of the WTRU 102, the WTRU 102 may proceed to receive paging DCI during the PO.

In certain representative embodiments, the EPI configuration and/or the RS configuration may be received in a system information block and/or RRC signaling.

In certain representative embodiments, the EPI configuration and/or the RS configuration may be received using (e.g., second) time/frequency resources which have or are associated with a different QCL setting than the QCL setting for the RS and/or which have or are associated with a different numerology than the numerology for the RS. For example, the information received at 1702 may use resources associated with a BWP which is different than a BWP in which the first and/or second RS is transmitted.

In certain representative embodiments, the one or more transmissions of the EPI DCI may be received using (e.g., second) time/frequency resources which have or are associated with a different QCL setting than the QCL setting for the first and/or second RS and/or which have or are associated with a different numerology than the numerology for the first and/or second RS. As an example, the EPI DCI decoded at 1706 may use resources associated with a first BWP (e.g., a paging BWP) which is different than a second BWP (e.g., an active BWP of another WTRU) in which the first and/or second RS is transmitted. For example, the second RS may be a default RS associated with paging. The first BWP and the second BWP may overlap in frequency.

In certain representative embodiments, the EPI configuration and/or the RS configuration may include or be associated with a validity period for which the configuration may be applied (e.g., active). For example, the EPI configuration may be used for decoding the EPI DCI transmissions during the validity period. For example, the RS configuration may be used to detect the transmissions of the first RS during the validity period. As another example, a default EPI configuration and/or the default RS configuration (e.g., default time/frequency resources) may be used outside of the validity period.

Figure 19:
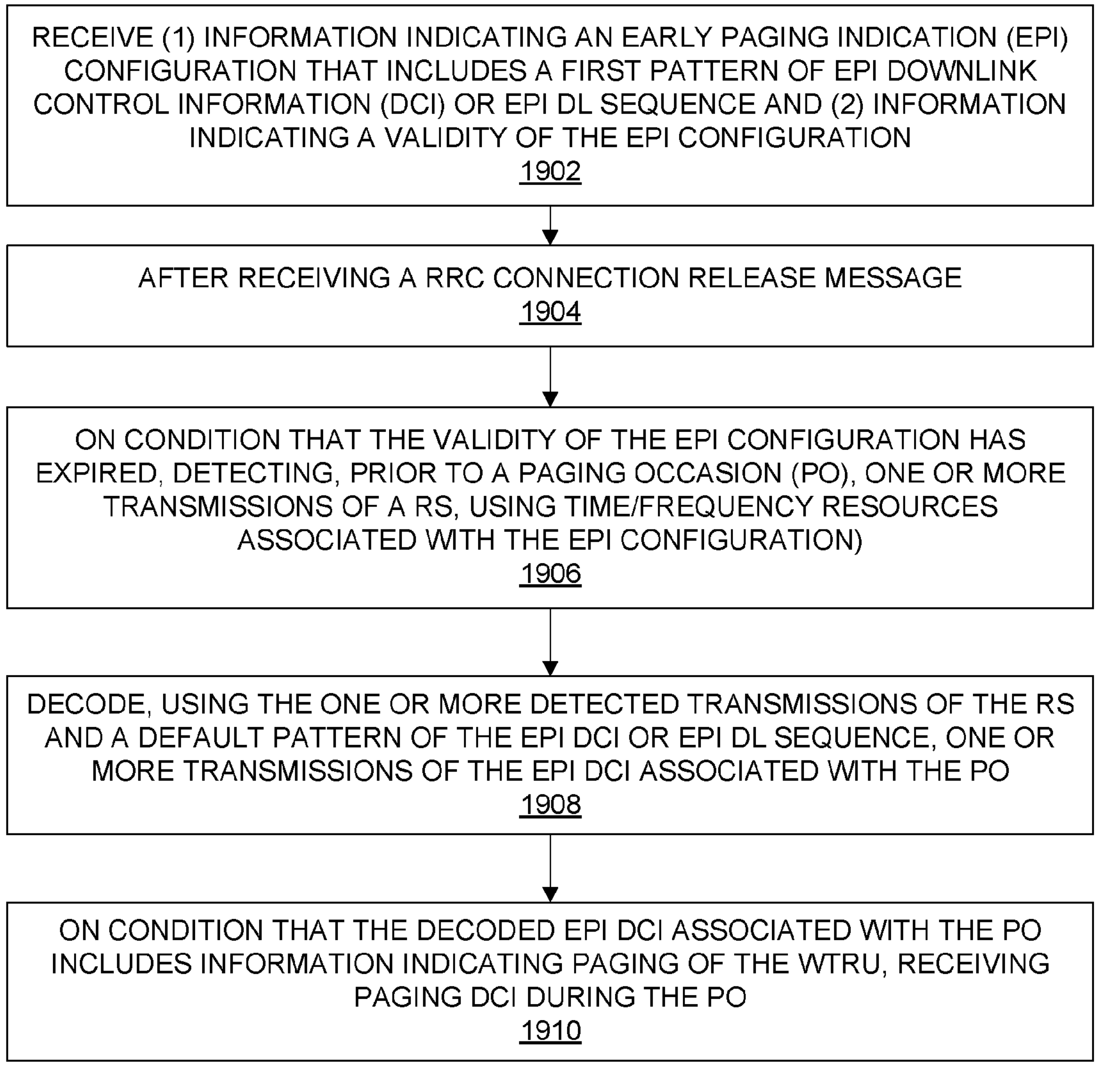
FIG. 19 is a diagram illustrating a representative procedure for paging using an EPI configuration and a validity of the EPI configuration.

FIG. 19 is a diagram illustrating a representative procedure for paging using an EPI configuration and a validity of the EPI configuration. For example, a WTRU 102 may implement the procedure shown in FIG. 19. At 1902, the WTRU 102 may receive (1) information indicating an EPI configuration that includes a first pattern of EPI DCI or EPI DL sequence and (2) information indicating a validity of the EPI configuration. After 1902, the WTRU 102 may receive a RRC connection release message at 1904. At 1906, the WTRU 102 may, on condition that the validity of the EPI configuration has expired, detect, prior to a paging occasion (PO), one or more transmissions of a RS. At 1908, the WTRU 102 may decode, using the one or more detected transmissions of the RS and a default pattern of the EPI DCI or EPI DL sequence, one or more transmissions of the EPI DCI associated with the PO. After 1908, on condition that the decoded EPI DCI associated with the PO includes information indicating paging of the WTRU, receiving paging DCI during the PO at 1910.

In certain representative embodiments, the WTRU 102 may receive the EPI configuration via system information or RRC signaling, or via EPI DCI or paging DCI in cases where the RRC connection release message is received prior to 1902.

In certain representative embodiments, the EPI configuration may be received in (e.g., during) a previous PO.

In certain representative embodiments, the EPI configuration may include the information indicating the validity of the EPI configuration.

In certain representative embodiments, the EPI configuration may be received using (e.g., second) time/frequency resources which have or are associated with a different QCL setting than the QCL setting for the RS and/or which have or are associated with a different numerology than the numerology for the RS. For example, the information received at 2002 may use resources associated with a BWP which is different than a BWP in which the RS is transmitted.

In certain representative embodiments, the one or more transmissions of the EPI DCI may be received using (e.g., second) time/frequency resources which have or are associated with a different QCL setting than the QCL setting for the RS and/or which have or are associated with a different numerology than the numerology for the RS. As an example, the EPI DCI decoded at 1706 may use resources associated with a first BWP (e.g., a paging BWP) which is different than a second BWP (e.g., an active BWP of another WTRU) in which the RS is transmitted. The first BWP and the second BWP may overlap in frequency.

In certain representative embodiments, the first pattern may be used for decoding the EPI DCI transmissions during the validity period (e.g., prior to the validity of the EPI configuration expiring).

Figure 20:
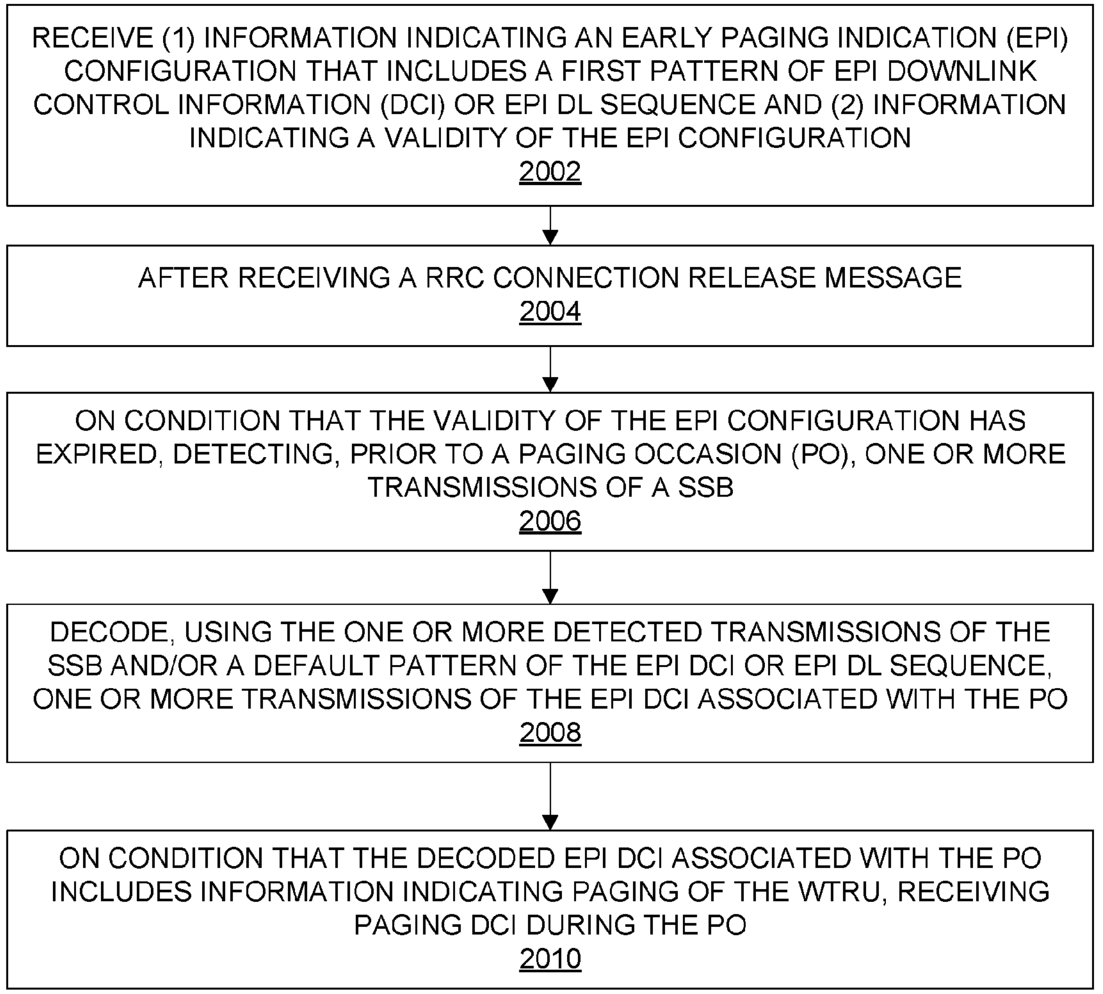
FIG. 20 is a diagram illustrating another representative procedure for paging using an EPI configuration and a validity of the EPI configuration.

FIG. 20 is a diagram illustrating another representative procedure for paging using an EPI configuration and a validity of the EPI configuration. For example, a WTRU 102 may implement the procedure shown in FIG. 20. At 2002, the WTRU 102 may receive (1) information indicating an EPI configuration that includes a first pattern of EPI DCI or EPI DL sequence and (2) information indicating a validity of the EPI configuration. After 2002, the WTRU 102 may receive a RRC connection release message at 2004. At 2006, the WTRU 102 may, on condition that the validity of the EPI configuration has expired, detect, prior to a paging occasion (PO), one or more transmissions of a SSB. At 2008, the WTRU 102 may decode, using the one or more detected transmissions of the SSB and a default pattern of the EPI DCI or EPI DL sequence, one or more transmissions of the EPI DCI associated with the PO. After 2008, on condition that the decoded EPI DCI associated with the PO includes information indicating paging of the WTRU, receiving paging DCI during the PO at 2010.

In certain representative embodiments, the WTRU 102 may receive the EPI configuration via system information or RRC signaling, or via EPI DCI or paging DCI in cases where the RRC connection release message is received prior to 2002.

In certain representative embodiments, the EPI configuration may be received in (e.g., during) a previous PO.

In certain representative embodiments, the EPI configuration may include the information indicating the validity of the EPI configuration.

In certain representative embodiments, the EPI configuration may be received using (e.g., second) time/frequency resources which have or are associated with a different QCL setting than the QCL setting for the RS and/or which have or are associated with a different numerology than the numerology for the RS. For example, the information received at 2002 may use resources associated with a BWP which is different than a BWP in which the RS is transmitted.

In certain representative embodiments, the one or more transmissions of the EPI DCI may be received using (e.g., second) time/frequency resources which have or are associated with a different QCL setting than the QCL setting for the RS and/or which have or are associated with a different numerology than the numerology for the RS. As an example, the EPI DCI decoded at 1706 may use resources associated with a first BWP (e.g., a paging BWP) which is different than a second BWP (e.g., an active BWP of another WTRU) in which the RS is transmitted. The first BWP and the second BWP may overlap in frequency.

In certain representative embodiments, the first pattern may be used for decoding the EPI DCI transmissions during the validity period (e.g., prior to the validity of the EPI configuration expiring).

FIG. 21 is a diagram illustrating a representative procedure for paging using an EPI configuration and first and second RS configurations. For example, a WTRU 102 may implement the procedure shown in FIG. 21. At 2102, the WTRU 102 may receive (1) information indicating an early paging indication (EPI) configuration that includes a first pattern of EPI downlink control information (DCI) or EPI DL sequence, (2) information indicating a first reference signal (RS) configuration that includes first time/frequency resources for a first RS associated with the EPI DCI, and (3) information indicating a second RS configuration that includes second time/frequency resources for a second RS. At 2104, the WTRU may receive a RRC connection release message. After 2104, the WTRU 102 may detect, prior to a first PO, one or more transmissions of the first RS using the first time/frequency resources and one or more transmissions of the second RS using the second time/frequency resources at 2106. At 2108, the WTRU 102 may decode, using the detected transmissions of the first RS and the second RS and the first pattern, one or more transmissions of the EPI DCI associated with the first PO. At 2110, the WTRU 102 may, on condition that the decoded EPI DCI associated with the first PO includes information indicating paging of the WTRU, receive paging DCI during the first PO.

In certain representative embodiments, (1) the information indicating the EPI configuration, (2) the information indicating the first RS configuration, and/or (3) the information indicating the second RS configuration is received in any of a system information block (SIB), a radio resource control (RRC) message, an EPI DCI associated with a second PO prior to the first PO, and/or a paging DCI during the second PO.

In certain representative embodiments, the first pattern may relate, or indicate an association between, the one or more transmissions of the EPI DCI, associated with the first PO, to the transmissions of the first RS and the second RS.

In certain representative embodiments, the WTRU 102 may receive information indicating a validity of the EPI configuration. For example, the WTRU 102 may decode, on condition that the validity (e.g., validity interval) has not lapsed, the one or more transmissions of the EPI DCI associated with the first PO using the first pattern. As another example, the WTRU 102 may decode, on condition that the validity (e.g., validity interval) has lapsed, the one or more transmissions of the EPI DCI associated with the first PO using a default pattern of the EPI DCI or EPI DL sequence.

In certain representative embodiments, the WTRU 102 may receive information indicating an activation of the EPI configuration. For example, the WTRU 102 may decode, on condition that the activation of the EPI configuration has been received, the one or more transmissions of the EPI DCI associated with the first PO using the first pattern.

In certain representative embodiments, the WTRU 102 may receive information indicating a validity of the first RS configuration. For example, the WTRU 102 may detect, prior to the first PO, the one or more transmissions of the first RS using the first time/frequency resources on condition that the validity interval has not lapsed. As another example, the WTRU 102 may detect, prior to the first PO, the one or more transmissions of a default RS using default time/frequency resources on condition that the validity interval has lapsed.

In certain representative embodiments, the WTRU 102 may receive information indicating an activation of the first RS configuration. For example, the WTRU 102 may detect, prior to the first PO, the one or more transmissions of the first RS using the first time/frequency resources on condition that the activation of the first RS configuration has been received.

In certain representative embodiments, similar processing may be applied with respect to the second RS configuration. For example, the WTRU 102 may detect, prior to the first PO, the one or more transmissions of the second RS using the second time/frequency resources on condition that the validity interval has not lapsed. As another example, the WTRU 102 may detect, prior to the first PO, the one or more transmissions of a default RS using default time/frequency resources on condition that the validity interval has lapsed. As another example, the WTRU 102 may detect, prior to the first PO, the one or more transmissions of the second RS using the second time/frequency resources on condition that the activation of the second RS configuration has been received.

In certain representative embodiments, the first time/frequency resources may be associated with a paging BWP. In certain representative embodiments, the second time/frequency resources may be associated with a BWP which is different than the paging BWP.

In certain representative embodiments, the WTRU 102 detection of the one or more transmissions of the first RS using the first time/frequency resources and/or the one or more transmissions of the second RS using the second time/frequency resources may be based on a WTRU capability and/or a minimum wake up period associated with the first PO (e.g., associated with paging of the WTRU 102).

FIG. 22 is a diagram illustrating a representative procedure for paging using an EPI configuration, an RS configuration, and a validity of the EPI configuration and/or the RS configuration. For example, a WTRU 102 may implement the procedure shown in FIG. 22. At 2202, the WTRU 102 may receive (1) information indicating an EPI configuration that includes a first pattern of EPI DCI or EPI DL sequence and (2) information indicating a RS configuration that includes first time/frequency resources for a RS associated with the EPI DCI. After 2202, the WTRU 102 may receive a RRC connection release message at 2204. At 2206, the WTRU may, on condition that a validity of the EPI configuration and/or the RS configuration has expired, detect, prior to a PO, one or more transmissions of a default RS using default time/frequency resources. At 2208, the WTRU 102 may decode, using the one or more detected transmissions of the default RS and/or a default pattern of the EPI DCI or EPI DL sequence, one or more transmissions of the EPI DCI associated with the PO. At 2210, the WTRU 102, on condition that the decoded EPI DCI associated with the PO includes information indicating paging of the WTRU, may receive paging DCI during the PO.

FIG. 23 is a diagram illustrating another representative procedure for paging using an updated EPI configuration and/or an updated RS configuration. For example, a WTRU 102 may implement the procedure shown in FIG. 23. At 2302, the WTRU 102 may receive (1) information indicating a default EPI configuration that includes a default pattern of EPI DCI or EPI DL sequence, and (2) information indicating a RS configuration that includes time/frequency resources for a default RS associated with the EPI DCI. At 2304, the WTRU 102 may receive a RRC connection release message. After 2304, the WTRU 102 may receive (1) information indicating an updated EPI configuration that includes an updated pattern of the EPI DCI or EPI DL sequence and/or (2) information indicating an updated RS configuration that includes second time/frequency resources for the RS associated with the EPI DCI at 2306. At 2308, on condition that a validity of the updated EPI configuration and/or the updated RS configuration has expired, the WTRU 102 may detect, prior to a PO, one or more transmissions of the default RS using the time/frequency resources for the default RS. After 2308, the WTRU 102 may decode, using the one or more detected transmissions of the default RS and/or the default pattern, one or more transmissions of the EPI DCI associated with the PO at 2310. At 2312, on condition that the decoded EPI DCI associated with the PO includes information indicating paging of the WTRU, the WTRU 102 may receive paging DCI during the PO.

In certain representative embodiments, a validity of the updated EPI configuration and/or the updated RS configuration may not be expired (e.g., is valid and/or activated). For example, the WTRU 102 may, on condition that a validity of the updated EPI configuration and/or the updated RS configuration has not expired (e.g., is valid and/or activated), detect, prior to the PO, one or more transmissions of the RS using the second time/frequency resources at 2308. As another example, the WTRU 102 may decode, using the one or more detected transmissions of the RS and/or the updated pattern, one or more transmissions of the EPI DCI associated with the PO at 2310.

In any of the foregoing procedures in FIGS. 16-23, the WTRU 102 may transmit information indicating a WTRU capability associated with paging prior to receiving an EPI configuration. For example, the WTRU capability may be information indicating a minimum number of SSB bursts and/or DL sequences (e.g., successive RS transmissions) required to retain RAN synchronization. For example, a base station (e.g., gNB) may send EPI configuration to the WTRU 102 where the EPI DCI pattern may be selected by the network (e.g., base station) based on the WTRU capability.

In certain representative embodiments, the EPI DL sequence may indicate an association between the transmissions of the EPI DCI and the transmissions of the RS which precede a paging occasion.

In certain representative embodiments, a method may be implemented by a WTRU 102 in (e.g., after transitioning to) inactive mode or idle mode, and the method may include receiving one or more transmissions of one or more SSBs or one or more reference signals (RSs) associated with a paging occasion (PO), and receiving one or more transmissions of EPI DCI which precedes the PO based on the received one or more transmissions of the one or more SSBs or one or more the RSs. The WTRU 102 may proceed to determine whether the WTRU is being paged or not in the PO based on the EPI DCI. The WTRU 102 may proceed to switch to a first sleep state until at least after the PO has ended based on whether the WTRU is being paged or not in the PO.

In certain representative embodiments, a method may be implemented by a WTRU 102 in (e.g., after transitioning to) inactive mode or idle mode, and the method may include receiving one or more transmissions of one or more SSBs or one or more reference signals (RSs) associated with a paging occasion (PO), and receiving one or more transmissions of an EPI DCI which precedes the PO based on the received one or more transmissions of the one or more SSBs or one or more the RSs. The WTRU 102 may proceed to determine whether the WTRU is being paged or not in the PO based on the EPI DCI. The WTRU 102 may proceed to switch to a second sleep state until the PO starts based on whether the WTRU is being paged or not in the PO.

In certain representative embodiments, the method may include the WTRU waking from the second sleep state at a time the PO begins, and, after waking from the second sleep state, receiving a transmission of paging DCI in the PO and/or a transmission of a paging record subsequent to the PO.

In representative embodiments, the EPI may be received within a transmission of DCI. For example, the EPI may be a single bit field within the DCI.

In representative embodiments, the WTRU may also receive information indicating an active configuration set related to paging the WTRU in the PO. For example, the configuration set may include any of a correspondence relationship between a number of the transmissions of the one or more SSBs or the one or more RSs and a number of the transmissions of the EPI, a time duration for which the configuration set is to be applied, numerology information of the transmission of the RSs, quasi colocation (QCL) information of the transmission of the RS, a default configuration set index, and/or a resource set of the one or more RSs. As an example, the time duration may be any of a number of successive POs, a number of paging frames, a number of system frame numbers, a number of slots, and/or expiry timer information.

In representative embodiments, on condition that the time duration has lapsed, the WTRU may activate a default configuration set related to paging the WTRU and/or deactivate the active configuration set.

In representative embodiments, on condition that the time duration has not lapsed, the WTRU may receive information indicating an update for the active configuration set. For example, the active configuration set may be received via one or more information elements in system information and/or radio resource control messaging. For example, the update for the active configuration set may be received via one or more information elements in DCI signaling.

In representative embodiments, the one or more reference signals (RSs) associated with the PO may include at least one RS for another WTRU.

In representative embodiments, the WTRU may receive information indicating that a number of RSs to be transmitted in a later (e.g., next) PO will be increased and/or decreased.

In representative embodiments, the WTRU may receive information indicating that no RSs are to be transmitted in a next PO.

Systems and methods for processing data according to representative embodiments may be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within a vehicle and/or another mobile device remotely. In the later a case, data may be transferred via wireline or wirelessly between the vehicles or other mobile device.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods. It should be understood that the representative embodiments are not limited to the above-mentioned platforms or CPUs and that other platforms and CPUs may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Throughout the disclosure, one of skill understands that certain representative embodiments may be used in the alternative or in combination with other representative embodiments.

In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented by a wireless transmit/receive unit (WTRU), the method comprising:

receiving information indicating an early paging indication (EPI) configuration that includes a first pattern of EPI downlink control information (DCI); and after receiving a RRC Connection release message:

receiving information indicating an updated EPI configuration that includes a second pattern of the EPI DCI, decoding, prior to a first paging occasion (PO), one or more transmissions of the EPI DCI associated with the first PO based on the second pattern of the EPI DCI, and on condition that the decoded EPI DCI associated with the first PO includes information indicating paging of the WTRU, receiving paging DCI during the first PO.

2. The method of claim 1, further comprising:

after receiving the RRC Connection release message and before receiving the information indicating the updated EPI configuration:

decoding, prior to a second PO which occurs before the first PO, one or more transmissions of the EPI DCI associated with the second PO based on the first pattern of the EPI DCI.

3. The method of claim 2, wherein the EPI DCI associated with the second PO includes the information indicating the updated EPI configuration.

4. The method of claim 2, further comprising:
on condition that the decoded EPI DCI associated with the second PO includes information indicating paging of the WTRU, receiving paging DCI during the second PO.

5. The method of claim 4, wherein the information indicating the updated EPI configuration is received in the paging DCI.

6. The method of claim 1, wherein the information indicating the updated EPI configuration and/or (2) the information indicating the updated RS configuration is received in system information or a RRC message.

7. The method of claim 1, wherein the second pattern indicates time/frequency resources of the one or more transmissions of the EPI DCI associated with the first PO.

8. The method of claim 2, wherein the first pattern indicates time/frequency resources of the one or more transmissions of the EPI DCI associated with the second PO.

9. The method of claim 1, further comprising:
receiving information indicating a validity interval of the updated EPI configuration and/or an activation timing of the updated EPI configuration.

10. The method of claim 1, further comprising:
before the receiving of the information indicating the EPI configuration, transmitting information indicating a minimum number of synchronization signal block (SSB) transmissions or reference signal (RS) transmissions for retaining network synchronization.

11. A wireless transmit/receive unit (WTRU) comprising:
a processor, a memory, and a transceiver which are configured to:
receive information indicating an early paging indication (EPI) configuration that includes a first pattern of EPI downlink control information (DCI), and
after receiving a RRC Connection release message:
receive information indicating an updated EPI configuration that includes a second pattern of the EPI DCI,
decode, prior to a first paging occasion (PO), one or more transmissions of the EPI DCI associated with the first PO based on the second pattern of the EPI DCI, and
on condition that the decoded EPI DCI associated with the first PO includes information indicating paging of the WTRU, receive paging DCI during the first PO.

12. The WTRU of claim 11, wherein the processor, the memory, and the transceiver are configured to:
after receiving the RRC Connection release message and before receiving the information indicating the updated EPI configuration:
decode, prior to a second PO which occurs before the first PO, one or more transmissions of the EPI DCI associated with the second PO based on the first pattern of the EPI DCI.

13. The WTRU of claim 12, wherein the EPI DCI associated with the second PO includes the information indicating the updated EPI configuration.

14. The WTRU of claim 12, wherein the processor, the memory, and the transceiver are configured to:
on condition that the decoded EPI DCI associated with the second PO includes information indicating paging of the WTRU, receive paging DCI during the second PO.

15. The WTRU of claim 14, wherein the information indicating the updated EPI configuration is received in the paging DCI.

16. The WTRU of claim 11, wherein the information indicating the updated EPI configuration and/or (2) the information indicating the updated RS configuration is received in system information or a RRC message.

17. The WTRU of claim 11, wherein the second pattern indicates time/frequency resources of the one or more transmissions of the EPI DCI, associated with the first PO.

18. The WTRU of claim 12, wherein the first pattern indicates time/frequency resources of the one or more transmissions of the EPI DCI, associated with the second PO.

19. The WTRU of claim 11, wherein the processor, the memory, and the transceiver are configured to:
receive information indicating a validity interval of the updated EPI configuration and/or an activation timing of the updated EPI configuration.

20. The WTRU of claim 11, wherein the processor, the memory, and the transceiver are configured to:
before the receiving of the information indicating the EPI configuration, transmit information indicating a minimum number of synchronization signal block (SSB) transmission or reference signal (RS) transmissions for retaining network synchronization.

* * * * *